United States Patent
Tada et al.

(10) Patent No.: US 12,259,522 B2
(45) Date of Patent: Mar. 25, 2025

(54) DIELECTRIC MULTILAYER FILM, METHOD FOR PRODUCING SAME AND OPTICAL MEMBER USING SAME

(71) Applicant: Konica Minolta, Inc., Tokyo (JP)

(72) Inventors: Kazunari Tada, Hachioji (JP); Jinichi Kasuya, Kokubunji (JP); Yasushi Mizumachi, Hino (JP)

(73) Assignee: KONICA MINOLTA, INC, Tokyo (JP)

( * ) Notice: Subject to any disclaimer, the term of this patent is extended or adjusted under 35 U.S.C. 154(b) by 796 days.

(21) Appl. No.: 17/312,929

(22) PCT Filed: Nov. 27, 2019

(86) PCT No.: PCT/JP2019/046288
§ 371 (c)(1),
(2) Date: Jun. 10, 2021

(87) PCT Pub. No.: WO2020/129558
PCT Pub. Date: Jun. 25, 2020

(65) Prior Publication Data
US 2022/0128738 A1  Apr. 28, 2022

(30) Foreign Application Priority Data

Dec. 21, 2018 (JP) .................................. 2018-239790
Jun. 27, 2019 (JP) .................................. 2019-120511

(51) Int. Cl.
*G02B 1/18* (2015.01)
*B01J 21/06* (2006.01)
(Continued)

(52) U.S. Cl.
CPC .............. *G02B 1/18* (2015.01); *B01J 21/063* (2013.01); *B01J 21/08* (2013.01); *B01J 35/19* (2024.01);
(Continued)

(58) Field of Classification Search
CPC .. G02B 1/18; G02B 1/115; B01J 35/19; B01J 35/647; B01J 35/653; B01J 35/651;
(Continued)

(56) References Cited

U.S. PATENT DOCUMENTS 3,895,155 A * 7/1975 Shukuri ................ C23C 14/042
359/507
6,287,683 B1 * 9/2001 Itoh .......................... G02B 1/10
428/428
(Continued)

FOREIGN PATENT DOCUMENTS

EP    0978494 A1   2/2000
JP    S52-11321 B2  3/1977
(Continued)

OTHER PUBLICATIONS

JP-2000308860-A English translation Hirakawa T—Nov. 7, 2000—JP.*
(Continued)

Primary Examiner — Sharrief I Broome
(74) Attorney, Agent, or Firm — LUCAS & MERCANTI, LLP

(57) ABSTRACT

A dielectric multilayer film is composed of a plurality of layers on a substrate. The plurality of layers includes at least one low refractive index layer and at least one high refractive index layer. The uppermost layer farthest from the substrate is the low refractive index layer. The high refractive index layer disposed on a substrate side of the uppermost layer is a functional layer containing a metal oxide with a photocatalytic function. The uppermost layer is a hydrophilic layer containing a metal oxide with a hydrophilic function and has pores that partially expose a surface of the functional layer. The average width of the pores is equal to or greater than 5 nm.

26 Claims, 19 Drawing Sheets

(51) Int. Cl.
*B01J 21/08* (2006.01)
*B01J 35/00* (2024.01)
*B01J 35/39* (2024.01)
*B01J 35/61* (2024.01)
*B01J 35/64* (2024.01)
*B01J 37/02* (2006.01)
*G02B 1/115* (2015.01)

(52) U.S. Cl.
CPC .............. *B01J 35/39* (2024.01); *B01J 35/61* (2024.01); *B01J 35/647* (2024.01); *B01J 35/651* (2024.01); *B01J 35/653* (2024.01); *B01J 37/0244* (2013.01); *G02B 1/115* (2013.01)

(58) Field of Classification Search
CPC . B01J 35/39; B01J 35/61; B01J 21/063; B01J 21/08; B01J 37/0244
USPC .......................................................... 359/512
See application file for complete search history.

(56) References Cited

U.S. PATENT DOCUMENTS

| | | | | |
|---|---|---|---|---|
| 2001/0031365 | A1* | 10/2001 | Anderson | C03C 27/10 428/432 |
| 2003/0016433 | A1* | 1/2003 | Kikuchi | G02F 1/1533 428/687 |
| 2003/0039848 | A1* | 2/2003 | Murata | B01J 37/0225 428/448 |
| 2003/0186089 | A1* | 10/2003 | Kikuchi | G02F 1/157 428/432 |
| 2003/0215647 | A1* | 11/2003 | Yoshida | C03C 17/3417 428/428 |
| 2008/0261340 | A1* | 10/2008 | Matsuo | H01L 33/22 438/689 |
| 2009/0026063 | A1* | 1/2009 | Skiles | B01D 53/62 502/4 |
| 2010/0075114 | A1* | 3/2010 | Kurihara | C03C 15/00 977/700 |
| 2017/0259300 | A1 | 9/2017 | Goh et al. | |
| 2018/0217299 | A1* | 8/2018 | Takahashi | G02B 1/18 |

FOREIGN PATENT DOCUMENTS

| | | | |
|---|---|---|---|
| JP | H04-32558 | A | 2/1992 |
| JP | H08-11631 | A | 1/1996 |
| JP | H09-202651 | A | 8/1997 |
| JP | H10-36144 | A | 2/1998 |
| JP | H11-84102 | A | 3/1999 |
| JP | 2000308860 | A * | 11/2000 |
| JP | 2001-033607 | A | 2/2001 |
| JP | 2001-286754 | A | 10/2001 |
| JP | 2001-287654 | A | 10/2001 |
| JP | 2003-287601 | A | 10/2003 |
| JP | 2008-168610 | A | 7/2008 |
| JP | 2008-270416 | A | 11/2008 |
| JP | 2008-274409 | A | 11/2008 |
| JP | 2013-203774 | A | 10/2013 |
| JP | 2014043644 | A | 3/2014 |
| JP | 2015-227904 | A | 12/2015 |
| JP | 2017182065 | A * | 10/2017 |
| JP | 2019-002036 | A | 1/2019 |
| WO | 2017/056598 | A1 | 4/2017 |
| WO | 2018/110018 | A1 | 6/2018 |

OTHER PUBLICATIONS

JP-2017182065-A English translation—Fujii H—Oct. 5, 2017—JP.*
PCT, Written Opinion of the ISA for the corresponding application No. PCT/JP2019/046288, dated Feb. 25, 2020, with English translation.
PCT, International Search Report for the corresponding application No. PCT/JP2019/046288, dated Feb. 25, 2020, with English translation.
CNIPA, Office Action/Search Report for the related Chinese Application No. 201980082853.5, dated Jun. 24, 2022, with English translation.
Office Action/Search Report for the related Chinese Application No. 201980082853.5, dated Mar. 25, 2023, with English translation, 20 pages.
Office Action/Search Report for the related Japanese Application No. 2020-561247, dated Jun. 6, 2023, with English translation, 22 pages.
EPO, Extended European Search Report for the related European Application No. 19900819.4, dated Jan. 24, 2022.
Gonzalez-Garcia, L; et al., "Paper; Correlation lengths, porosity and water adsorption in TiO2 thin films prepared by glancing angle deposition; Correlation lengths, porosity and water adsorption in TiO2 thin films prepared by glancing angle deposition", Nanotechnology, Institute of Physics Publishing, Bristol, GB, vol. 23, No. 20, Apr. 30, 2012, paper 205701 (10 pages).
European Patent Office, "Communication pursuant to Article 94(3) EPC", which was dated Apr. 8, 2024 and issued in connection with the related European patent application No. 19 900 819.4, 6 pages.
European Patent Office, "Communication pursuant to Article 94(3) EPC", which is dated Dec. 18, 2024 and issued in connection with the related European patent application No. 19 900 819.4, 7 pages.

* cited by examiner

A

INITIAL IMAGE
POROUS EXAMPLE
25_Si_SiO2_Ag6_Ag PEELING 2

BINARIZED IMAGE
PORE AREA RATIO 14%

AVERAGE PORE WIDTH 22nm
MICROSTRUCTURE PERIOD LENGTH 133nm

B

LEAF VEIN EXAMPLE
25_Si_SiO2_Ag8_Ag PEELING

PORE AREA RATIO 48%

AVERAGE PORE WIDTH 84nm
MICROSTRUCTURE PERIOD LENGTH 110nm

C

POROUS EXAMPLE
25_Si_SiO2_Ag12_ETCHING_1

PORE AREA RATIO 3%

AVERAGE PORE WIDTH 15nm
MICROSTRUCTURE PERIOD LENGTH 1333nm

BINARIZATION

5μm

HISTOGRAM OF BINARIZED IMAGE

SECOND EXAMPLE, DIELECTRIC MULTILAYER FILM 51, AFM ANALYSIS IMAGE

| S Parameters - Height | |
|---|---|
| Sa | 6.13 nm |
| Sku | 6.72 |
| Sp | 39.7 nm |
| Sq | 8.62 nm |
| Ssk | -2.11 |
| Sv | -41.1 nm |
| Sz | 80.8 nm |

Height Sensor  1.0 μm

SECOND EXAMPLE, DIELECTRIC MULTILAYER FILM 52, AFM ANALYSIS IMAGE

| S Parameters - Height | |
|---|---|
| Sa | 6.13 nm |
| Sku | 6.72 |
| Sp | 39.7 nm |
| Sq | 8.62 nm |
| Ssk | -2.11 |
| Sv | -41.1 nm |
| Sz | 80.8 nm |

Height Sensor  1.0 μm

DIELECTRIC MULTILAYER FILM, METHOD FOR PRODUCING SAME AND OPTICAL MEMBER USING SAME

CROSS REFERENCE TO RELATED APPLICATION

This application is a 371 of PCT/JP2019/046288 filed on Nov. 27, 2019, which claims priority of Japanese patent applications no. 2018-239790 filed on Dec. 21, 2018 and no. 2019-120511 filed on Jun. 27, 2019, the above applications are incorporated herein by reference.

TECHNICAL FIELD

The present invention relates to a dielectric multilayer film, a method for producing the same, and an optical member using the same. In more detail, the present invention relates to a dielectric multilayer film and the like that have low light reflectance, hydrophilicity, photocatalytic property and that are also excellent in properties such as salt water resistance and scratch resistance.

BACKGROUND

In recent years, an on-board camera has been mounted on a vehicle for the purpose of driving assist. More specifically, a camera that captures an image of a rear or side view from a vehicle is mounted on a vehicle body, and the image captured by the camera is displayed in a position that can be seen by the driver. This can reduce blind spots and contribute to safe driving.

On-board cameras are often mounted outside the vehicle, and the lenses used are strictly required to guarantee resistance to environment. For example, in a salt spray test on a lens, silicon dioxide (hereinafter referred to as "$SiO_2$"), which is a component of an antireflection layer on the lens surface, may be eluted into salt water. This changes the light reflectance and causes ghosts and flares.

In addition, such lenses are often smeared with water droplets, mud and the like. Depending on the amount of water droplets on the lens, the image captured by the camera may become unclear. To cope with the problem, the uppermost layer of an antireflection layer is required to maintain the superhydrophilicity for a long period of time.

Against oil smears or the like, it is desirable that the antireflection layer exhibits photocatalytic effect and has self-cleaning property.

As a solution to these problems, Patent Document 1 discloses producing a laminate of a substrate/a dielectric multilayer film/a $TiO_2$-containing layer (photocatalytic layer)/an $SiO_2$-containing layer, and forming a porous and relatively coarse $SiO_2$ film by vapor deposition to make atomic-level pores so as for the $TiO_2$-containing layer to exhibit the photocatalytic function on the surface. However, this technique has the following five problems.

1) Since the gaps of the $SiO_2$ film are atomic level gaps that are insufficient for efficiently releasing the photocatalytic function, there is no other way but to increase the amount of $TiO_2$ which is a photocatalytic layer. However, this technique results in the thicker $TiO_2$ layer, which leads to the deteriorated antireflection property and the increased sensitivity of the antireflection performance to production errors. That is, there is a problem in mass production.

2) Since the gaps of the $SiO_2$ film are atomic-level pores, the pores are clogged within 1 hour in a high-temperature and high-humidity test at 80° C. and 90% RH, and the photocatalytic effect is deactivated.

3) Since the $SiO_2$ film is weak due to the atomic-level pores and has low salt water resistance as described above, the film cannot be used in a harsh environment to which on-board cameras and the like are exposed.

4) As for the hydrophilic function, the $SiO_2$ film suffers from increasing water contact angle and developing water repellency in a long-term high-temperature and high-humidity test.

5) Finally, the $SiO_2$ film has poor scratch resistance and is easily peeled off. This changes the light reflectance.

Therefore, there is a need for developing a dielectric multilayer film that has low light reflectance, hydrophilicity and photocatalytic property and that is also excellent in salt water resistance, long-lasting superhydrophilicity and scratch resistance.

CITATION LIST

Patent Literature

Patent Document 1: JP-A-10-36144

SUMMARY

Technical Problem

The present invention has been made in view of the above problems and situations, and an object thereof is to provide a dielectric multilayer film that has low light reflectance, hydrophilicity and photocatalytic property and that is also excellent in properties such as salt water resistance and scratch resistance, and to provide a method for producing the same and an optical member using the same.

Solution to Problem

In order to achieve the object, the present inventors studied the cause of the above-described problems. In the process of the study, they found that it is possible to obtain a dielectric multilayer film that has low light reflectance, hydrophilicity and photocatalytic property and that is also excellent in properties such as salt water resistance, long-lasting superhydrophilicity and scratch resistance when a dielectric multilayer film includes a high refractive index layer and a low refractive index layer, wherein the high refractive index layer includes a functional layer containing a metal oxide with a photocatalytic function and a hydrophilic layer containing a metal oxide with a hydrophilic function as the uppermost layer, and the uppermost layer has pores of a specific size so as to expose part of the functional layer. The present invention has been thus made.

That is, the above-described problems of the present invention are solved by the following means.

1. A dielectric multilayer film composed of a plurality of layers on a substrate,
   wherein the plurality of layers includes at least one low refractive index layer and at least one high refractive index layer,
   wherein an uppermost layer farthest from the substrate is the low refractive index layer,
   wherein the high refractive index layer disposed on a substrate side of the uppermost layer is a functional layer containing a metal oxide with a photocatalytic function, wherein the uppermost layer is a hydrophilic layer containing a metal oxide with a hydrophilic function and has pores that partially expose a surface of the functional layer, and wherein an average width of the pores is equal to or greater than 5 nm.

2. A dielectric multilayer film composed of a plurality of layers on a substrate, wherein the plurality of layers includes at least one low refractive index layer and at least one high refractive index layer, wherein an uppermost layer farthest from the substrate is the low refractive index layer, wherein the high refractive index layer disposed on a substrate side of the uppermost layer is a functional layer containing a metal oxide with a photocatalytic function, wherein the uppermost layer is a hydrophilic layer containing a metal oxide with a hydrophilic function and has pores that partially expose a surface of the functional layer, and wherein an average depth of the pores is in a range of 10 to 300 nm, and an average width of the pores is in a range of 5 to 1000 nm.

3. A dielectric multilayer film composed of a plurality of layers formed on a substrate, wherein the plurality of layers includes at least one low refractive index layer and at least one high refractive index layer, wherein an uppermost layer farthest from the substrate is the low refractive index layer, wherein the high refractive index layer disposed on a substrate side of the uppermost layer is a functional layer containing a metal oxide with a photocatalytic function, wherein the uppermost layer is a hydrophilic layer containing a metal oxide with a hydrophilic function and has pores that partially expose a surface of the functional layer, and wherein a maximum valley depth Sv of the pores is in a range of 10 to 300 nm, and an average width of the pores is in a range of 5 to 1000 nm.

4. A dielectric multilayer film composed of a plurality of layers formed on a substrate, wherein the plurality of layers includes at least one low refractive index layer and at least one high refractive index layer, wherein an uppermost layer farthest from the substrate is the low refractive index layer, wherein the high refractive index layer disposed on a substrate side of the uppermost layer is a functional layer containing a metal oxide with a photocatalytic function, wherein the uppermost layer is a hydrophilic layer containing a metal oxide with a hydrophilic function and has pores that partially expose a surface of the functional layer, and an average period length of a microstructure portion other than the pores is in a range of 20 to 5000 nm.

5. A dielectric multilayer film composed of a plurality of layers formed on a substrate, wherein the plurality of layers includes at least one low refractive index layer and at least one high refractive index layer, wherein an uppermost layer farthest from the substrate is the low refractive index layer, wherein the high refractive index layer disposed on a substrate side of the uppermost layer is a functional layer containing a metal oxide with a photocatalytic function, wherein the uppermost layer is a hydrophilic layer containing a metal oxide with a hydrophilic function and has pores that partially expose a surface of the functional layer, and wherein an area ratio of the pores on a surface of the uppermost layer to a surface area of the uppermost layer, when the pores are observed from a normal direction, is in a range of 1% to 70%.

6. A dielectric multilayer film composed of a plurality of layers formed on a substrate, wherein the plurality of layers includes at least one low refractive index layer and at least one high refractive index layer, wherein an uppermost layer farthest from the substrate is the low refractive index layer, wherein the high refractive index layer disposed on a substrate side of the uppermost layer is a functional layer containing a metal oxide with a photocatalytic function, wherein the uppermost layer is a hydrophilic layer containing a metal oxide with a hydrophilic function and has pores that partially expose a surface of the functional layer, and wherein a surface of the uppermost layer has an arithmetic mean roughness Sa in a range of 1 to 100 nm or a root mean square height Sq in a range of 1 to 100 nm.

7. A dielectric multilayer film composed of a plurality of layers formed on a substrate, wherein the plurality of layers includes at least one low refractive index layer and at least one high refractive index layer, wherein an uppermost layer farthest from the substrate is the low refractive index layer, wherein the high refractive index layer disposed on a substrate side of the uppermost layer is a functional layer containing a metal oxide with a photocatalytic function, wherein the uppermost layer is a hydrophilic layer containing a metal oxide with a hydrophilic function and has pores that partially expose a surface of the functional layer, and wherein the uppermost layer has a shape with a leaf vein structure.

8. The dielectric multilayer film according to any one of items 1 to 7, wherein the functional layer contains $TiO_2$.

9. The dielectric multilayer film according to any one of items 1 to 8, wherein the uppermost layer contains $SiO_2$.

10. The dielectric multilayer film according to any one of items 1 to 9, wherein a total layer thickness of the dielectric multilayer film is equal to or less than 500 nm.

11. The dielectric multilayer film according to any one of items 1 to 10, wherein a layer thickness of the functional layer is in a range of 10 to 200 nm.

12. The dielectric multilayer film according to any one of items 1 to 11, wherein the uppermost layer contains an element that has an electronegativity less than Si.

13. The dielectric multilayer film according to any one of items 1 to 12, wherein the uppermost layer contains sodium.

14. The dielectric multilayer film according to any one of items 1 to 13, wherein a film density of the uppermost layer is equal to or greater than 98%.

15. The dielectric multilayer film according to any one of items 1 to 14, wherein the uppermost layer is formed by ion assisted deposition.

16. A method for producing the dielectric multilayer film of any one of items 1 and 8 to 15, comprising: forming the at least one low refractive index layer and the at least one high refractive index layer as the plurality of layers;
forming the functional layer containing the metal oxide with the photocatalytic function as the high refractive index layer;
forming the hydrophilic layer containing the metal oxide with the hydrophilic function as the uppermost layer farthest from the substrate; and
forming the pores in the uppermost layer, the pores partially exposing the surface of the functional layer, the pores having an average width of 5 nm or more.

17. A method for producing the dielectric multilayer film of any one of items 2 and 8 to 15, comprising:
forming the at least one low refractive index layer and the at least one high refractive index layer as the plurality of layers;
forming the functional layer containing the metal oxide with the photocatalytic function as the high refractive index layer;
forming the hydrophilic layer containing the metal oxide with the hydrophilic function as the uppermost layer farthest from the substrate; and
forming the pores in the uppermost layer, the pores having an average depth of 10 to 300 nm and an average width of 5 to 1000 nm, the pores partially exposing the surface of the functional layer.

18. A method for producing the dielectric multilayer film of any one of items 3 and 8 to 15, comprising:
forming the at least one low refractive index layer and the at least one high refractive index layer as the plurality of layers;
forming the functional layer containing the metal oxide with the photocatalytic function as the high refractive index layer;
forming the hydrophilic layer containing the metal oxide with the hydrophilic function as the uppermost layer farthest from the substrate; and
forming the pores in the uppermost layer, the pores having a maximum valley depth Sv in a range of 10 to 300 nm and an average width in a range of 5 to 1000 nm, the pores partially exposing the surface of the functional layer.

19. A method for producing the dielectric multilayer film of any one of items 4 and 8 to 15, comprising:
forming the at least one low refractive index layer and the at least one high refractive index layer as the plurality of layers;
forming the functional layer containing the metal oxide with the photocatalytic function as the high refractive index layer;
forming the hydrophilic layer containing the metal oxide with the hydrophilic function as the uppermost layer farthest from the substrate; and
forming the pores in the uppermost layer, the pores partially exposing the surface of the functional layer, the microstructure portion other than the pores having an average period length in a range of 20 to 5000 nm.

20. A method for producing the dielectric multilayer film of any one of items 5 and 8 to 15, comprising:
forming the at least one low refractive index layer and the at least one high refractive index layer as the plurality of layers;
forming the functional layer containing the metal oxide with the photocatalytic function as the high refractive index layer;
forming the hydrophilic layer containing the metal oxide with the hydrophilic function as the uppermost layer farthest from the substrate; and
forming the pores in the uppermost layer, the pores partially exposing the surface of the functional layer, a total area of the pores observed from a normal direction being in a range of 1% to 70% of the surface area of the uppermost layer.

21. A method for producing the dielectric multilayer film of any one of items 6 and 8 to 15, comprising:
forming the at least one low refractive index layer and the at least one high refractive index layer as the plurality of layers;
forming the functional layer containing the metal oxide with the photocatalytic function as the high refractive index layer;
forming the hydrophilic layer containing the metal oxide with the hydrophilic function as the uppermost layer farthest from the substrate; and
forming the pores in the uppermost layer, an arithmetic mean roughness Sa being in a range of 1 to 100 nm, a root mean square height Sq being in a range of 1 to 100 nm, the pores partially exposing the surface of the functional layer.

22. A method for producing the dielectric multilayer film of any one of items 7 to 15, comprising:
forming the at least one low refractive index layer and the at least one high refractive index layer as the plurality of layers;
forming the functional layer containing the metal oxide with the photocatalytic function as the high refractive index layer;
forming the hydrophilic layer containing the metal oxide with the hydrophilic function as the uppermost layer farthest from the substrate; and
forming the pores in the uppermost layer, the pores partially exposing the surface of the functional layer, and forming the uppermost layer into the shape with the leaf vein structure.

23. The method for producing the dielectric multilayer film according to any one of items 16 to 22, wherein the forming of the pores comprises:
after forming the uppermost layers, forming a metal mask on a surface of the uppermost layer; and
forming the pores by etching the uppermost layer through the metal mask.

24. The method for producing the dielectric multilayer film according to item 23, wherein the forming of the metal mask comprises:
forming the metal mask that has a granular structure or a leaf vein structure or a porous structure and forming the pores by dry etching.

25. The method for producing the dielectric multilayer film according to item 23 or 24, wherein the metal mask is formed such that: silver is used for a metal of the metal mask; a film forming temperature is controlled within a range of 20° C. to 400° C.; and a thickness is controlled in a range of 1 to 100 nm.

26. The method for producing the dielectric multilayer film according to any one of items 16 to 25, further comprising: forming the dielectric multilayer film by ion assisted deposition or sputtering.

27. The method for producing the dielectric multilayer film according to item 26, wherein a heat of 300° C. or higher is applied during the ion assisted deposition.

28. An optical member comprising the dielectric multilayer film of any one of items 1 to 15.

29. The optical member according to item 28, wherein the optical member is any one of a lens, an antibacterial cover, an antifungal coating and a mirror.

30. The optical member according to item 28, wherein the optical member is an on-board lens.

Advantageous Effects of Invention

By the above-described means of the present invention, it becomes possible to provide a dielectric multilayer film that has low light reflectance, hydrophilicity and photocatalytic property and that is also excellent in properties such as salt water resistance and scratch resistance, and to provide a method for producing the same and an optical member using the same.

The mechanism of how the advantageous effects of the present invention are developed or work is presumed as follows.

The dielectric multilayer film of the present invention is composed of a plurality of layers formed on a substrate and includes at least one low refractive index layer and at least one high refractive index layer, wherein the uppermost layer farthest from the substrate is the low refractive index layer, the high refractive index layer disposed on the substrate side of the uppermost layer and is a functional layer containing a metal oxide with a photocatalytic function, and the uppermost layer is a hydrophilic layer containing a metal oxide with a hydrophilic function and has pores that partially expose the surface of the functional layer, and the average width of the pores is 5 nm or more.

With the configuration, it is possible to achieve the following objects.

1) Since the average width of the pores is 5 nm or more, the photocatalytic function of the lower layer can be efficiently exhibited, and it is not necessary to increase the amount of $TiO_2$ as a photocatalyst. As a result, the thinner functional layer improves the antireflection performance and also reduces the sensitivity of the antireflection performance to production error. Therefore, the film is suitable for mass production.

2) Since the average width of the pores is within the above-described range, the pores are not clogged in a high humidity environment, and the photocatalytic effect can be maintained for a long period of time.

3) By forming the uppermost layer by ion assisted deposition or sputtering, the microstructure of the low refractive index material forms a layer with a high film density. This improves the salt water resistance and the scratch resistance.

4) Since the uppermost layer contains a metal oxide with a hydrophilic function and has a high film density due to the above-described film forming method, the hydrophilic function is further improved. The water contact angle is small even in a high temperature and high humidity environment, and the superhydrophilicity can be maintained for a long period of time.

5) Furthermore, when the uppermost layer contains an element having an electronegativity smaller than Si, the hydrophilic function is further improved. Compared with a composition of pure $SiO_2$, it is presumed that $SiO_2$ with an incorporated alkali metal element has polarity in the arrangement of electrons, and this produces affinity with $H_2O$, which is a polar molecule. In particular, the difference in electronegativity between sodium and O is larger than the difference between Si and O, and this produces an electrical unevenness. It is presumed that when the content of sodium is in the range of 0.1% to 10% by mass, the largest electrical unevenness is produced, and water, which is a polar molecule, is attracted. In particular, $Li_2O$, which is a lithium oxide, and $Na_2O$, which is a sodium oxide, have a melting point that is relatively close to the melting point of $SiO_2$ and are advantageous as a mixed vapor deposition material in ease of forming a film simultaneously with $SiO_2$. Variation in the compositional ratio of the deposited film is also small.

In addition, when containing sodium, a product derived from the sodium can take in water in a high temperature and high humidity environment. Therefore, the superhydrophilicity can be maintained for a long period of time. That is, when containing sodium, NaOH derived from the sodium is deliquescent and tends to take in water from the external environment to become aqueous solution. It is assumed that the superhydrophilicity can be maintained for a long period of time by taking in water in a high temperature and high humidity environment.

DESCRIPTION OF EMBODIMENTS

Figure 1:
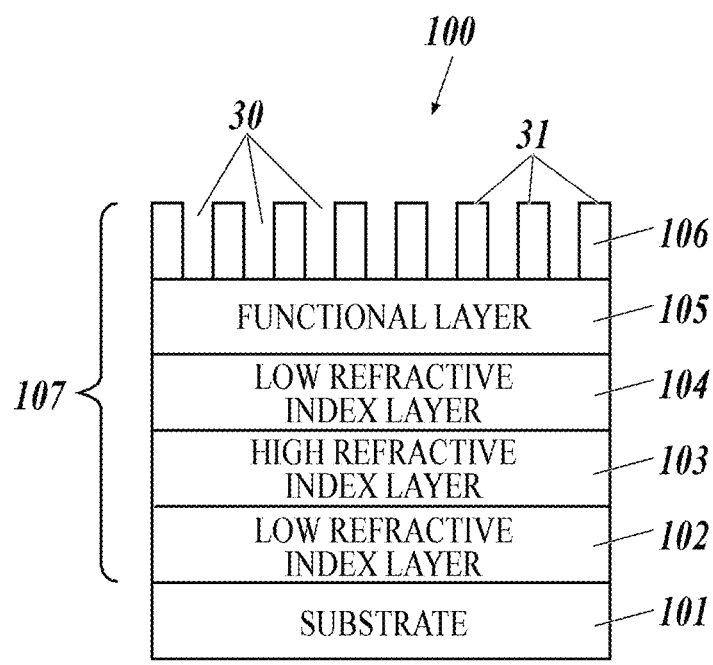
FIG. 1 is a cross-sectional view illustrating an example of the structure of the dielectric multilayer film of the present invention.
Figure 2:
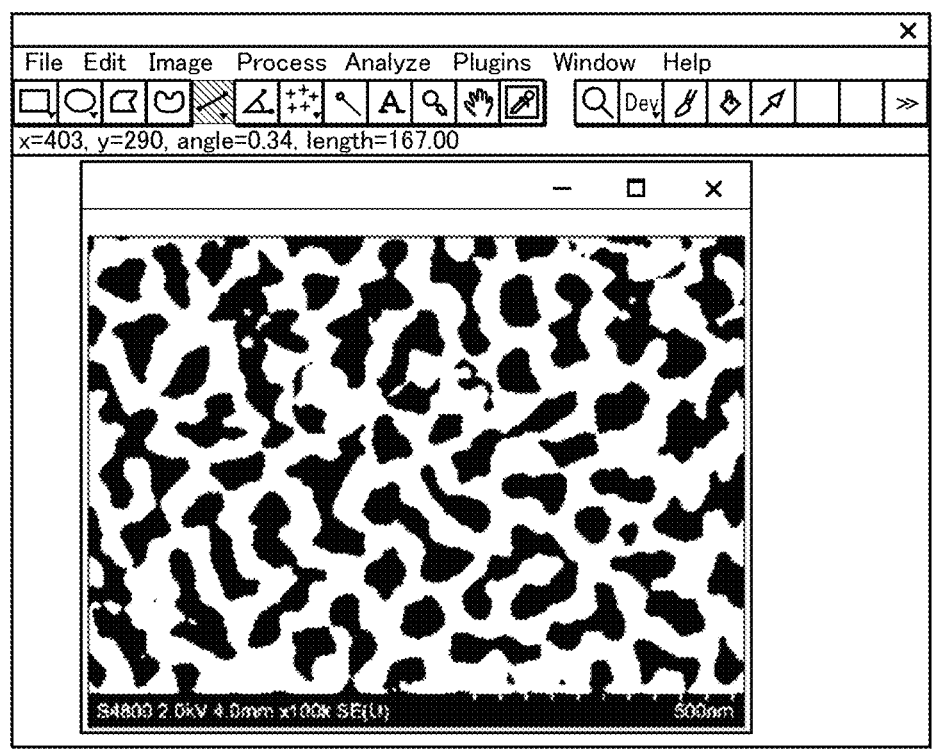
FIG. 2 is a screen image illustrating an example operation in an image analysis of pores of an uppermost layer captured by an electron microscope.

The dielectric multilayer film of the present invention is composed of a plurality of layers formed on a substrate, wherein the plurality of layers includes at least one low refractive index layer and at least one high refractive index layer, wherein an uppermost layer farthest from the substrate is the low refractive index layer, wherein the high refractive index layer disposed on a substrate side of the uppermost layer is a functional layer containing a metal oxide with a photocatalytic function, wherein the uppermost layer is a hydrophilic layer containing a metal oxide with a hydrophilic function and have pores that partially expose the surface of the functional layer, and wherein an average width of the pores is equal to or greater than 5 nm. This feature is a technical feature common to or corresponding to the following embodiments.

The dielectric multilayer film of the present invention has a variety of embodiments that have any of the following features.

The average depth of the pores is in the range of 10 to 300 nm, and the average width of the pores is in the range of 5 to 1000 nm.

The maximum valley depth Sv of the pores is in the range of 10 to 300 nm, and the average width of the pores is in the range of 5 to 1000 nm.

The average period (cycle) length of the microstructure portion other than the pores is in the range of 20 to 5000 nm.

The area ratio of the pores on the surface of the uppermost layer to the surface area of the uppermost layer, when the pores are observed from the normal direction, is in the range of 1 to 70%.

The surface of the uppermost layer is characterized in that the arithmetic mean roughness Sa is in the range of 1 to 100 nm, or that the root mean square height Sq is in the range of 1 to 100 nm.

The uppermost layer is characterized by having a shape with a leaf vein structure.

In an embodiment of the present invention, from the viewpoint of exhibiting the advantageous effects of the present invention, it is preferred that the functional layer contains $TiO_2$ because it exhibits a photocatalytic function, and it is preferred that the uppermost layer contains $SiO_2$ in terms of a hydrophilic function. Further, $TiO_2$, which is a photocatalytic material, is preferable in terms of durability.

It is preferred that the total layer thickness of the dielectric multilayer film is equal to or less than 500 nm, and the layer thickness of the functional layer is in the range of 10 to 200 nm. This is because the thinner functional layer can improve the antireflection performance and reduce the sensitivity of the antireflection performance to production errors, which are suitable for mass production.

It is preferred that the uppermost layer contains an element having an electronegativity smaller than Si, particularly sodium. This is because the superhydrophilicity can be maintained for a long period of time. That is, alkali metal-incorporated $SiO_2$ has polarity in the electron arrangement and can attract water, which is a polar molecule.

When the uppermost layer contains sodium, NaOH, which is a product derived from the sodium, tends to take in water from the outer environment to become solution. Since the NaOH takes in water in a high temperature and high humidity environment, the superhydrophilicity can be maintained for a long period of time.

It is preferred that the film density of the uppermost layer is greater than 98%. This is because the salt water resistance can be improved. In particular, it is preferred that the uppermost layer is formed by ion assisted deposition. This is because the film density can be further increased.

The method of producing the dielectric multilayer film of the present invention is a method of forming a plurality of layers on a substrate. The method is characterized by involving the steps of: forming at least one low refractive index layer and at least one high refractive index layer as the plurality of layers; forming a functional layer mainly composed of a metal oxide with a photocatalytic function as the high refractive index layer; forming a hydrophilic layer containing a metal oxide with a hydrophilic function as the uppermost layer farthest from the substrate; and forming pores in the uppermost layer, in which the pores partially expose the surface of the functional layer and have an average width of 5 nm or more.

The method of producing the dielectric multilayer film of the present invention is characterized by involving a step of forming the pores in the uppermost layer, in which the pores have an average depth within the range of 10 to 300 nm and an average width within the range of 5 to 1000 nm and partially expose the surface of the functional layer.

The method of producing the dielectric multilayer film of the present invention is characterized by involving a step of forming the pores in the uppermost layer, in which the pores have a maximum valley depth Sv within the range of 10 to 300 nm and an average width within the range of 5 to 1000 nm and partially expose the surface of the functional layer.

The method of producing the dielectric multilayer film of the present invention is characterized by involving a step of forming the pores in the uppermost layer, in which the pores partially expose the surface of the functional layer, and the average period length of a microstructure portion, which is the portion other than the pores, is in the range of 20 to 5000 nm.

The method of producing the dielectric multilayer film of the present invention is characterized by involving a step of forming the pores in the uppermost layer, in which the pores partially expose the surface of the functional layer, and the ratio of the total area of the pores to the surface area of the uppermost layer, when the pores are observed from the normal direction, is within the range of 1% to 70%.

The method of producing the dielectric multilayer film of the present invention is characterized by involving a step of forming the pores in the uppermost layer, in which the pores have an arithmetic mean roughness SI within the range of 1 to 100 nm or a root mean square height Sq within the range of 1 to 100 nm and partially expose the surface of the functional layer.

The method of producing the dielectric multilayer film of the present invention is characterized by involving a step of forming the pores on the uppermost layer, in which the pores partially expose the surface of the functional layer, and forming the uppermost layer into a shape with a leaf vein structure.

It is preferred that the step of forming the pores involves, after the step of forming the uppermost layer, a step of forming a metal mask on the surface of the uppermost layer and a step of forming the pores by etching through the metal mask. This is because the shape and size of the pores can be suitably controlled.

Further, it is preferred that the step of forming the metal mask involves a step of forming a granular structure, a leaf vein structure or a porous structure in the metal mask and forming the pores by dry etching. This is because the desired pores can be formed with high accuracy.

Further, it is preferred that silver is used as the metal of the metal mask, and the film forming temperature and the thickness are controlled within the range of 20° C. to 400° C. and 1 to 100 nm respectively. This is because the desired pores can be formed with high accuracy. In another embodiment, it is further preferred that a second mask resistant to reactive etching or physical etching is formed on the metal mask of Ag. For example, a film of a mixture of $Ta_2O_5$ and $TiO_2$ (hereinafter referred to as H4) is formed to a thickness within a range of 0.5 to 5 nm. In this step, it is preferred to heat the H4 at 100° C. or higher for 1 minute or longer after the film formation. Heating at the high temperature expands gaps of the silver after the H4 film is formed. That is, even if the H4 film is formed in the grooves, it becomes possible to etch the groove portions because the grooves are expanded after the H4 film is formed.

It is preferred that the method involves a step of forming the dielectric multilayer film by ion assisted deposition or sputtering. This is because the overall scratch resistance is improved. In particular, a dense film of the uppermost layer can be formed, which improves the salt water resistance and the superhydrophilicity. It is particularly preferred to apply heat of 300° C. or higher during the ion assisted deposition.

The dielectric multilayer film of the present invention is suitably applied to an optical member. It is preferred that the optical member is a lens, an antibacterial cover, an antifungal coating or a mirror, particularly a on-board lens. This is because the advantageous effects of the present invention can be sufficiently utilized.

Hereinafter, the present invention and the components thereof, as well as the configurations and the embodiments to carry out the invention, will be described in detail. In the present description, when two numbers are used to indicate a range of value before and after "to", these numbers are included in the range as the lowest limit value and the upper limit value.

<<Outline of Dielectric Multilayer Film of Present Invention>>

The dielectric multilayer film of the present invention (herein after referred simply as the "multilayer film") is composed of a plurality of layers on a substrate, wherein the plurality of layers includes at least one low refractive index layer and at least one high refractive index layer, wherein an uppermost layer farthest from the substrate is the low refractive index layer, wherein the high refractive index layer disposed on a substrate side of the uppermost layer is a functional layer containing a metal oxide with a photocatalytic function, wherein the uppermost layer is a hydrophilic layer containing a metal oxide with a hydrophilic function and has pores that partially expose the surface of the functional layer, and wherein the pores have an average width of 5 nm or more.

The term "low refractive index layer" as used in the present invention means a layer having a refractive index for the d-line of less than 1.7. The high refractive index layer means a layer having a refractive index for the d-line of 1.7 or more. The substrate is an optical member made of resin or glass and may have any shape. The transmittance at an optical wavelength of 550 nm is desirably 90% or more.

The term "photocatalytic function" in the present invention means an organic matter decomposition effect by the photocatalyst. Specifically, when irradiated with ultraviolet light, photocatalytic $TiO_2$ releases electrons and produces active oxygen or hydroxyl radicals (—OH radicals). Then, organic substances are decomposed due to the strong oxidizing power of the active oxygen and hydroxyl radicals. By providing a functional layer containing $TiO_2$ to the dielectric multilayer film of the present invention, it is possible to prevent organic substances and the like attached to the optical member from contaminating the optical system as smear.

Whether or not a film has a photocatalytic effect can be determined by irradiating a sample colored with a marking pen with UV light in the cumulative amount of 20 J in an environment of 20° C. and 80% RH and evaluating the change in color by grades. Regarding self cleaning by ultraviolet irradiation, specific examples of photocatalytic performance tests include the methylene blue decomposition method (ISO 10678 (2010)) and the resazurin ink decomposition method (ISO 21066 (2018)).

Regarding the term "hydrophilic function" used in the present invention, "hydrophilic" means that the water contact angle between standard liquid (water) and the surface of the uppermost layer measured by the method specified by JIS R3257 is equal to or less than 30°, preferably equal to or less than 15°. In particular, in the present invention, the contact angle of 15° or less is defined as "superhydrophilic".

Specific measurement conditions are as follows. At a temperature of 23° C. and a humidity of 50% RH, about L of pure water, which is the standard liquid, is dropped onto a sample, five points on the sample are measured with a device G-1 manufactured by Elma Co., Ltd., and the average contact angle is calculated from the average of the measured values. The contact angle is measured within 1 minute after dropping the standard liquid.

The phrase "the uppermost layer has a leaf vein structure" used in the present invention means that when the surface of the uppermost layer is observed, the pores are formed in the shape of leaf veins, for example, as illustrated in FIGS. 2, 12 and 24A to 24C, etc.

FIG. 1 is a cross-sectional view illustrating an example structure of the dielectric multilayer film of the present invention. The number of low refractive index layers or high refractive index layers in the figure is merely an example, and is not limited to the illustrated example. Further, another thin film may be formed between the uppermost layer and the functional layer or on the uppermost layer as long as the advantageous effects of the present invention are not impaired.

A dielectric multilayer film 100 with an antireflection function includes, for example, a high refractive index layer 103 having a refractive index higher than that of a glass substrate 101 constituting the lens, and low refractive index layers 102 and 104 having a refractive index lower than that of the high refractive index layer. An uppermost layer 106 farthest from the substrate 101 is a low refractive index layer, and the high refractive index layer adjacent to the uppermost layer is a functional layer 105 mainly composed of a metal oxide with a photocatalytic function. The uppermost layer has pores 30 that partially expose the surface of the functional layer and a microstructure 31 other than the pores. These layers constitute a laminate 107. With this configuration, the photocatalytic function (self-cleaning property) of the functional layer 105 can be exhibited on the surface of the dielectric multilayer film through the uppermost layer 106. As used herein, the microstructure 31 other than the pores refers to the structural portion of the uppermost layer containing a metal oxide with a hydrophilic function that are left after the pores are formed by etching through a metal mask, which will described later.

The dielectric multilayer film of the present invention preferably has a multilayer structure in which the high refractive index layers and low refractive index layers are alternately laminated. It is preferred that the dielectric multilayer film of the present invention has an average light reflectance of 1% or less for light incident from the normal direction having a light wavelength within the range of 450 to 780 nm. This is because the visibility of an image captured through the on-board lens is improved. In the present invention, the dielectric multilayer film 100 is formed on the substrate 101 to form an optical member. The light reflectance can be measured by a reflectometer (USPM-RUIII) (manufactured by Olympus Corporation).

The uppermost layer 106 of the present invention is preferably a layer mainly composed of $SiO_2$, and the uppermost layer preferably contains an element having an electronegativity less than Si, particularly sodium, in the range of 0.5% to 10% by mass. More preferably, the content is in the range of 1.0% to 5.0% by mass. When such an element is contained, it is possible to maintain the superhydrophilicity for a long time.

As used herein, "mainly composed of $SiO_2$" means that 51% by mass or more, preferably 70% by mass or more, particularly 90% by mass or more of the total mass of the uppermost layer is composed of $SiO_2$.

The composition analysis of the uppermost layer of the present invention can be carried out according to a conventional method using the X-ray photoelectron spectroscopy analyzer (XPS) shown below.

(XPS Composition Analysis)
Device name: X-ray photoelectron spectroscopy analyzer (XPS)
Device model: Quantera SXM
Device manufacturer: ULVAC-PHI
Measurement conditions: X-ray source=monochromatic AlKα ray 25 W-15 kV
Degree of vacuum: 5.0×10 Pa
Depth profile analysis is performed by argon ion etching. The MULTIPAK manufactured by ULVAC-PHI is used for data processing.

The film density of the uppermost layer is preferably 98% or more, more preferably in the range of 98 to 100%. This is preferred from the viewpoint of developing the salt water resistance and the superhydrophilicity. In particular, it is preferred that the uppermost layer is formed by ion assisted deposition. This is because the film density can be further increased. In this process, it is more preferable to apply heat of 300° C. or more.

In this configuration, since the uppermost layer of the dielectric multilayer film has a high film density, it is possible to provide the dielectric multilayer film having excellent surface salt water resistance and capable of maintaining low water contact angle for a long period of time in a high temperature and high humidity environment.

<Method of Measuring Film Density>

As used herein, "film density" in the present invention means space filling density and is defined as the value p by the following Expression (A).

Space Filling Density $p$=(Volume of Solid Portion of Film)/(Total Volume of Film)     Expression (A)

The total volume of film is the sum of the volume of the solid portion of the film and the volume of the micropore portion of the film.

In the present invention, the film density can be determined by the following method.

(i) On a substrate of white plate glass BK7 ($\varphi$(diameter)=30 mm, t (thickness)=2 mm, manufactured by SCHOTT), only a layer containing $SiO_2$ and sodium (corresponding to the uppermost layer of the present invention) is formed, and the light reflectance of the uppermost layer is measured.

The film density defined in the present invention is measured before a etching treatment. This enables evaluation of the degree of atomic-level voids formed at the film formation.

(ii) The theoretical value of the light reflectance of a layer made of the same material as the uppermost layer is calculated by a thin film calculation software (Essential Macleod, manufactured by Sigma Kouki Co., Ltd.).

(iii) The theoretical value of the light reflectance calculated in (ii) is compared to the light reflectance measured in (i) to specify the film density of the uppermost layer.

The light reflectance can be measured by a reflectometer (USPM-RUIII, manufactured by Olympus Corp.).

In FIG. 1, since the functional layer 105 mainly composed of a metal oxide with a photocatalytic function is disposed adjacent to (under) the uppermost layer 106, the photocatalytic function can be effectively exhibited. Further, since the metal oxide with a photocatalytic effect and a photoactive effect is used, oil and surface organic substances, which are major components of smear, can be removed, which can contribute to maintaining the superhydrophilicity of the uppermost layer 106. This is a preferred embodiment.

It is preferred that the metal oxide with a photocatalytic function is $TiO_2$. This is because $TiO_2$ has a high refractive index and can reduce the light reflectance of the dielectric multilayer film.

The dielectric multilayer film 100 of the present invention illustrated in FIG. 1 is formed by laminating a low refractive index layer, a high refractive index layer, a functional layer and the uppermost layer 106 of the present invention on a substrate 101 to form a laminated 107. However, the uppermost layers of the present invention may be formed on both sides of the substrate 101. That is, it is preferred that the uppermost layer of the present invention is on the side exposed to the external environment. However, for example, the uppermost layer of the present invention may not be formed on the exposed side but on the inner side, which is the opposite side from the exposed side, in order to prevent the influence of the internal environment. In addition to lenses, the optical member of the present invention is applicable to optical members such as antireflection members or heat shield members.

<<Image Analysis of Pores of Uppermost Layer>>

The uppermost layer of the present invention is characterized by having pores with a specific shape. Hereinafter, details of image analysis for identifying the characteristics of the pores will be described.

The image analysis method for analyzing the specific structure of the pores of the uppermost layer according to the present invention is not particularly limited. However, it is preferred to employ a first image analysis method (Method 1) using an electron microscope or a second image analysis method (Method 2) using an atomic force microscope (AFM). Among them, the second image analysis method using an atomic force microscope (AFM) is a more preferred because it is possible to obtain a sharp image as a texture image of the uppermost layer compared to the first image analysis method using an electron microscope.

In the present invention, the image analysis of the pores of the uppermost layer is performed at a random point of the uppermost layer. In the present invention, when the result of image analysis obtained at least at a part of the uppermost layer satisfies at least one of the numerical requirements of the present invention with regard to the width, depth, maximum valley depth, average period length, arithmetic mean roughness, root mean square roughness and area ratio of the pores, the pores have the features of the present invention.

<Measurement of Width, Depth, Maximum Valley Depth, Average Period Length, Arithmetic Mean Roughness, Root Mean Square Roughness and Area Ratio of Pores>

In the following description, the maximum valley depth Sv, arithmetic mean roughness Sa, and root mean square height Sq of the uppermost layer of the present invention are determined according to "ISO 25178", surface texture (surface roughness measurement), which is the international standard for surface roughness.

In order to develop the advantageous effects of the present invention, it is an essential requirement that the pores formed in the uppermost layer of the present invention have an average width measured by the above image analysis method of 5 nm or more.

In a preferred embodiment, the depth of the pores of the uppermost layer is in the range of 10 to 300 nm, and the average width of the pores is in the range of 5 to 1000 nm, which are measured by the above image analysis method. This is preferred from the viewpoint of sufficiently developing the photocatalytic function.

In a preferred embodiment, the maximum valley depth Sv of the pores of the uppermost layer is in the range of 10 to 300 nm, and the average width of the pores is in the range of 5 to 1000 nm, which are measured by the above image analysis method. This is preferred from the viewpoint of sufficiently developing the photocatalytic function. In the present invention, the maximum valley depth Sv of the pores of the uppermost layer is preferably determined by the second image analysis method using an AFM.

In a preferred embodiment, the average period length of the microstructure other than the pores of the uppermost layer, which is determined by the above image analysis method, is in the range of 20 to 5000 nm. This is a preferred from the viewpoint of further improving the salt water resistance and the superhydrophilicity achieved by densely disposing low refractive index material.

In a preferred embodiment, the ratio (area ratio) of the total area of the pores observed from the normal direction to the surface area of the uppermost layer, which is determined by the above image analysis method, is in the range of 1 to 70%. This is preferred from the viewpoint of achieving all of a photocatalytic effect, salt water resistance and superhydrophilicity by arranging a dense low refractive index material.

As the surface roughness information, the maximum valley depth Sv, arithmetic mean roughness Sa and root mean square height Sq can be determined from a texture image of the uppermost layer according to "ISO 25178", surface texture (surface roughness measurement), which is the international standard for surface roughness. In a preferred embodiment, the three-dimensional arithmetic mean roughness Sa of the pores is in the range of 1 to 100 inn, or the root mean square height Sq is in the range of 1 to 100 nm, which is determined by the above-described image analysis method. This is preferred from the viewpoint of sufficiently developing the photocatalytic function. In the present invention, the arithmetic mean roughness Sa and the root mean square height Sq of the uppermost layer are preferably determined by the second image analysis method using an AFM.

The shape of the pores may have a granular structure, a leaf vein structure or a porous structure, but the leaf vein structure is a preferable embodiment from the viewpoint of sufficiently developing the photocatalytic function.

Hereinafter, specific measurement methods for the first image analysis method using an electron microscope and the second image analysis method using an atomic force microscope (AFM) will be described.

[First Image Analysis Method Using Electron Microscope]

The first image analysis method using an electron microscope involves capturing an image of the pore structure of the uppermost layer with a scanning electron microscope (SEM) or a transmission electron microscope (TEM), and thereafter performing a structural analysis of the captured image with a free image processing software "ImageJ (ImageJ 1.32S produced by Wayne Rasband)".

Hereinafter, an example of the image analysis using an electron microscope will be described, in which the pores of the uppermost layer illustrated in FIG. 24 are formed by using a leaf vein metal mask.

1.1 Measurement of Average Pore Width

The average width of the pores formed in the uppermost layer is determined by image analysis of an electron micrograph including the following steps.

1) A surface SEM image of the uppermost layer, which is captured using a scanning electron microscope at a magnification of 30000 or more beforehand, is taken into a personal computer using the free software ImageJ. The SEM image can be changed by adjusting the focus, contrast or brightness. It is therefore preferred such adjustment is not artificially performed.

2) The definition of black and white is set.

When the black background is checked in the free software ImageJ, a brightness value 0 is shown as black while a brightness value 255 is shown as white. When the black background is not checked, a brightness value 0 is shown as white while a brightness value 255 is shown as black.

3) Noise in the image is removed.

Smoothing is performed.

4) Bandpass filter is applied.

For example, a recommended bandpass filter value is from 20 to 100. Since this value depends on the initial SEM image, it is preferred to suitably set an optimal value.

5) The image is binarized.

The setting is changed to obtain an 8-bit image, and a threshold is set. Regarding the threshold, the bar "above" (area selected as green) is set to the right end so that the area becomes 0% in the following setting. The threshold is adjusted so that the bar "Below" (area selected as blue) overlaps the black area corresponding to the pores.

Since the threshold varies depending on the contrast of the image, it is preferable that the threshold is not fixed but set by an analyst in every analysis.

Once the threshold is set, the image is converted to a black-and-white image. In the binarized image, the black portion represents the pores (30 in FIG. 1) while the white portion represents the microstructure (31 in FIG. 1) that excludes the pores and is made of the uppermost layer material (see FIG. 2).

6) Calibration is performed using the scale embedded in the SEM image. For example, in FIG. 2, 500 nm corresponds to a length of 167 on the screen.

7) A straight line L is randomly drawn on the image.

Figure 3:
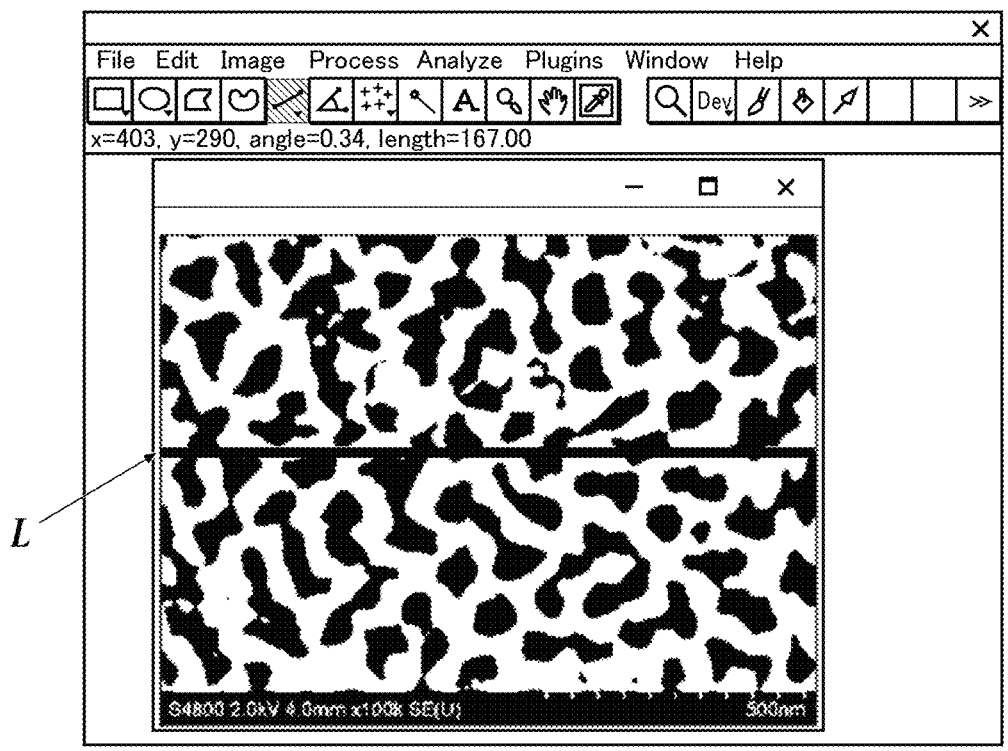
FIG. 3 is a screen image illustrating an example operation in the image analysis of pores of the uppermost layer captured by the electron microscope.

The straight line L is drawn so as to cross at least two pores (see, for example, the black line in FIG. 3).

Figure 4:
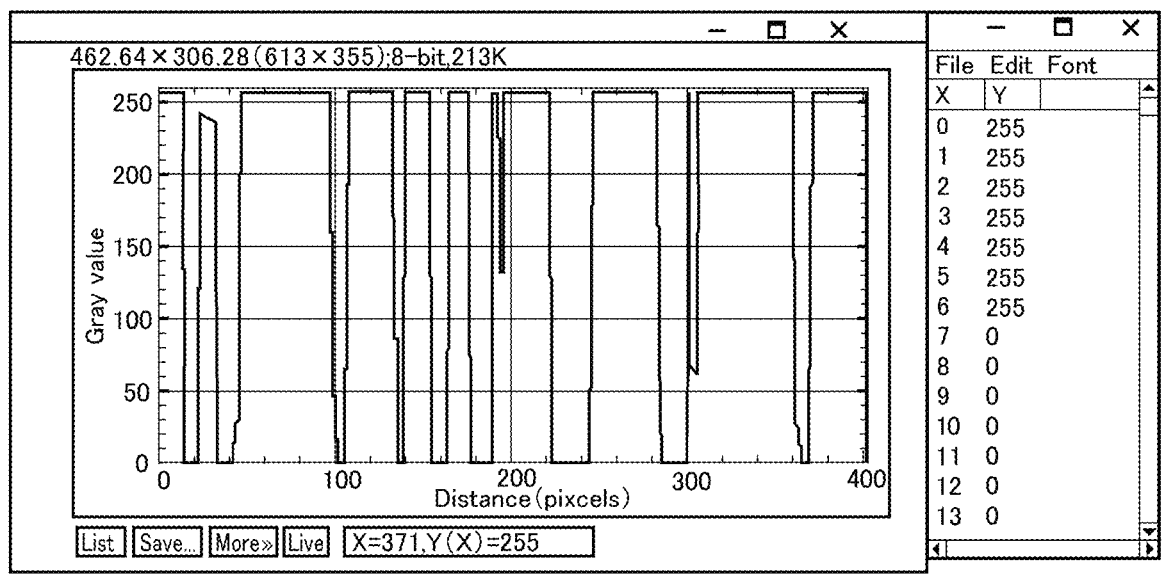
FIG. 4 is a screen image illustrating an example operation in the image analysis of pores of the uppermost layer captured by the electron microscope.

8) The profile along the cross section of the straight line is displayed (see FIG. 4).

(a) The number of pixels having a value of 0 is counted on the list data. In this case, 197 pixels have a value of 0. In the example in FIG. 4, there are 197 pixels that have Value=0 (i.e. black pixels).

(b) The number of valleys is counted ((number of lines crossing a median value of 125)/2). (Number of lines crossing a value of 125)=20, 20/2=10 (number of valleys)

(c) The average width of the valleys (pores) is obtained. 197 pixels/10 valleys=19.7 pixels, which can be considered as the average valley width.

(d) The obtained value is converted to a physical length.

In the example, the average valley length is 19.7 pixels, while the 500 nm corresponds to a length of 167 on the screen according to the calibration 6). Accordingly, the physical length of the straight line is:

$$19.7/167 \times 500 \text{ nm} = 59 \text{ mu}.$$

Therefore, it can be evaluated that the average width of the pores is 59 nm.

The measurement is carried out for 10 randomly selected straight lines, and the average value of all of them is defined as the average width of the pores according to the present invention. As used herein, the term "randomly" means that a straight line is drawn on the binarized image without specifying the direction thereof.

When the image to be analyzed includes information at the time of SEM image measurement, it is preferable to perform a step of removing the information or the like before the image analysis so that the analysis is not affected.

1.2 Measurement of Average Pore Depth

An image of a section including the cross section of the uppermost layer with the pores and the functional layer was captured with a transmission electron microscope (TEM: for example, JEM-300F, manufactured by JEOL Ltd., 300 kV condition), and the depth of the pores was measured from the captured image.

Specifically, a 50 nm thick ultrathin section of the uppermost layer is sliced by an ultramicrotome and observed under the transmission electron microscope (TEM). The portions that appear as white spots are considered as pore portions. Twenty pore portions are actually measured, and the average thereof is calculated as the average depth of the pores.

1.3 Measurement of Average Period Length of Microstructure Other than Pores)

The same operations as in steps 1) to 5) of the above-described "1.1 Measuring Average Width of Pores" is performed to binarize an image.

Figure 5:
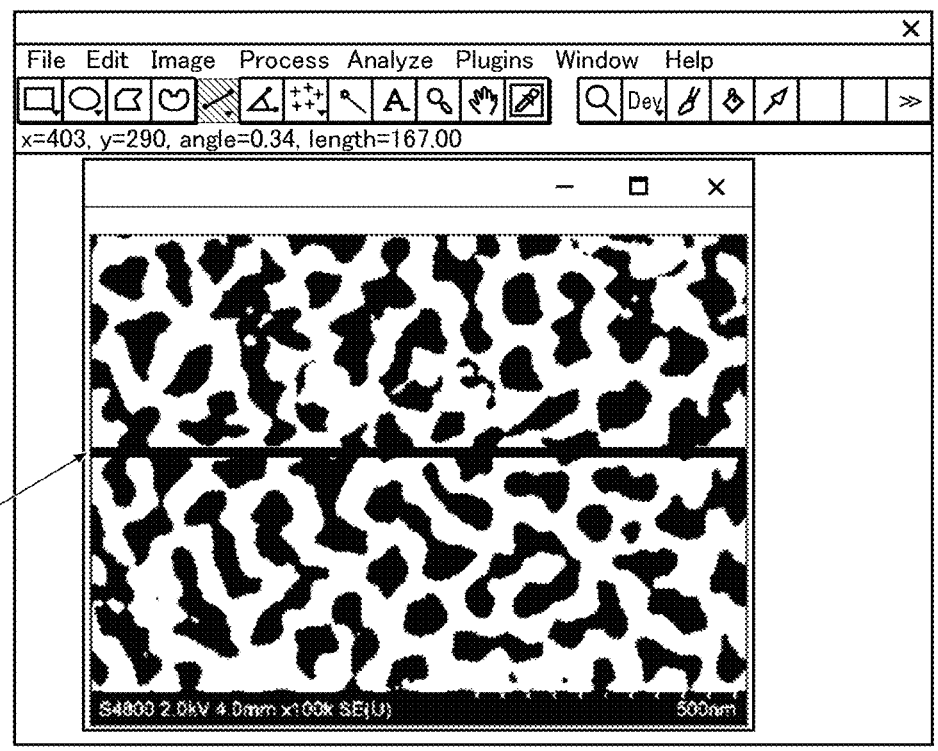
FIG. 5 is a screen image illustrating an example operation in the image analysis of pores of the uppermost layer captured by the electron microscope.

6) A straight line L is randomly drawn on the binarized image (see, for example, the black line in FIG. 5).

Figure 6:
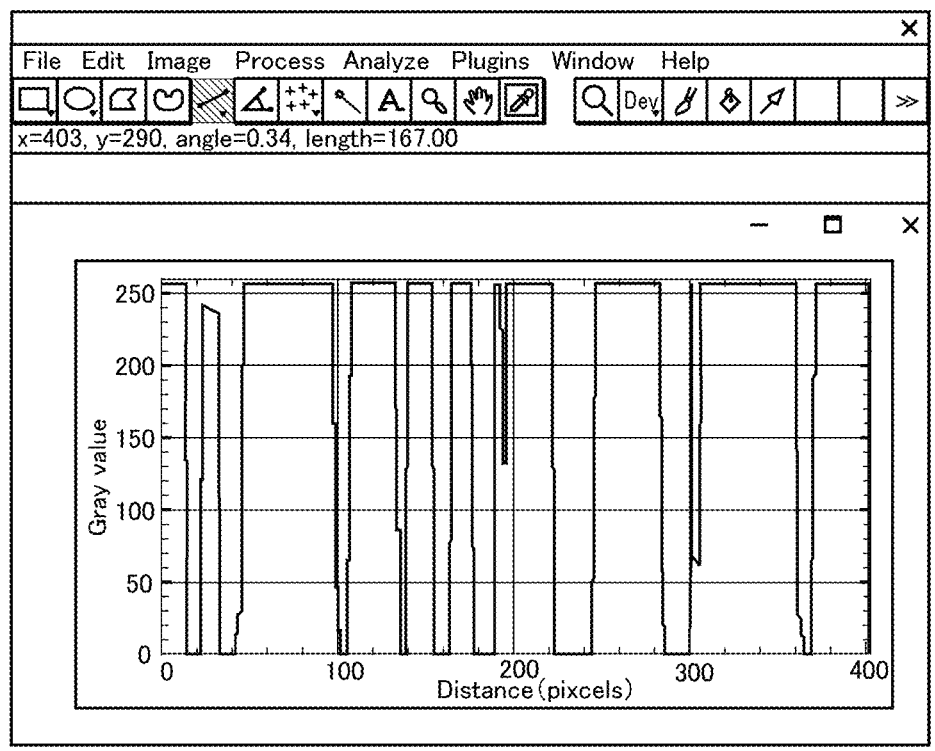
FIG. 6 is a screen image illustrating an example operation in the image analysis of pores of the uppermost layer captured by the electron microscope.

7) A profile of the cross section along this straight line L is displayed (see FIG. 6).

The number of peaks (number of lines crossing the median value of 125/2) is counted.

The number of lines crossing the median value of 125=20, 20/2=10, which is the number of peaks.

8) The length of the straight line L is 405, while 500 nm corresponds to a length of 167 on the screen according to the calibration. Accordingly, the physical length of the straight line L is determined as follows.

$$405/167 \times 500 \text{ nm} = 1212 \text{ nm}.$$

Since there are 10 peaks in this 1212 nm, the average period length of peak is 121.2 nm. It can be evaluated that the microstructure other than the pores has an average period length of 121 nm.

The measurement is performed for 10 randomly selected straight lines L, and the average of all is defined as the average period length of the present invention.

1.4 Measurement of Ratio (Area Ratio) of Total Area of Pores to Surface Area of Uppermost Layer when Pores are Observed from Above in Normal Direction)

1) A surface SEM image of the uppermost layer, which is captured at a magnification of 30000 or more beforehand, is taken into a personal computer using the free software ImageJ. The SEM image can be changed by adjusting the focus, contrast or brightness. It is therefore preferred such adjustment is not artificially performed.

2) to 5) The same operations as in steps 2) to 5) of the above "1.1 Measurement of Average Width of Pores" are performed to binarize the image.

6) The ratio between the pore area and the area of the other portion (low refractive index material portion), when the uppermost layer is observed from above in the normal direction, is analyzed.

Figure 7:
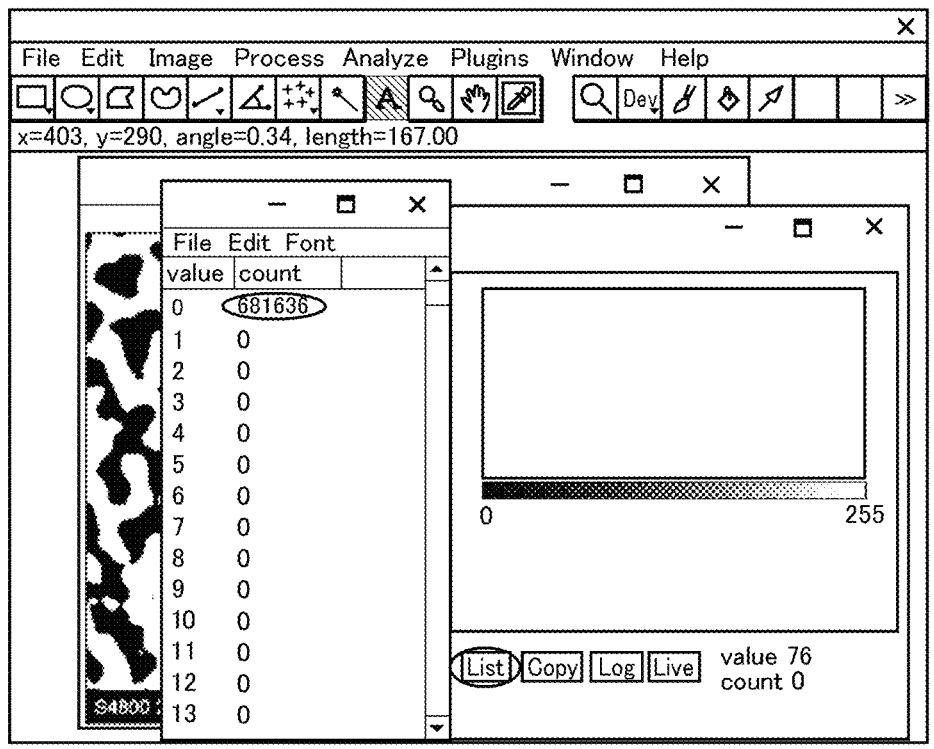
FIG. 7 is a screen image illustrating an example operation in the image analysis of pores of the uppermost layer captured by the electron microscope.
Figure 8:
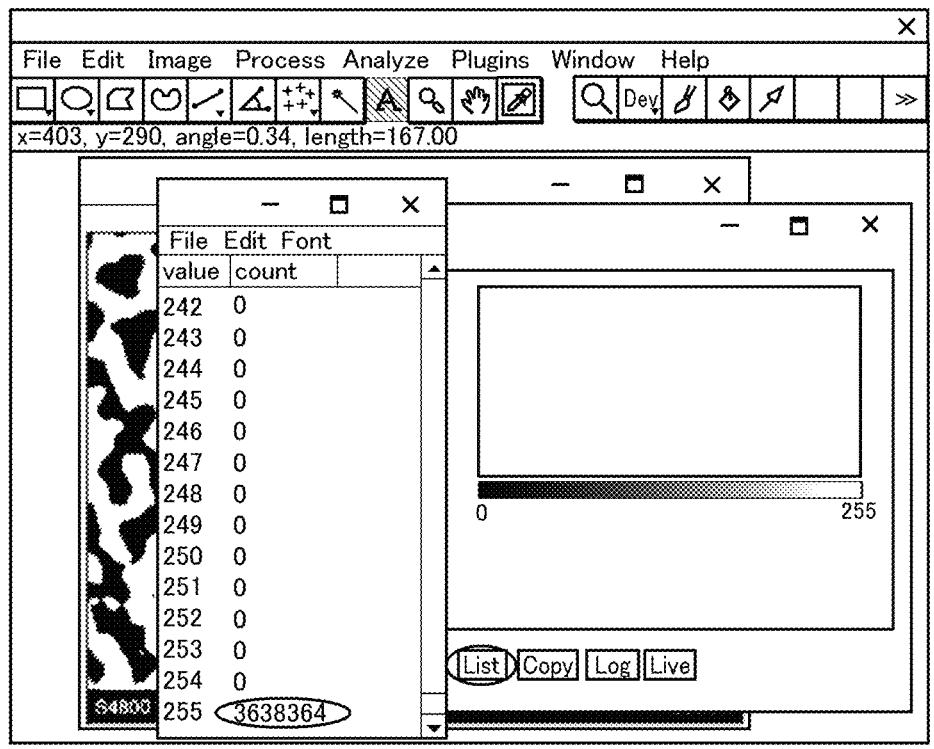
FIG. 8 is a screen image illustrating an example operation in the image analysis of pores of the uppermost layer captured by the electron microscope.
Figure 9:
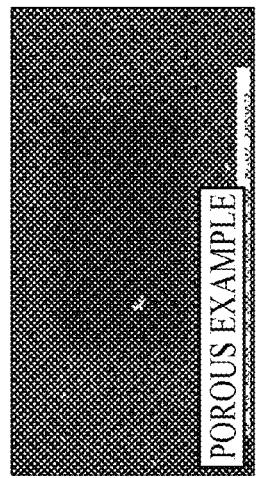
FIG. 9A is a screen image illustrating an example operation in an the image analysis (porous shape) of pores of the uppermost layer captured by an electron microscope.
FIG. 9B is a screen image illustrating an example operation in the image analysis (leaf vein shape) of pores of the uppermost layer captured by an electron microscope.
FIG. 9C is a screen image illustrating another example operation in the image analysis (porous shape) of pores of the uppermost layer captured by an electron microscope.
Figure 9:
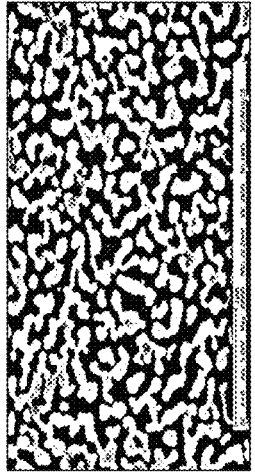
Figure 9:
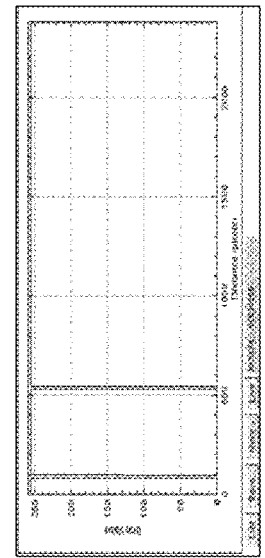
Figure 9:
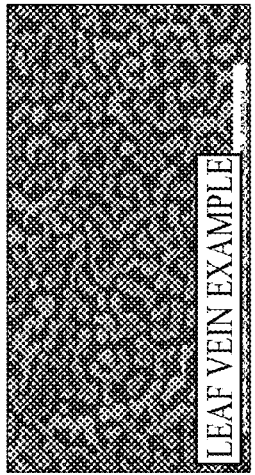
Figure 9:
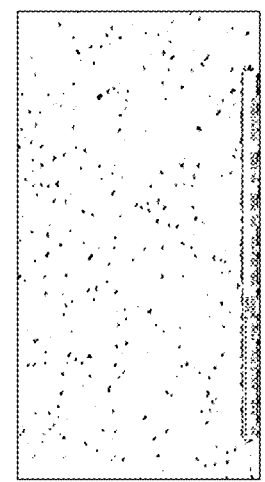
Figure 9:
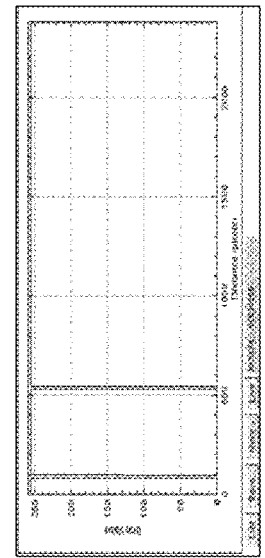
Figure 9:
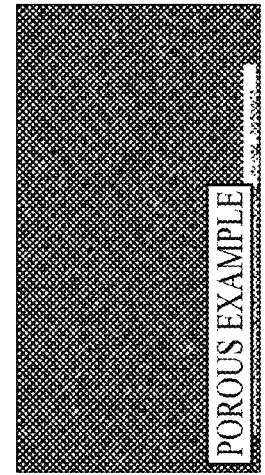
Figure 9:
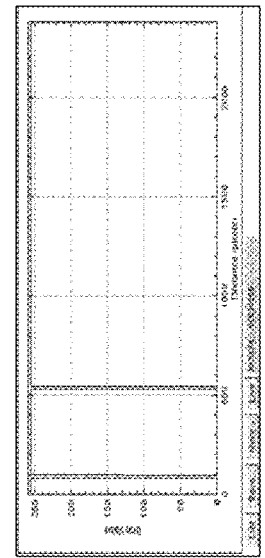
Figure 10:
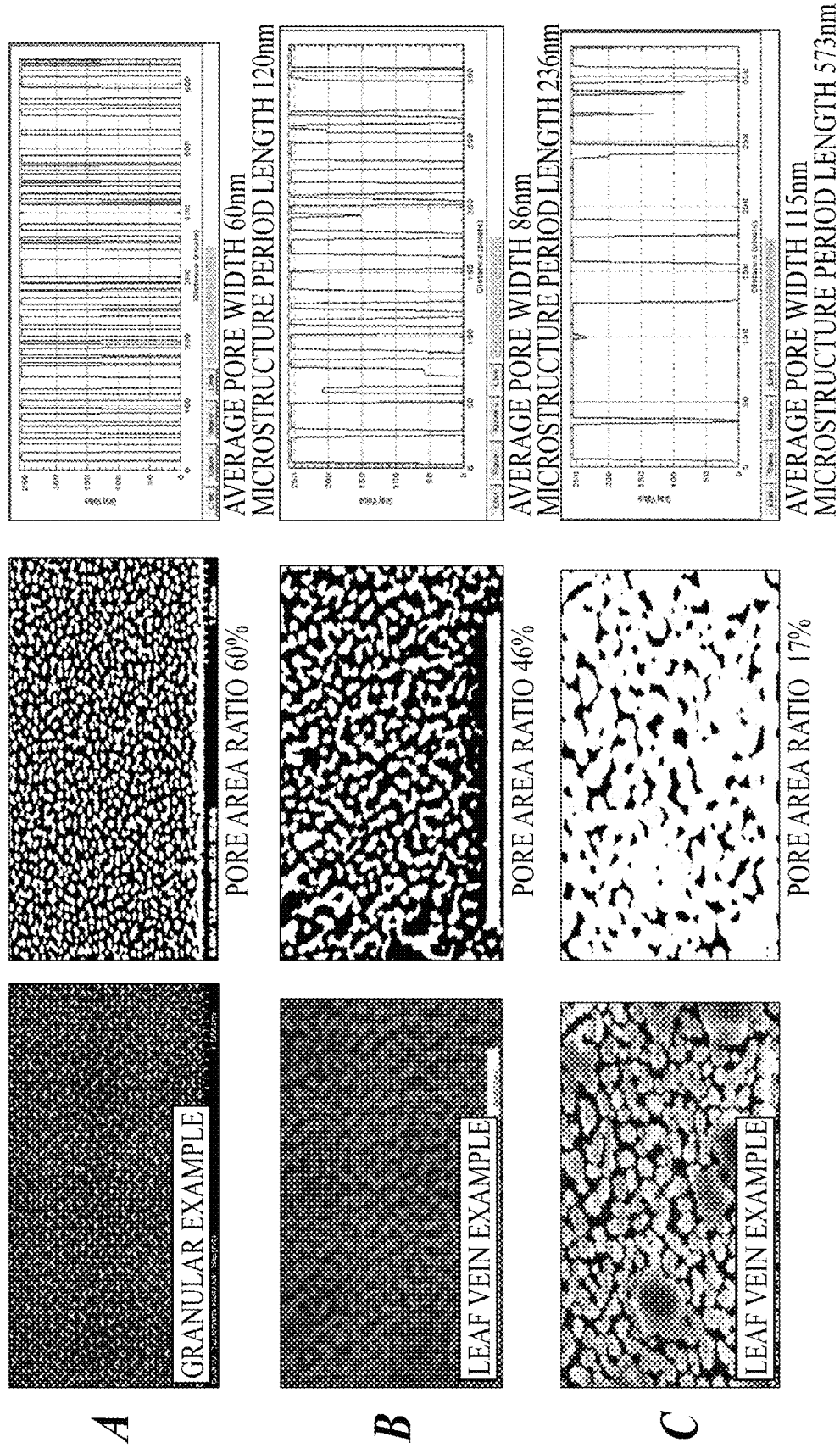
FIG. 10A is a screen image illustrating an example operation in the image analysis (granular shape) of pores of the uppermost layer captured by an electron microscope.
FIG. 10B is a screen image illustrating another example operation in the image analysis (leaf vein shape) of pores of the uppermost layer captured by an electron microscope.
FIG. 10C is a screen image illustrating another example operation in the image analysis (leaf vein shape) of pores of the uppermost layer captured by an electron microscope.

The ImageJ is operated to call a histogram (see FIGS. 7 and 8).

The histogram is displayed. Then, the list button indicated by the circle in FIG. 7 is pressed with a mouse to display a list of the histogram data. The number of pixels of each gray level is displayed.

In the example of FIG. 7, there are 681636 pixels that have Value=0 (i.e. black pixels).

Similarly, in the example of FIG. 8, there are 3638364 pixels that have Value=255 (i.e. white pixels).

7) The area ratio is determined.

Since the pores correspond to black pixels, the number of black pixels/(the number of white pixels+the number of black pixels)=the area ratio of the pores to the whole.

In the examples of FIGS. 7 and 8, {681636/(681636+3638364)}×100=16% is the area ratio of the pores.

When the image to be analyzed includes information at the time of SEM image measurement, it is preferable to perform a step of removing the information or the like before the image analysis so that the analysis is not affected.

Hereinafter, the results of the image analysis using electron micrographs of the uppermost layers with different pore shapes are illustrated in FIGS. 9A to 11.

FIG. 9A is an electron micrograph of porous pores of the uppermost layer, FIG. 9B is an electron micrograph of the leaf vein pores of the uppermost layer, and FIG. 9C is an electron micrograph of another example of porous pores of the uppermost layer.

FIG. 10A is an electron micrograph of the granular pores of the uppermost layer, FIG. 10B is an electron micrograph of the leaf vein pores of the uppermost layer, and FIG. 10C is an electron micrograph of another example of the porous pores of the uppermost layer.

Figure 11:
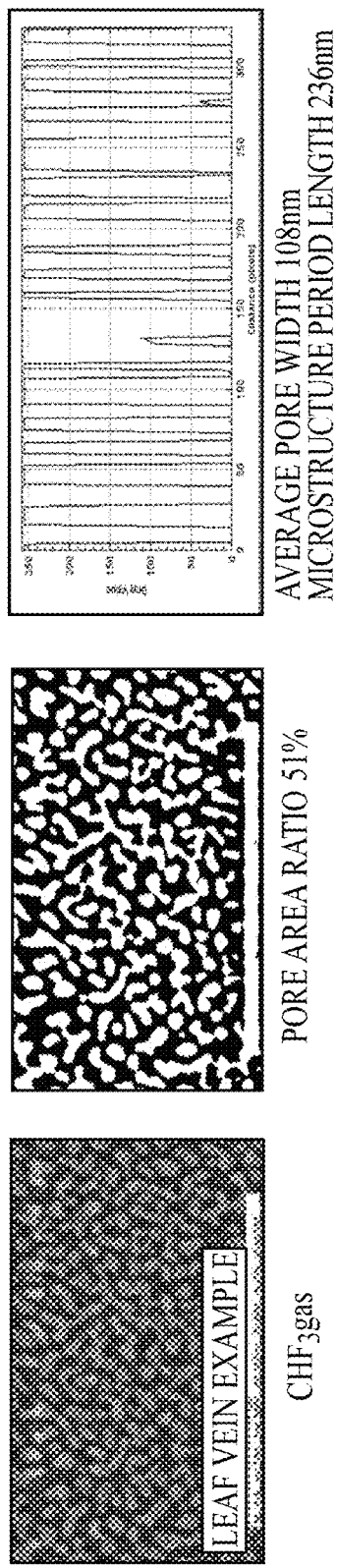
FIG. 11 is a screen image illustrating an example operation in the image analysis of pores of the uppermost layer captured by an electron microscope.

FIG. 11 is a screen image illustrating an example operation in the image analysis of an electron micrograph of the pores of the uppermost layer.

As illustrated in FIGS. 9A to 9C, FIGS. 10A to 10C and FIG. 11, the pores formed in the uppermost layer of the present invention can be measured by the image analysis of an electron micrograph according to the present invention with respect to the average width of the pores, the average period length of the microstructure portion other than the pores and the ratio (area ratio) of the total area of the pores observed from above in the normal direction to the surface area of the uppermost layer.

[Second Image Analysis Method Using Atomic Force Microscope (AFM)]

An atomic force microscope (AFM) is a type of scanning probe microscope (SPM), which is a method of measuring a nano-level uneven structure by utilizing the atomic force between a sample and a probe.

Specifically, the AFM measures the unevenness of the sample by bringing a cantilever, which is a micro spring plate with a sharp probe attached on the tip, close to a distance of several nm from the specimen surface and measuring an atomic force acting between the atoms at the tip of the probe and the atoms of the sample. The atomic force microscope (AFM) performs a scan while maintaining a constant atomic force, i.e. maintaining a constant deflection of the cantilever by giving feedback to the piezo scanner, and measures the amount of displacement fed back to the piezo scanner. The AFM thus measures the displacement in the Z-axis, i.e. the uneven structure of the surface.

Measurement by Atomic Force Microscope (AFM)

The Atomic Force Microscope (AFM) used in the present invention was the Multi Mode 8 manufactured by BRUKER, and the probe used was the Model RTESPA-150, which is a silicon probe also manufactured by BRUKER.

Figure 12:
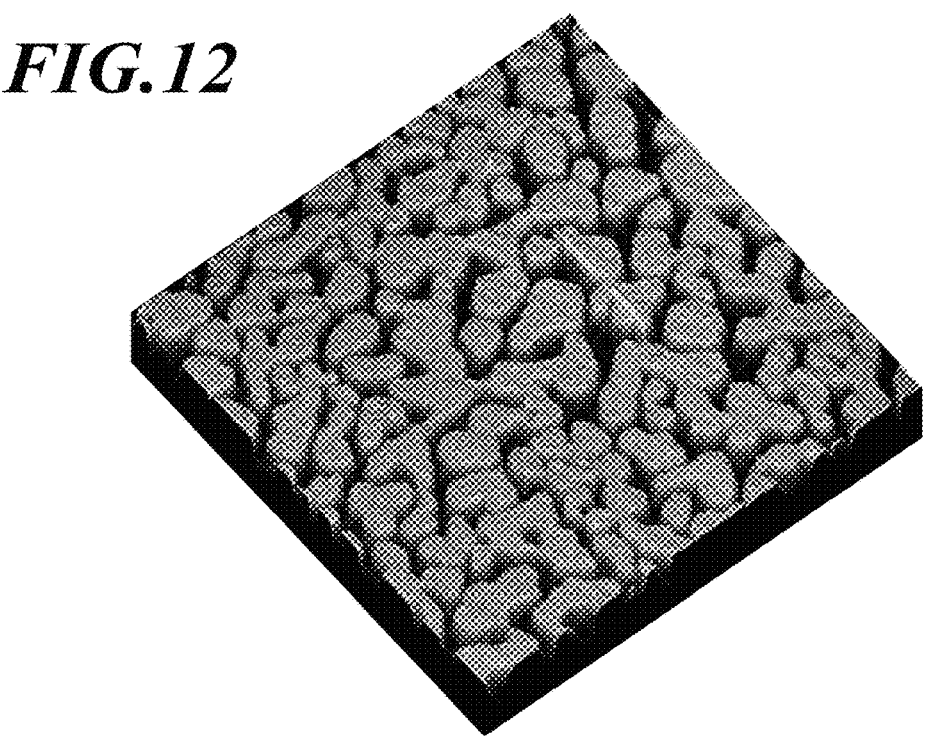
FIG. 12 is a screen image illustrating an example image of pores of the uppermost layer captured by an atomic force microscope.

A) Obtainment of Texture Image of Uppermost Layer of Dielectric Multilayer Film by AFM The uppermost layer of the dielectric multilayer film was measured using the above-described atomic force microscope (AFM) to obtain three-dimensional texture image data (see FIG. 12).

B) Binarization of AFM Data

The obtained AFM-measured image is binarized by using a software manufactured by BRUKER.

Figure 13:
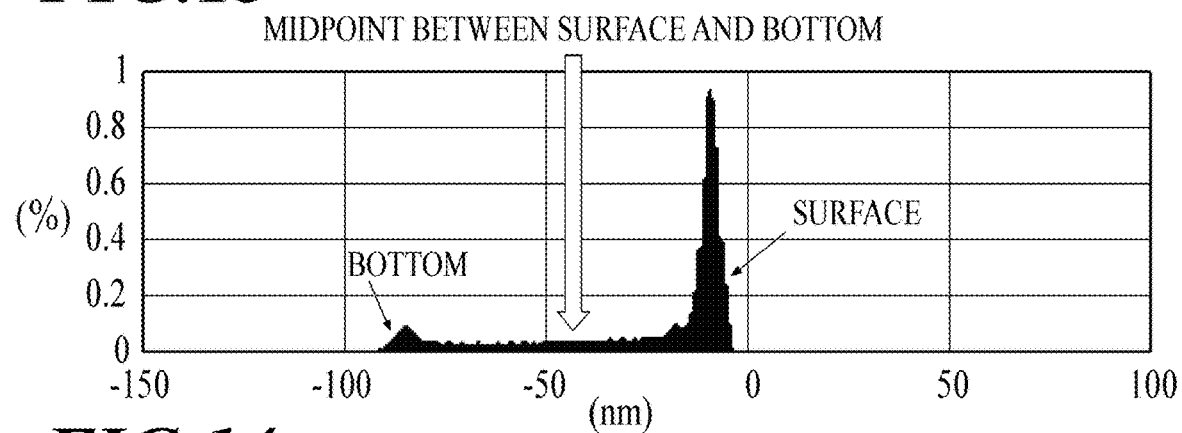
FIG. 13 is a screen image illustrating an example operation in an image analysis of pores of the uppermost layer captured by an atomic force microscope.
Figure 14:
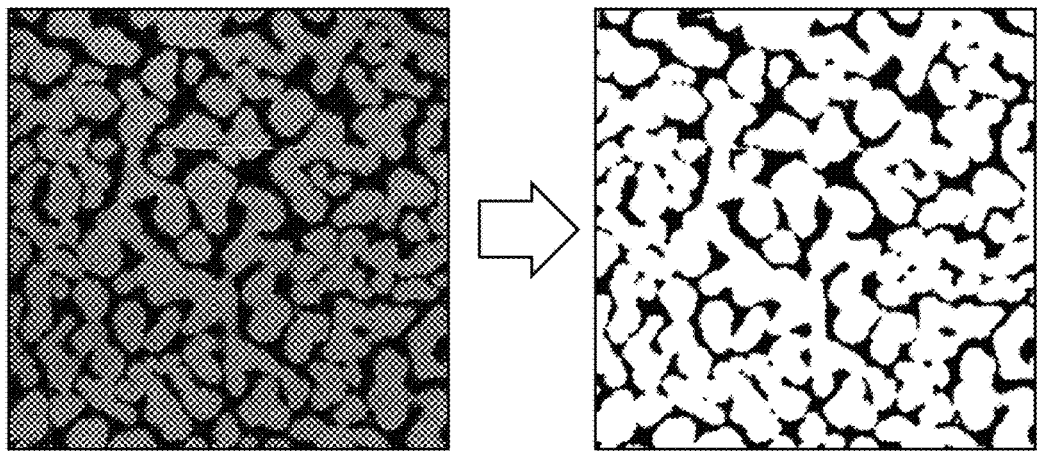
FIG. 14 is a screen image illustrating an example operation in the image analysis of pores of the uppermost layer captured by an atomic force microscope.

As shown in FIG. 13, binarization is performed with the midpoint between the front surface portion and the bottom surface portion of the pore as a threshold. Specifically, a region higher than the midpoint (threshold) is displayed in white, and a region lower than the midpoint is displayed in black (see FIG. 14).

As used in the present invention, a height with a largest number of data on the surface is defined as a surface while the height of the deepest data is defined as a bottom.

Next, the image thus created was subjected to the above-described free image analysis software ImageJ, and the average width of the pores, the average period length of the microstructure portion of the pores and the ratio of the total pore area are measured in the same manner.

The specific measurement method is shown below.

Figure 15A:
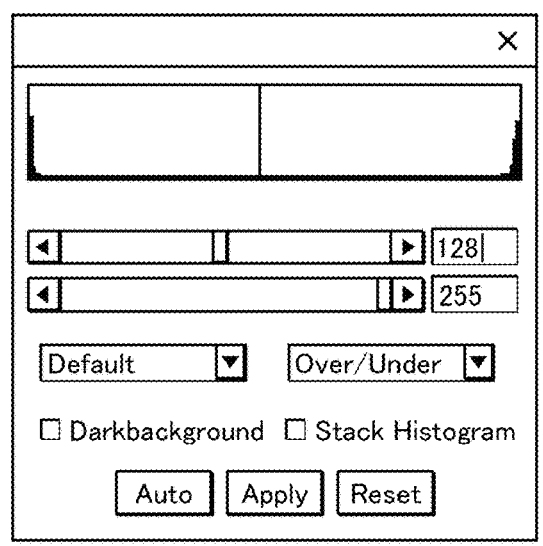
FIG. 15A is a screen image illustrating an example operation in the image analysis of pores of the uppermost layer captured by an atomic force microscope.
Figure 15B:
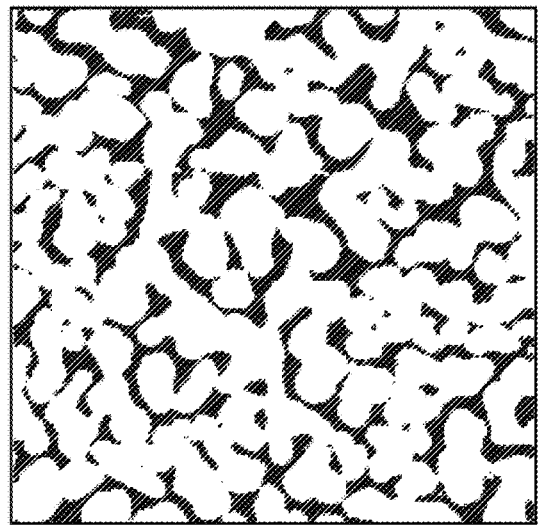
FIG. 15B is a screen image illustrating another example operation in the image analysis of pores of the uppermost layer captured by an atomic force microscope.
Figure 15C:
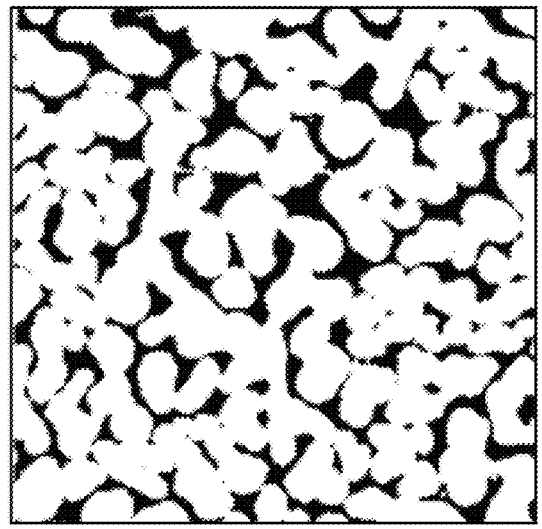
FIG. 15C is a screen image illustrating another example operation in the image analysis of pores of the uppermost layer captured by an atomic force microscope.

Although binarization has already been completed according to the above-described method, it is preferable to perform binarization also with the image processing software. The image is converted into an 8-bit image in default setting and binarized with a threshold=128 (see FIG. 15).

<Measurement of Period Length of Microstructure>

Figure 16A:
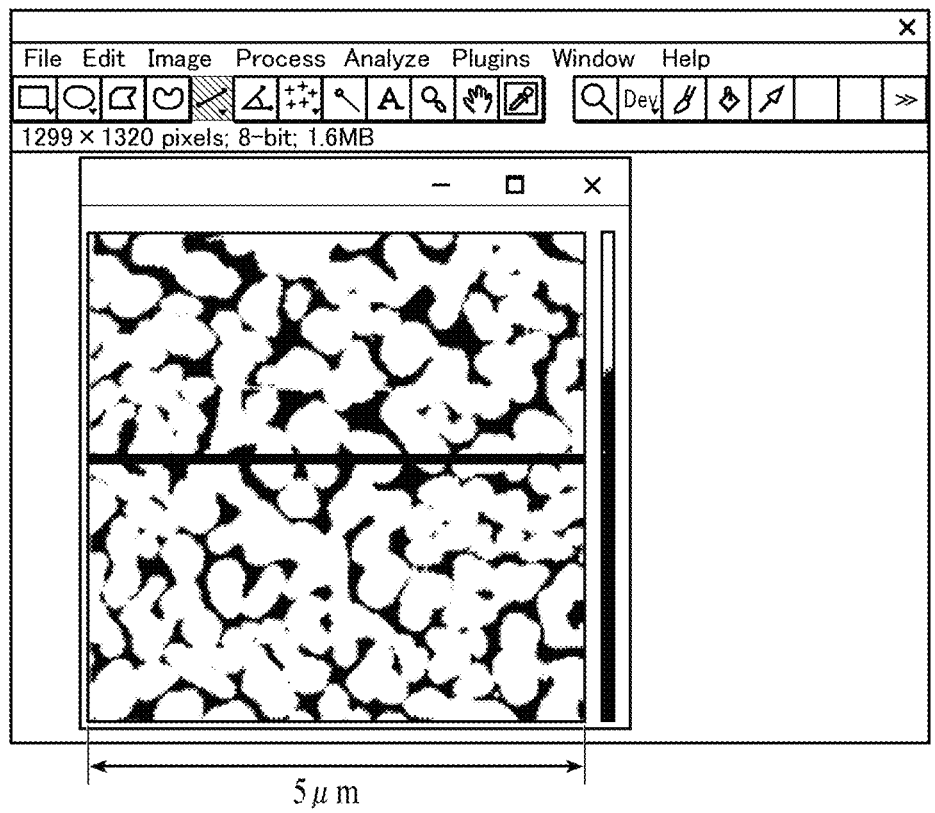
FIG. 16A is a screen image illustrating an example operation in the image analysis of pores of the uppermost layer captured by an atomic force microscope.
Figure 16B:
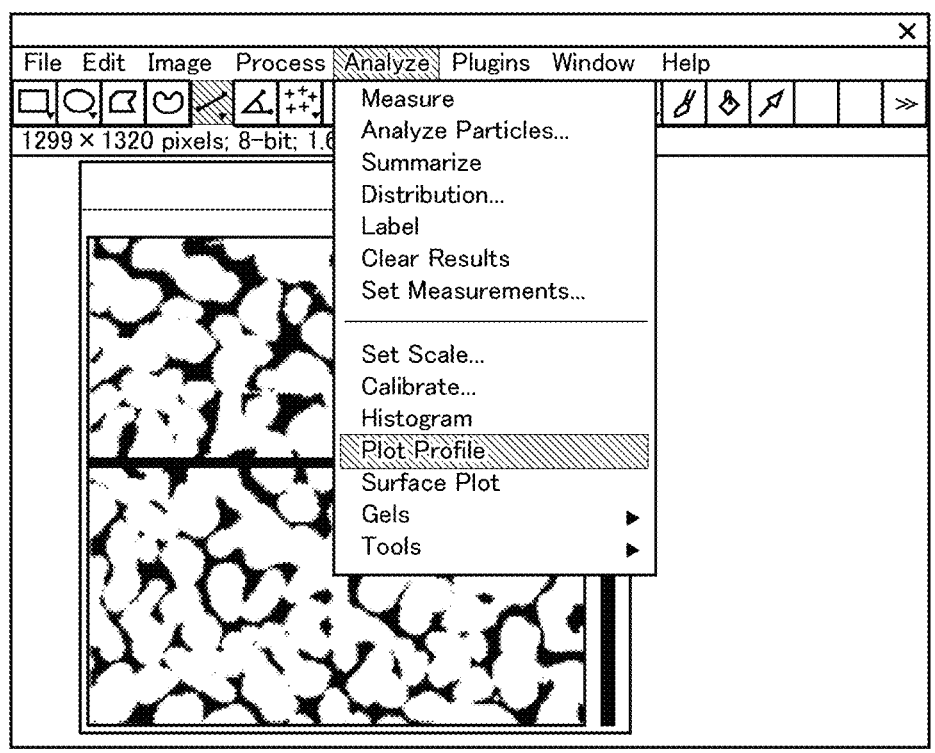
FIG. 16B is a screen image illustrating another example operation in the image analysis of pores of the uppermost layer captured by an atomic force microscope.

1) From the binarized AFM image, a cross section is randomly taken along the straight line L, and the Plot Profile is clicked (see FIG. 16).

2) The list button for the displayed cross section profile is pressed to obtain value data.

3) Next, the number of peaks (number of lines crossing a median of 125/2) is counted.

In the above-described example, the number of lines crossing a median of 125=20, and 20/2=10 (the number of peaks).

Next, the average period of the peaks and grooves is obtained by dividing the profile length of 5 μm by the number of peaks.

In the above-described example, the period length of the microstructure is 5 μm/10=500 nm.

<Measurement of Average Width of Pores>

First, pixel is associated with physical length. For example, when the number of pixels of a cross-sectional profile drawn in a measurement area of 5 μm is 1264 pixels, it can be found that 1 pixel=4 nm.

Next, in the above-described random profile data, a value of 128 or more, which is a half value, is determined to correspond to a wall area, and a value of less than 128 is determined to correspond to a groove area. Then, the number of data in the wall area is counted to calculate the total physical length of the wall area.

In the above example, the total physical length of the wall=924 pixels=3655 nm.

Next, the average length of the walls is determined by dividing the total physical length of the wall area by the number of walls. For example, in the above-described example, the number of walls is 10, and the average length of the walls is 3655 nm/10=365.5 nm.

The average length of the grooves can be calculated by the same steps as above. In the above example, the average length of the grooves was 133 nm.

<Measurement of Pore Area Ratio>

Figure 17A:
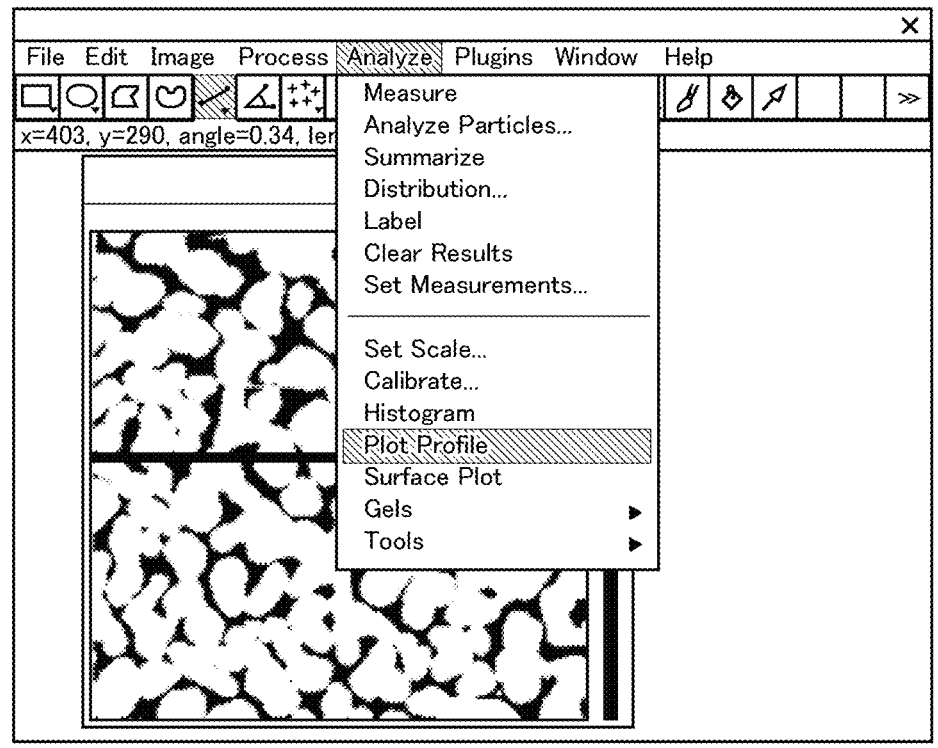
FIG. 17A is a screen image illustrating another example operation in the image analysis of pores of the uppermost layer captured by an atomic force microscope.
Figure 17B:
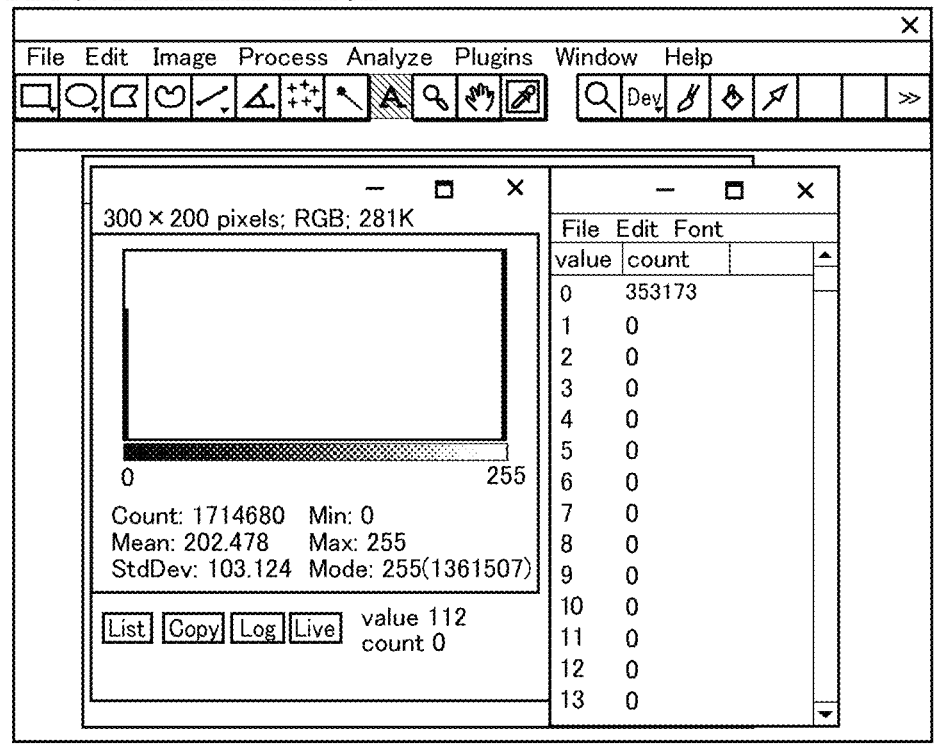
FIG. 17B is a screen image illustrating another example operation in the image analysis of pores of the uppermost layer captured by an atomic force microscope.

Next, the pore area ratio is measured. First, a histogram of the binarized image is created (see FIG. 17).

Then, as in the above-described method, a value of 128 or more, which is a half value, is defined as a wall area, and a value of less than 128 is defined as a groove area. Then, the ratio of the number of data in the groove area to the total number of data is calculated and obtained as the pore area ratio.

<Measurement of Maximum Valley Depth Sv, Arithmetic Mean Roughness Sa, Root Mean Square Height Sq by AFM>

From the texture image of the uppermost layer obtained by the atomic force microscope (AFM), the surface roughness information can be determined according to the "ISO 25178" surface texture (surface roughness measurement), which is the international standard for surface roughness. The surface roughness information includes the maximum valley depth Sv, the arithmetic mean roughness Sa, and the root mean square height Sq.

The maximum valley depth Sv is determined by determining the maximum value (absolute value) of the valley depth Rv from the average value of the surface of the contour curve along the reference length and expanding the measurement of Rv to a plane.

The arithmetic mean roughness Sa is the average value of the absolute values of the differences in height of points from the average plane of the surface.

The root mean square height Sq is a parameter which indicates the standard deviation of the distance from the average plane of the surface.

Figure 25:
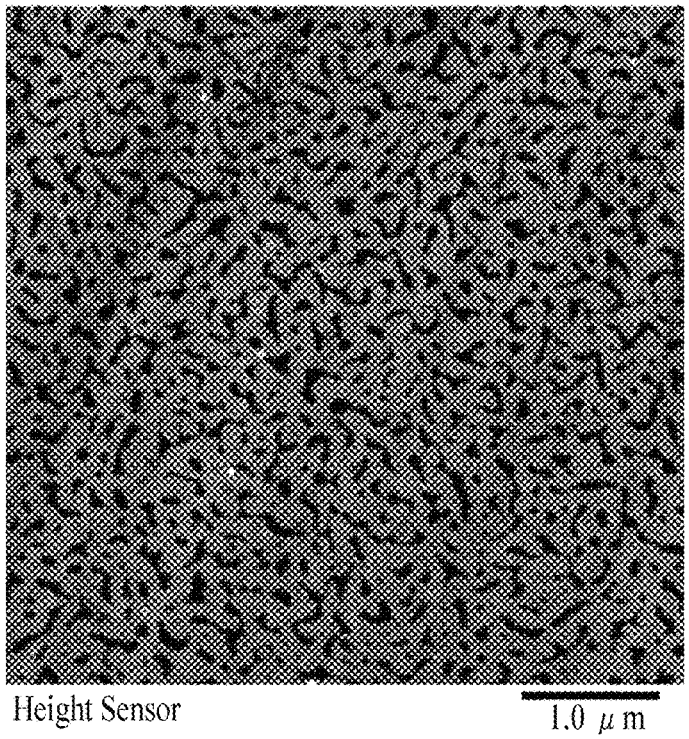
FIG. 25 illustrates an example of measuring by an AFM the fine surface roughness of the dielectric laminate produced in a second example.
Figure 26:
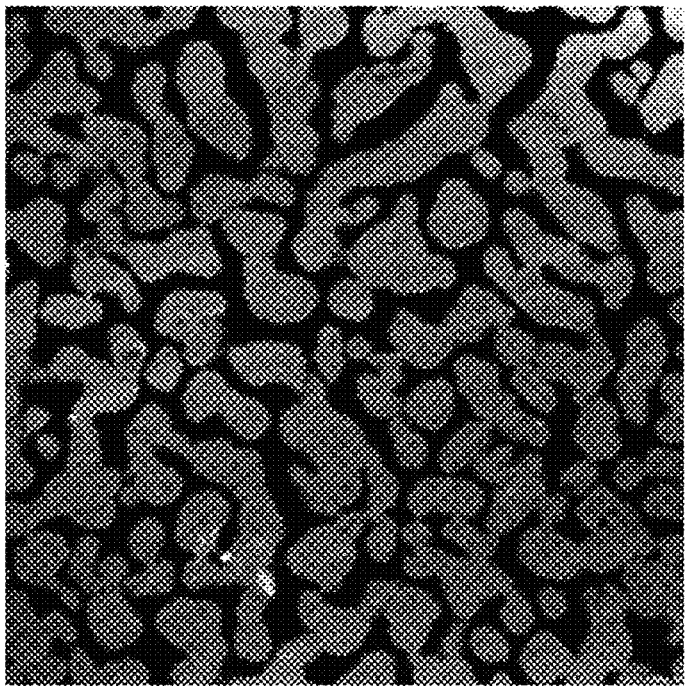
FIG. 26 illustrates another example of measuring by an AFM the fine surface roughness of the dielectric laminate produced in the second example.

FIGS. 25 and 26 illustrates examples of measurement data including maximum valley depth Sv, arithmetic mean roughness Sa, and root mean square height Sq determined by using the AFM.

FIG. 25 illustrates the data on a dielectric multilayer film 51, and FIG. 26 illustrates the data on a dielectric multilayer film 52, which were prepared in the second example described later.

<<Structure of Dielectric Multilayer Film and Method for Producing Same>>

Next, the structure of the dielectric multilayer film of the present invention and the features of the manufacturing method thereof will be described.

It is preferred that the dielectric multilayer film with an antireflection function includes a high refractive index layer having a refractive index higher than that of the substrate and a low refractive index layer having a refractive index lower than that of the high refractive index layer. Further, it is preferred that the high refractive index layers and the low refractive index layers are alternately laminated to form a laminate. The number of layers is not particularly limited but is preferably 12 or less from the viewpoint of maintaining high productivity and achieving a desired antireflection effect. That is, although the number of layers in the laminate depends on the required optical performance, when the film has a layered structure of approximately 3 to 8 layers, the reflectance can be reduced over the entire visible region. Regarding the upper limit, the number of layers is preferably 12 or less because it is possible to prevent the occurrence of interlayer separation even when the laminated structure is subjected to a large stress.

Preferred materials used for forming the laminate (high refractive index layers, low refractive index layers) of the present invention include, for example, oxides of Ti, Ta, Nb, Zr, Ce, La, Al, Si, Hf and the like or oxidized compounds of a combination thereof, and $MgF_2$. Further, by stacking a plurality of layers of different dielectric materials, it is possible to impart a function of reducing the reflectance over the entire visible region.

The low refractive index layers are made of a material that has a refractive index of less than 1.7. In the present invention, the low refractive index layers are preferably mainly composed of $SiO_2$. However, it is also preferable to contain other metal oxides, and a mixture of $SiO_2$ with $Al_2O_3$, and $MgF_2$ are also preferable from the viewpoint of light reflectance.

The high refractive index layers are made of a material that has a refractive index of 1.7 or more. For example, preferred materials include a mixture of a Ta oxide and a Ti oxide, and other Ti oxides, Ta oxides, a mixture of a La oxide and a Ti oxide, and the like. It is more preferred that the metal oxide used for the high refractive index layers has a refractive index of 1.9 or more. In the present invention, $Ta_2O_5$ and $TiO_2$ are preferred, and $Ta_2O_5$ is more preferred.

In the dielectric multilayer film of the present invention, the thickness of the entire laminate including the high refractive index layers and the low refractive index layers is not particularly limited, but is preferably 500 nm or less, more preferably in the range of 50 to 500 nm from the viewpoint of the antireflection performance. When the thickness is 50 nm or more, the optical characteristics for antireflection can be exhibited. When the thickness is 500 nm or less, the sensitivity to error is decreased, which can improve the good quality ratio in spectral characteristics of the lenses.

The method of producing the dielectric multilayer film of the present invention is a method of forming a plurality of layers on a substrate. The method is characterized by involving the steps of: forming at least one low refractive index layer and at least one high refractive index layer as the plurality of layers; forming a functional layer mainly composed of a metal oxide with a photocatalytic function as the high refractive index layer; forming a hydrophilic layer containing a metal oxide with a hydrophilic function as the uppermost layer farthest from the substrate; and forming pores in the uppermost layer in which the pores have an average width of 5 nm or more measured by image analysis of an electron micrograph and partially expose the surface of the functional layer.

The method of producing the dielectric multilayer film of the present invention is characterized by involving a step of forming the pores in the uppermost layer, in which the pores have an average depth within the range of 10 to 300 nm and an average width within the range of 5 to 1000 nm and partially expose the surface of the functional layer.

The method of producing the dielectric multilayer film of the present invention is characterized by involving a step of forming the pores in the uppermost layer, in which the pores have a maximum valley depth Sv within the range of 10 to 300 nm and an average width within the range of 5 to 1000 nm and partially expose the surface of the functional layer.

The method of producing the dielectric multilayer film of the present invention is characterized by involving a step of forming the pores in the uppermost layer, in which the average period length of a microstructure portion other than the pores is in the range of 20 to 5000 nm, and the pores partially expose the surface of the functional layer.

The method of producing the dielectric multilayer film of the present invention is characterized by involving a step of forming the pores that partially expose the surface of the functional layer, in which the ratio of the total area of the pores observed from the normal direction to the surface area of the uppermost layer is within the range of 1% to 70%.

The method of producing the dielectric multilayer film of the present invention is characterized by involving a step of forming the pores in the uppermost layer, in which the arithmetic mean roughness Si is within the range of 1 to 100 nm or the root mean square height Sq is within the range of 1 to 100 nm, and the pores partially expose the surface of the functional layer.

The method of producing the dielectric multilayer film of the present invention is characterized by forming the pores that have a leaf vein structure and partially expose the surface of the functional layer.

Methods of forming a thin film of a metal oxide or the like on a substrate for the high refractive index layer or the low refractive index layer include deposition methods know in the art such as vacuum vapor deposition, ion beam deposition, ion plating, etc. and sputtering methods known in the art such as sputtering, ion beam sputtering, magnetron sputtering and the like. Preferred film forming methods for forming the dielectric multilayer film of the present invention are ion assisted deposition (in the present invention, hereinafter also referred to as "IAD") and sputtering. In particular, it is preferred to form a dense layer by ion assist deposition as the uppermost layer.

The other layers of the dielectric multilayer film are formed by vapor deposition. It is preferable that one of the layers is formed by IAD, and it is more preferable that all the layers are formed by IAD. By forming the film by IAD, it is possible to further improve the scratch resistance of the entire dielectric multilayer film.

As described above, by forming the uppermost layer 106 by IAD, sputtering or the like, it is possible to increase the film density thereof.

The film density of the uppermost layer 106 is preferably 98% or more. As used herein, the film density means the space filling density as described above. When the film density of the uppermost layer 106 is in the range of 98% to 100%, the salt water resistance and the hydrophilicity can be further improved.

The IAD is a method of apply high kinetic energy of ions during film formation so as to form a dense film and enhance adhesion of the film. For example, such a method using an ion beam involves accelerating the material with ionized gas molecules emitted from an ion source to form a film on the surface of a substrate.

Figure 18:
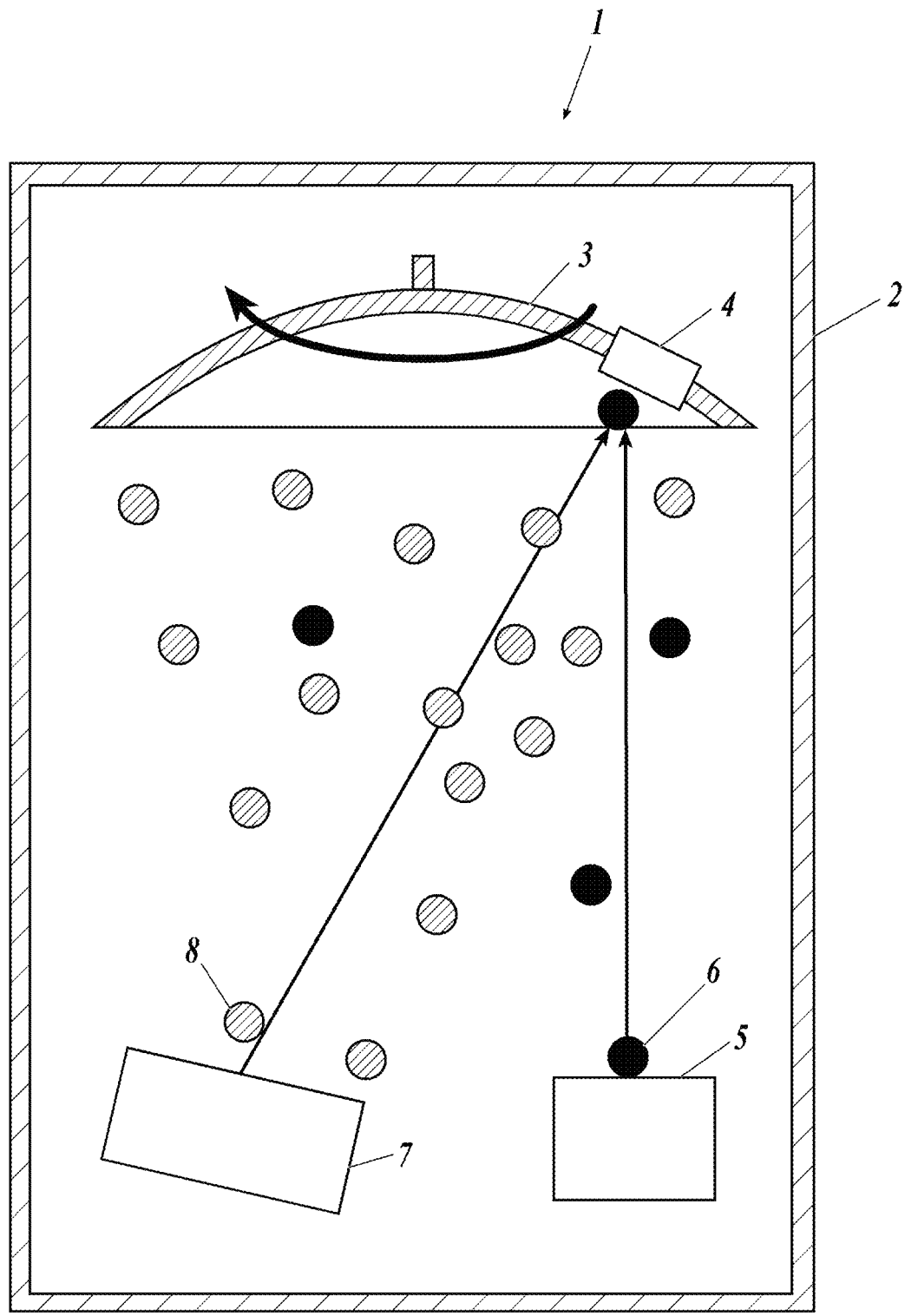
FIG. 18 is a schematic view of a vacuum vapor deposition device used in IAD.

FIG. 18 is a schematic view illustrating an example of a vacuum vapor deposition device for the IAD.

The vacuum vapor deposition apparatus 1 for the IAD (hereinafter, also referred to as an IAD vapor deposition device in the present invention) includes a dome 3 in a chamber 2 and is configured such that a substrate 4 is placed along the dome 3. An evaporation source 5 includes an electron gun or a resistance heating device that evaporates an evaporant. The evaporant 6 is scattered from the evaporation source 5 toward the substrate 4 and is condensed and solidified on the substrate 4. During this process, an ion beam 8 is emitted from an IAD ion source 7 toward the substrate to apply the high kinetic energy of ions during the film formation so to form a dense film and enhance adhesion of the film.

Examples of the substrate 4 used in the present invention include glass and resins such as polycarbonate and cycloolefin, and the substrate 4 is preferably an on-board lens.

A plurality of evaporation sources 5 is disposed at the bottom of the chamber 2. In the example, a single deposition source is illustrated as the deposition source 5. However, a plurality of deposition sources may be disposed as the evaporation sources 5. The evaporant 6 is produced from the film forming material (vapor deposition material) of the evaporation source 5 by an electron gun or resistance heating, and the produced vapor deposition material 6 is scattered and adhered to the substrate 4 (for example, lens) installed in the chamber 2. A layer made of the film forming material (for example, $SiO_2$, $MgF_2$, or $Al_2O_3$, which are low refractive index materials, or $Ta_2O_5$ or $TiO_2$, which are high refractive index materials, or the like) is thus formed on the substrate 4.

To form the uppermost layer 106 of the present invention that contains $SiO_2$, it is preferable to install an $SiO_2$ target to the evaporation source 5 to form a layer containing $SiO_2$ as a main component. In order to further improve the hydrophilic function, it is preferable to mix an element having an electronegativity lower than Si with the $SiO_2$. Examples of such elements having an electronegativity lower than Si include lithium, sodium, magnesium, potassium, calcium and the like.

To add sodium, a sodium-containing $SiO_2$ target is prepared and installed in an evaporation source, and can be directly vapor-deposited. Alternatively, an $SiO_2$ target and a sodium target may be installed separately, and $SiO_2$ and sodium can be vapor-deposited by co-deposition. In the present invention, it is preferred that a sodium-containing $SiO_2$ target is prepared and installed in the evaporation source and is directly vapor-deposited. This is preferred for increasing the accuracy of the content of sodium.

It is preferable to use $Na_2O$ as sodium, $Li_2O$ as lithium, and MgO as magnesium. Further, it is preferable to use $K_2O$ as potassium, and CaO as calcium. For any of them, commercially available product can be used.

Further, the chamber 2 is provided with a vacuum exhaust system (not shown) that evacuates the chamber 2. The degree of decompression in the chamber is typically in the range of $1\times10^{-4}$ to $1\times10^{-4}$ Pa, preferably $1\times10^{-3}$ to $1\times10^{-2}$ Pa.

The dome 3 holds at least one holder (not shown) for holding the substrate 4, and is also called a vapor deposition umbrella. The dome 3 has an arcuate cross section and has a rotationally symmetric shape about an axis that passes through the center of a chord connecting both ends of the arc and is perpendicular to the chord. For example, the dome 3 rotates about the axis at a constant speed so that the substrate 4 held by the dome 3 via the holder orbits around the axis at a constant speed.

The dome 3 can hold a plurality of holders that can be arranged in the radial direction of rotation (radial direction of revolution) and in the direction of rotation (revolutionary direction). This allows simultaneous film formation on a plurality of substrates 4 held by the plurality of holders, which can improve the production efficiency of the elements.

The IAD ion source 7 is a device that introduces argon gas or oxygen gas into the main body to ionize them and emits the ionized gas molecules (ion beam 8) toward the substrate 4. In order to prevent positive ions of the argon gas or oxygen gas emitted from the ion gun from being accumulated in the substrate and positively charging the entire substrate, a neutralizer that emits negative charges may be provided in the vicinity of the IAD ion source 7. The neutralizer has a role of electrically neutralizing the positive charges accumulated in the substrate.

As the ion sources, applicable are Kaufmann type (filament), hollow cathode type, RF type, bucket type, duoplasmatron type and the like. Since the above-described gas molecules are emitted from the IAD ion source 7 to the substrate 4, for example, the molecules of the film forming material evaporating from a plurality of evaporation sources can be pressed against the substrate 4, and a film having high adhesion and high density can be formed on the substrate 4.

The IAD ion source 7 is opposed to the substrate 4 on the bottom of the chamber 2. However, the IAD ion source 7 may be disposed off the right opposite position.

Examples of ion beams that can be used include an ion beam having an acceleration voltage in the range of 100 to 2000 V, an ion beam having a current density in the range of 1 to 120 $gA/cm^2$, or an ion beam having an acceleration voltage in the range of 500 to 1500 V and a current density in the range of 1 to 120 $gA/cm^2$. In the film forming step, the irradiation time of the ion beam can be, for example, in the range of 1 to 800 seconds, and the number of ion beam particles irradiated can be, for example, in the range of $1\times10^{13}$ to $5\times10^{17}$ particles/$cm^2$. The ion beam used in the film forming step can be an oxygen ion beam, an argon ion beam, or an ion beam of a mixed gas of oxygen and argon. For example, it is preferable that the amount of oxygen introduced is in the range of 30 to 60 sccm and the amount of argon introduced is in the range of 0 to 10 sccm. As used herein, the term "SCCM" is an abbreviation for standard cc/min, and is a unit that indicates how many cc flows per minute at 1 atm (atmospheric pressure, $10^{13}$ hPa) at 0° C.

A monitor system (not shown) is a system that monitors the wavelength characteristics of a layer being formed on the substrate 4 by monitoring a layer that evaporates from each evaporation source 5 and adheres to the monitor system itself during vacuum film formation. With this monitor system, it is possible to know the optical characteristics (for example, spectral transmittance, light reflectance, optical layer thickness, etc.) of the layer being formed on the substrate 4. The monitor system also includes a crystal layer thickness monitor and can monitor the physical layer thickness of the layer being formed on the substrate 4. This monitor system also functions as a controller that controls ON/OFF switching of the plurality of evaporation sources 5 and ON/OFF switching of the IAD ion source 7 according to the monitoring result of the layer.

As for film formation by sputtering, bipolar sputtering, magnetron sputtering, dual magnetron sputtering (DMS) using an intermediate frequency region, ion beam sputtering, ECR sputtering, etc. may be used alone or in combination of two or more. Further, a suitable method of application to the target is selected according to the target type, which can be either DC (direct current) sputtering or RF (radio frequency) sputtering.

The sputtering may be simultaneous multi-target sputtering using a plurality of sputtering targets. Regarding the method of producing the sputtering targets and the method of producing a thin film using the sputtering targets, a reference may be suitably made to, for example, JP-A-2000-160331, JP-A-2004-068109, JP-A-2013-047361 and the like.

When $SiO_2$ is used as the main component of the uppermost layer 106, it is preferable to form the film by the IAD with heating at 300° C. or higher, more preferably 370° C. or higher, from the viewpoint of further improving salt water resistance.

In the dielectric multilayer film of the present invention, it is preferable to dispose a layer containing $TiO_2$ adjacent to the uppermost layer 106 as a photocatalytic layer with a self-cleaning function. As described above, the self-cleaning function of $TiO_2$ refers to the effect of decomposing organic substances by a photocatalyst. Specifically, when irradiated with ultraviolet light, $TiO_2$ releases electrons to produce —OH radicals, and organic substances are decomposed due to the strong oxidizing power of the —OH radicals. By adding the $TiO_2$-containing layer to the dielectric multilayer film of the present invention, it is possible to prevent organic substances or the like attached to the optical member from contaminating the optical system as smears. In this regard, since the upper $SiO_2$-containing layer has pores according to the present invention, the —OH radicals readily move. This is preferred because the antifouling property of the surface of the optical member can be improved.

The dielectric multilayer film 100 of the present invention preferably satisfies the following conditional expressions (1) and (2).

$10\ nm \leq TL \leq 300\ nm$   Conditional Expression (1)

$10\ nm \leq Tcat \leq 600\ nm$   Conditional Expression (2)

where TL is the layer thickness of the uppermost layer 106. Tcat is the layer thickness of the functional layer 105 adjacent to the uppermost layer 106.

In the Conditional Expression (1), when TL is equal to or less than the upper limit, active oxygen excited by UV light is likely to be exchanged through the plurality of pores 30 in the uppermost layer 106. This facilitates exhibiting the photocatalytic effect.

In the conditional expression (1), when TL is equal to or greater than the lower limit, the hydrophilic function of the uppermost layer 106 is likely to be maintained, and the sufficient salt water resistance can be ensured since the robust uppermost film can be formed. It is preferable that the layer thickness of the uppermost layer of the dielectric multilayer film 100 further satisfies the following Conditional Expression (1b).

$60\ nm \leq TL \leq 250\ nm$   Conditional Expression (1b)

In the above Conditional Expression (2), when Tcat is equal to or greater than the lower limit, the layer thickness of the functional layer 105 can be secured, and a sufficient photocatalytic effect can be expected. The greater the thickness of the functional layer 105 is, the stronger a photocatalytic effect can be expected. However, it becomes more difficult to achieve the desired spectral characteristics required for the multilayer film. Accordingly, it is desired that Tcat in Conditional Expression (2) is equal to or less than the upper limit. It is preferable that the layer thickness of the functional layer 105 further satisfies the following Conditional Expression (2b).

$10\ nm \leq Tcat \leq 200\ nm$   Conditional Expression (2b)

The functional layer 105 adjacent to the uppermost layer 106 is formed from an oxide mainly composed of Ti (e.g. $TiO_2$). Ti oxides such as $TiO_2$ have very high photocatalytic effect. In particular, anatase-type $TiO_2$ is desirable as a material of the functional layer 105 because it has high photocatalytic effect.

It is preferred that the uppermost layer 106 is mainly composed of, for example, $SiO_2$. It is preferred that the uppermost layer 106 contains 90% by mass of $SiO_2$. At night-time or outdoors, the uppermost layer 106 is less likely to be irradiated with UV light, and an Ti-based oxide exhibits a decreased hydrophilic function. Even in such cases, the uppermost layer 106 formed from $SiO_2$ can exhibit a hydrophilic function and improves the salt water resistance. With regard to the hydrophilicity, as described above, it is preferred that the contact angle of 10 µL of water droplet dropped on the dielectric multilayer film 100 is 30° or less, preferably 15° or less, which is referred to as superhydrophilic.

Further, when $SiO_2$ is used for the uppermost layer 106, the scratch resistance is also improved by a heat treatment (also referred to as annealing) at 300° C. for 2 hours after the film formation.

The uppermost layer 106 may be formed from a mixture of $SiO_2$ and $Al_2O_3$ (provided that the composition ratio of $SiO_2$ is 90% by mass or more). In this case, the hydrophilic effect can be exhibited even at night or outdoors, and the use of a mixture of $SiO_2$ and $Al_2O_3$ can further enhance the scratch resistance. When a mixture of $SiO_2$ and $Al_2O_3$ is used for the uppermost layer 106, the scratch resistance can be improved by a heat treatment at 200° C. or higher for 2 hours after the film formation.

It is preferable that the dielectric multilayer film 100 satisfies the following Conditional Expression (3).

$1.35 \leq NL \leq 1.55$   Conditional Expression (3)

Where NL is the refractive index for the d-line of the material of the low refractive index layer.

When Conditional Expression (3) is satisfied, it is possible to obtain the dielectric multilayer film 100 having desired optical characteristics. As used herein, the d-line refers to light having a wavelength of 587.56 nm. As the material of the low refractive index layer, $SiO_2$ having a refractive index for the d-line of 1.48 and $MgF_2$ having a refractive index for the d-line of 1.385 can be used.

It is preferable that the dielectric multilayer film 100 satisfies the following Conditional Expression (4).

$1.6 \leq Ns \leq 2.2$   Conditional Expression (4)

Where Ns is the refractive index for the d-line of the base material.

In terms of optical design, when the refractive index for the d-line of the base material satisfies the above-described Conditional Expression (4), it is possible to improve the optical performance of the dielectric multilayer film 100 while achieving a compact configuration. By forming the dielectric multilayer film of the present invention on the glass base material GL that satisfies Conditional Expression (4), it can be used as a lens or the like exposed to an external environment while achieving both high environmental resistance and good optical performance.

It is preferable that the functional layer mainly composed of a metal oxide with a photocatalytic function is disposed adjacent to the uppermost layer of the present invention, and the uppermost layer has a plurality of pores that partially expose the surface of the functional layer.

FIGS. 19A to 19D are schematic views of the functional layer and the uppermost layer having the pores according to the present invention.

Figure 19A:
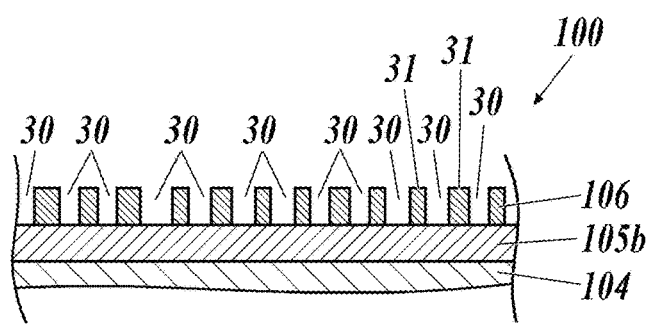
FIG. 19A is a cross-sectional view of a dielectric multilayer film in the production of which a granular metal mask is formed.
Figure 19B:
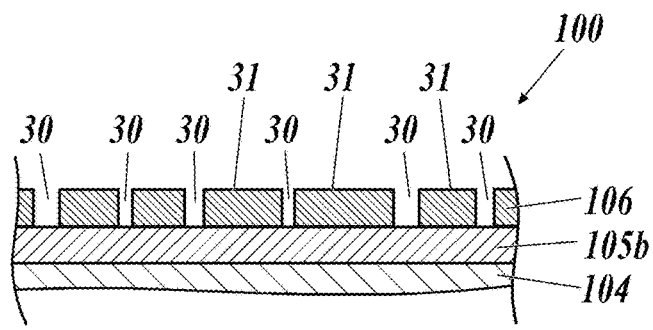
FIG. 19B is a cross-sectional view of a dielectric multilayer film in the production of which a leaf vein metal mask is formed.
Figure 19C:
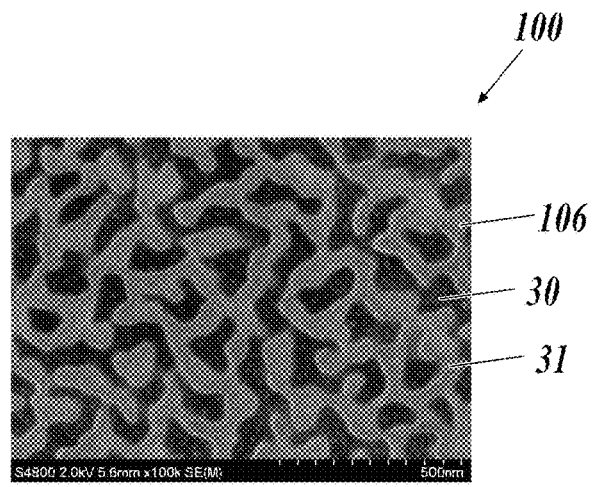
FIG. 19C is a SEM image of the surface of the uppermost layer in FIG. 19B.
Figure 19D:
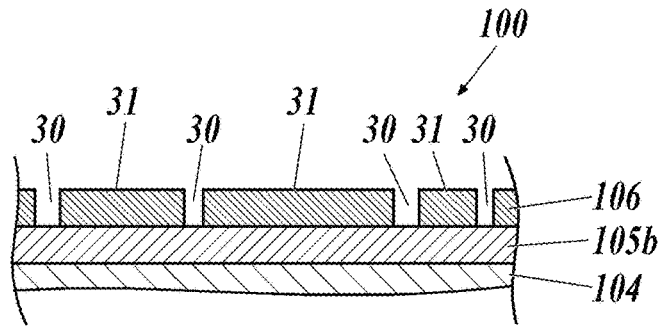
FIG. 19D is a cross-sectional view of a dielectric multilayer film in the production of which a porous metal mask is formed.

FIG. 19A schematically illustrates a cross section of the dielectric multilayer film 100 produced by forming the pores 30 with a granular metal mask, FIG. 19B schematically illustrates a cross section of the dielectric multilayer film 100 produced by forming the pores 30 with a leaf vein metal mask, FIG. 19C is a SEM image of the surface of the uppermost layer of FIG. 19B, and FIG. 19D schematically illustrates a cross section of the dielectric multilayer film produced by forming the pores 30 with a porous metal mask.

As shown in FIGS. 19A to 19D, the uppermost layer 106 has the plurality of pores 30 that allows the functional layer 105, which is the adjacent high refractive index layer, to exhibit the photocatalytic function. The pores 30 are formed by dry etching. The ratio of the total area of the transverse sections of the plurality of pores 30 (the total area of the pores 30 when the uppermost layer 106 is viewed from above in the normal direction) to the surface area of the uppermost layer 106 is hereinafter referred to as the pore density or the film missing ratio. For example, when the pores 30 are formed by using the leaf vein metal mask 50, the film missing ratio is preferably in the range of 5% to 30%. Further, the transverse sections of the pores 30 have a random shape.

Hereinafter, a method for forming the pores in the dielectric multilayer film 100 and the uppermost layer 100 will be described referring to FIGS. 20, 21A to 21E, 22A to 22E, 23A to 23D and 24A to 24C.

Figure 20:
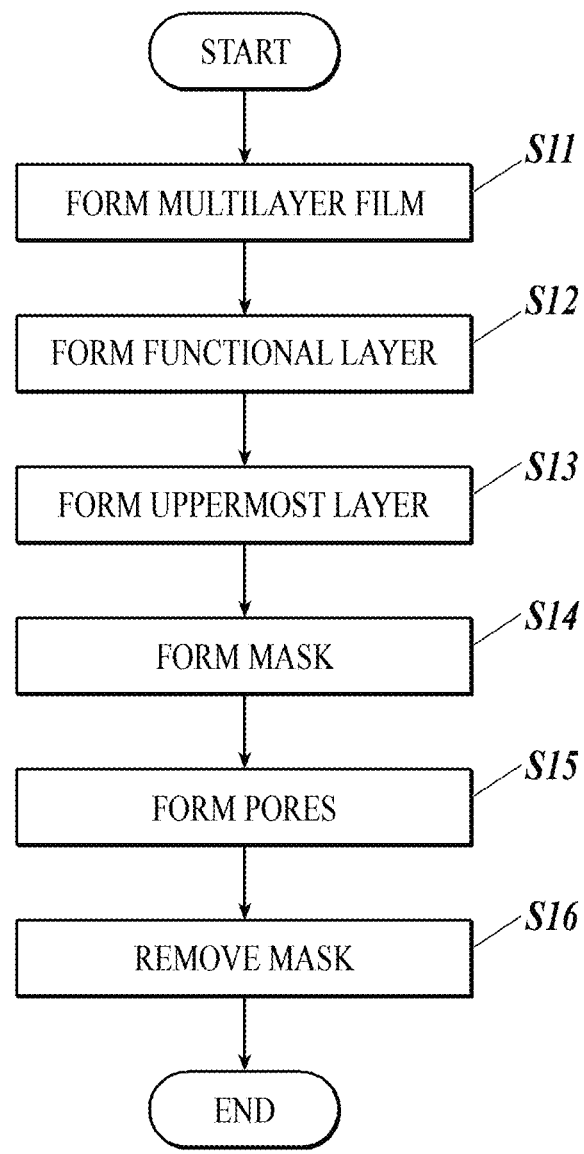
FIG. 20 is a flowchart illustrating the steps of forming pores on the surface of the uppermost layer.

FIG. 20 is a flowchart illustrating the steps of forming the pores on the surface of the uppermost layer according to the present invention.

Figure 21A:
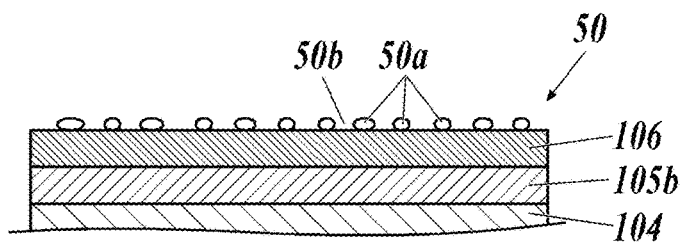
FIG. 21A is a cross-sectional view illustrating a step of forming a granular metal mask on the surface of the outermost layer.
Figure 21B:
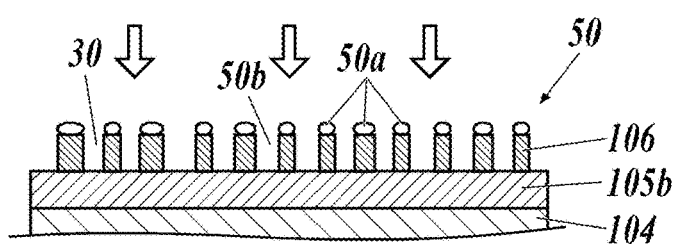
FIG. 21B is a cross-sectional view illustrating a step of forming a plurality of pores on the outermost layer.
Figure 21C:
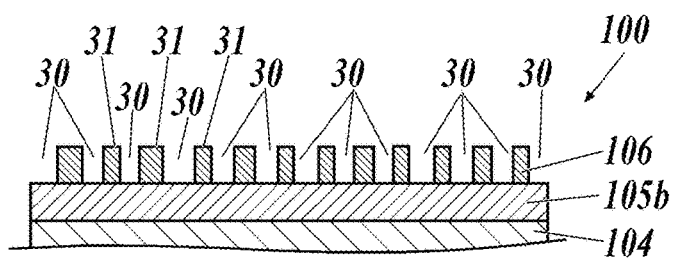
FIG. 21C is a cross-sectional view illustrating a step of removing the metal mask after forming the pores.

FIGS. 21A to 21C are conceptual diagrams illustrating the steps of forming a granular metal mask and thereby forming the pores on the surface of the uppermost layer according to the present invention.

Figure 22A:
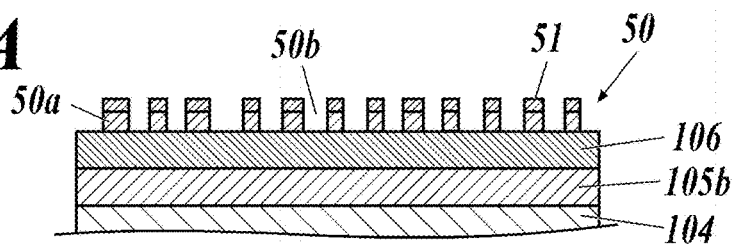
FIG. 22A is a conceptual diagram illustrating an example step of forming a granular metal mask and a second mask thereon on the surface of the uppermost layer according to the present invention.
Figure 22B:
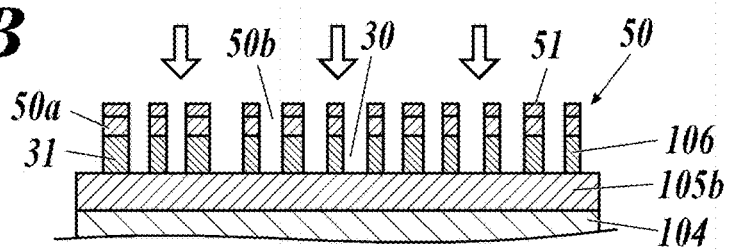
FIG. 22B is a conceptual diagram illustrating an example step of forming a granular metal mask and a second mask thereon and forming pores on the surface of the uppermost layer according to the present invention.
Figure 22C:
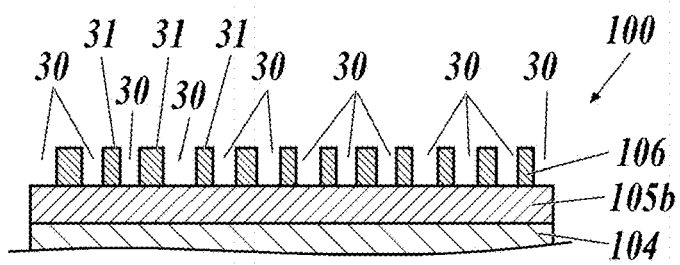
FIG. 22C is a cross-sectional view of a step of removing the granular metal mask and the second mask thereon.
Figure 22D:
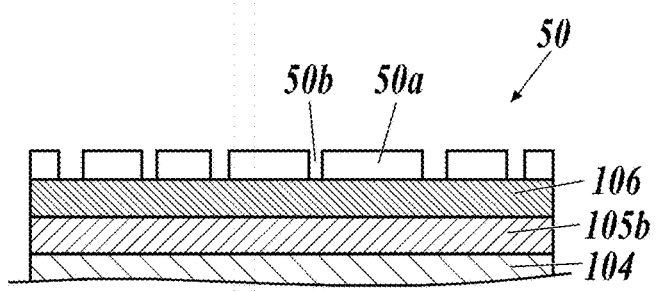
FIG. 22D is a conceptual diagram illustrating an example step of forming a leaf vein metal mask and a second mask thereon and forming pores on the surface of the uppermost layer according to the present invention.
Figure 22E:
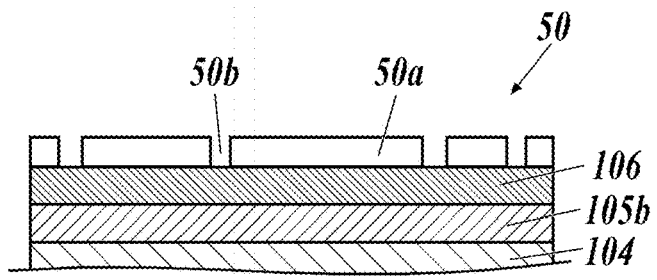
FIG. 22E is a conceptual diagram illustrating an example step of forming a porous metal mask and a second mask thereon and forming pores on the surface of the uppermost layer according to the present invention.

FIGS. 22A to 22C are conceptual diagrams illustrating an example of the steps of forming a granular metal mask and a second mask thereon and thereby forming the pores on the surface of the uppermost layer according to the present invention.

FIGS. 23A to 23D are SEM images of the uppermost layer surface of the present invention on which a metal mask is formed.

Figure 24A:
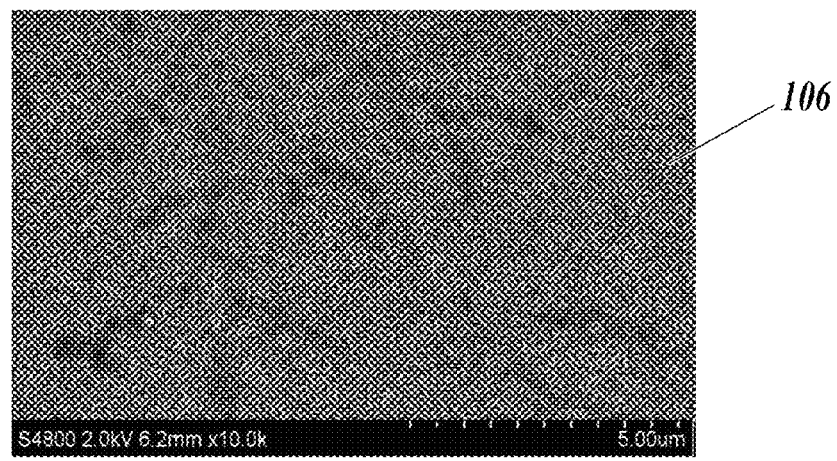
FIG. 24A is a SEM image and an enlarged view thereof of an example of the dielectric multilayer film with the uppermost layer formed in a leaf vein shape.
Figure 24B:
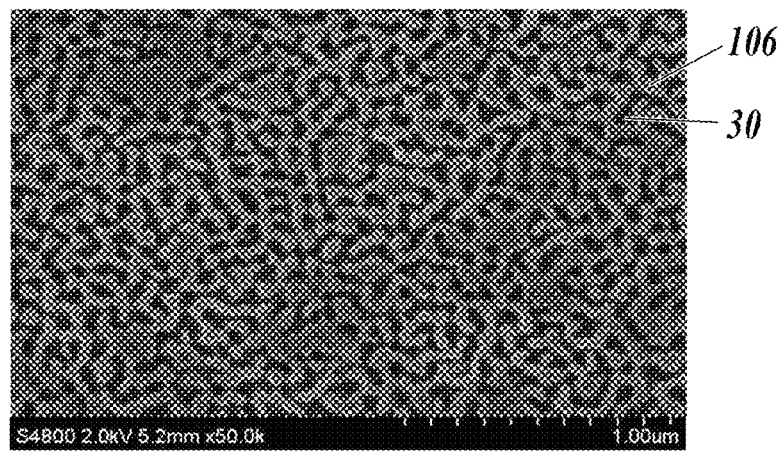
FIG. 24B is a SEM image and an enlarged view thereof of another example of the dielectric multilayer film with the uppermost layer formed in a leaf vein shape.
Figure 24C:
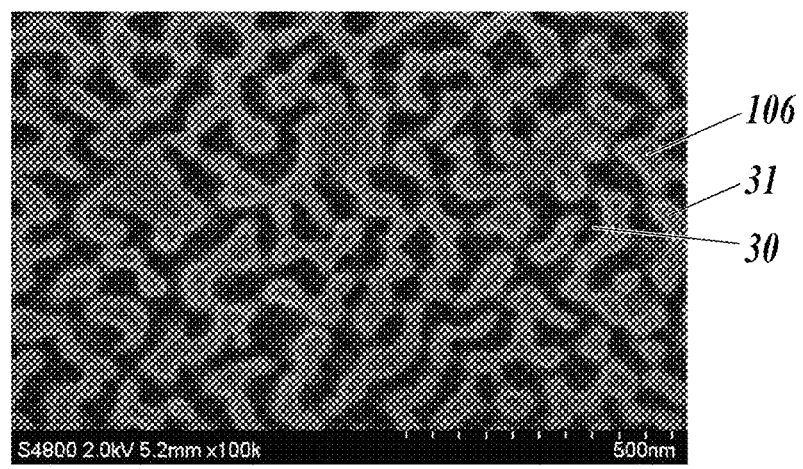
FIG. 24C is a SEM image and an enlarged view thereof of another example of the dielectric multilayer film with the uppermost layer formed in a leaf vein shape.

FIGS. 24A to 24C are SEM images and enlarged views at different magnifications when the uppermost layer surface of the present invention is formed in a leaf vein shape.

In FIG. 20, first, for example, a low refractive index layer and a high refractive index layer are alternately laminated as a multilayer film on a glass base (glass substrate) (multilayer film forming step: Step S11). In Step S11, the layers of the multilayer film other than the uppermost layer 106 and the functional layer 105 are formed. That is, the part to a low refractive index layer adjacent to the under side of the functional layer 105 is formed. The multilayer film is formed by any of various vapor deposition methods, ion assisted deposition (IAD), sputtering or the like. Depending on the configuration of the dielectric multilayer film 100, Step S11 of forming the multilayer film may be omitted.

Next, the functional layer 105 is formed in Step 12, and the uppermost layer 106 is formed in Step 13. Regarding the forming method, the films are formed by preferably IAD or sputtering, more preferably IAD.

Figure 21D:
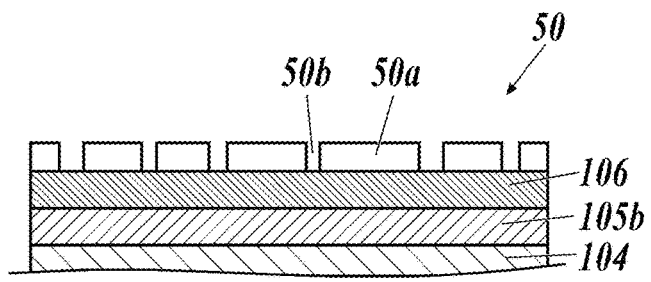
FIG. 21D is a cross-sectional view illustrating a step of forming a leaf vein metal mask in a granular shape on the surface of the outermost layer.
Figure 21E:
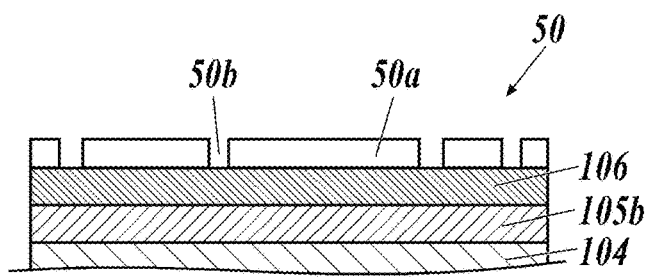
FIG. 21E is a cross-sectional view illustrating a step of forming a porous metal mask in a granular shape on the surface of the outermost layer.
Figure 23A:
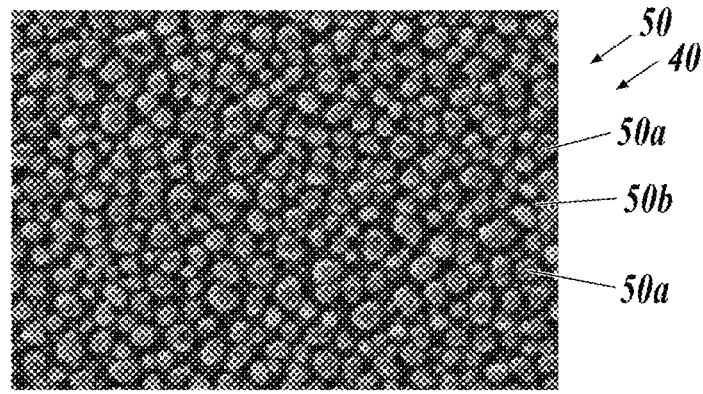
FIG. 23A is a SEM image of a sample on which a granular metal mask is formed.

Subsequent to the uppermost layer forming step, the metal mask 50 is formed on the surface of the uppermost layer 106 (mask forming step: Step S14). As illustrated in FIGS. 21A and 23A, the metal mask 50 is formed in a granular shape on the surface of the uppermost layer 106. That is, the nano-sized metal mask 50 can be formed on the uppermost layer 106. As illustrated in FIGS. 21D and 23C, the metal mask 50 may be formed in a leaf vein shape. Alternatively, as illustrated in FIGS. 21E and 23D, the metal mask 50 may be formed in a porous shape.

The metal mask 50 is composed of a metal portion 50a and an exposed portion 50b. The layer thickness of the metal mask 50 is in the range of 1 to 30 nm. Although it depends on the film forming conditions, for example, when the metal mask 50 is formed to a layer thickness of 2 nm by vapor deposition, the metal mask 50 tends have a granular shape (FIGS. 23A and 23C). For example, when the metal mask 50 is formed to a layer thickness of 12 to 15 nm by vapor deposition, the metal mask 50 tends to have a leaf vein shape (FIG. 23C). For example, when the metal mask 50 is formed to a layer thickness of 10 nm by sputtering, the metal mask 50 tends to have a porous shape (FIG. 23D). By forming the metal into a film having a thickness within the above-described ranges, it is possible to readily form the optimal metal mask 50 having a granular, leaf vein or porous shape.

FIGS. 22A to 22E are conceptual diagram for describing an example of the steps of forming the pores in the uppermost layer surface of the present invention, in which a second mask 51 for protecting the metal mask from damage due to dry etching in forming the pores is further formed on the granular metal mask 50 as described above in FIGS. 21A to 21E.

As illustrated in FIG. 22A, after the nano-sized metal mask 50 is formed on the uppermost layer 106, for example, a mixture of $Ta_2O_5$ and $TiO_2$ (hereinafter referred to as H4) may be formed to a thickness in the range of 0.5 to 5 nm on the metal mask 50 as a second mask 51 resistant to reactive etching or physical etching. This is also a preferred embodiment of the metal mask applicable to the present invention. In forming the second mask 51, it is preferable to heat the H4 at 100° C. or higher for 1 minute or longer after the film formation. Heating at such a high temperature expands gaps of the silver after the H4 film is formed. That is, even if the H4 film is formed in the grooves, it becomes possible to etch the groove portions because the grooves are expanded after the H4 film is formed.

In the present invention, from the viewpoint of controlling the shape of the pores, it is preferable that the metal mask 50 is made of, for example, Ag, Al or the like, particularly silver, and the film forming temperature is controlled within the range of 20° C. to 400° C. and the thickness is controlled within the range of 1 to 100 nm.

Next, the plurality of pores 30 are formed in the uppermost layer 106 (pore forming step: Step S15).

Figure 23B:
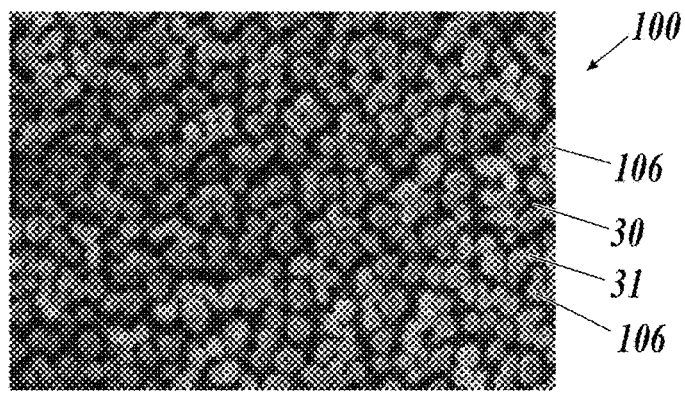
FIG. 23B is a SEM image of a sample on which a granular metal mask is formed.
Figure 23C:
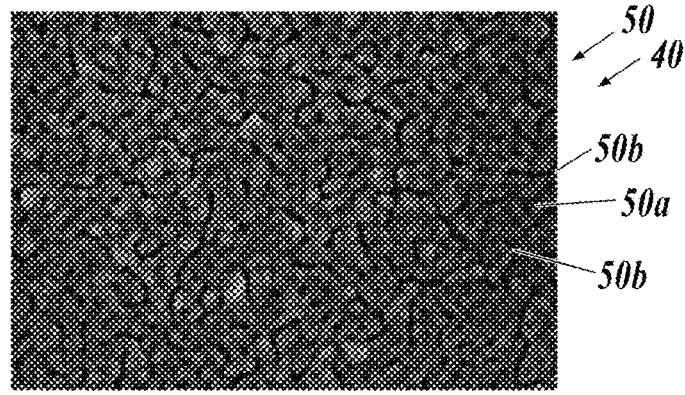
FIG. 23C is a SEM image of a sample on which a leaf vein metal mask is formed.
Figure 23D:
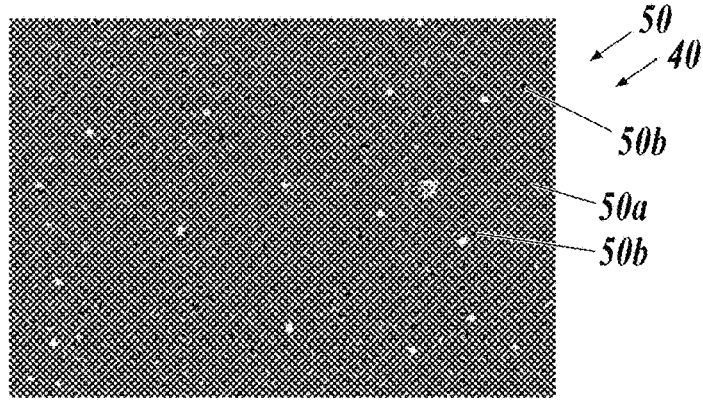
FIG. 23D is a SEM image of a sample on which a porous metal mask is formed.

As illustrated in FIGS. 21B, 22B and 23B, an etching device (not shown) for dry etching or an IAD device in which an etching gas is introduced is used for the etching. Alternatively, the same film forming device used for forming the above-mentioned multilayer film or metal mask 50 may be used. In the pore forming step, a gas reactive with the material of the uppermost layer 106, specifically $SiO_2$, is used to form the plurality of pores. This allows $SiO_2$ of the uppermost layer 106 to be scraped without damaging the metal mask 50. As the etching gas, for example, $CHF_3$, $CF_4$, $COF_2$, $SF_6$ or the like is used. In this step, the plurality of pores 30 that exposes the surface of the functional layer 105 is formed in the uppermost layer 106. That is, the part of the uppermost layer 106 corresponding to the exposed portion 50b of the metal mask 50 is etched so that the pores 30 and the microstructure 31 of $SiO_2$, which is the material of the uppermost layer, are formed, and the surface of the functional layer 105 is partially exposed.

After the pore forming step, as illustrated in FIG. 21C, the metal mask 50 is removed (mask removing step: Step S16). Similarly, as illustrated in FIG. 22C, the metal mask 50 and the second mask 51 are removed. Specifically, the metal mask 50 and the second mask 51 are removed by wet etching with acetic acid or the like. Further, the metal mask 50 and the second mask 51 may be removed by dry etching with, for example, Ar or $O_2$ as an etching gas. By dry-etching the metal mask 50 and the second mask 51, it becomes possible to perform the series of steps from forming the multilayer film MC to etching the metal mask 50 in the same film forming device.

Through the above-described steps, the dielectric multilayer film 100 having the plurality of pores 30 in the uppermost layer 106 can be obtained.

In the above-described method of producing the dielectric multilayer film, after the uppermost layer 106 is formed, the plurality of pores 30 for the functional layer 105 are formed to exhibit a photocatalytic function. This enables achieving both superhydrophilicity and photocatalytic function. Further, the pores 30 are large enough for the functional layer 105 to exhibit the photocatalytic function, are not visible to the user, and have salt water resistance.

The functional layer 105 exhibits a photocatalytic function but is a high refractive index layer. In order to maintain the antireflection characteristics of the dielectric multilayer film 100, It is necessary to provide the uppermost layer 106, which is a low refractive index layer, on the functional layer 105. A problem with the prior art was that when the density of the uppermost layer 106 is high, the functional layer 105 does not exhibit the photocatalytic function. In contrast, when the film density of the uppermost layer 106 is low, the salt water resistance of the uppermost layer 106 is decreased. By providing the plurality of pores 30 in the uppermost layer 106 as in the dielectric multilayer film 100 of the present embodiment, it is possible to allow the functional layer 105 to exhibit the photocatalytic function while maintaining the antireflection property, the superhydrophilicity and the salt water resistance.

As described above, the dielectric multilayer film 100 has low light reflectance, hydrophilicity, and photocatalytic property, and also excellent in properties such as salt water resistance and scratch resistance. The present invention is characterized in that an optical member has the dielectric multilayer film of the present invention. The optical member is preferably a lens, an antibacterial cover, an antifungal coating or a mirror. For example, the present invention is suitably applicable to on-board lenses, lenses for communication, antibacterial lenses for endoscopes, antibacterial covers for PCs and smartphones, eyeglasses, ceramics such as toilets and tableware, antifungal coatings for baths and sinks, and building materials (window glass).

EXAMPLES

Hereafter, the present invention will be described specifically with examples, however, the present invention is not limited to the illustrated examples. The indications of "part" and "%", which are used in the examples, represent respectively "part(s) by mass" and "mass %" unless otherwise particularly mentioned.

First Example

Hereinafter, specific examples of the dielectric multilayer film 100 according to the present embodiment will be described. To prepare the following dielectric multilayer films, a film forming device (BES-1300, manufactured by Cyncron Co., Ltd.) was used.
<<Preparation of Dielectric Multilayer Film>>
[Preparation of Dielectric Multilayer Film 1]
On a glass base of TAFD5G (HOYA Co., Ltd.: refractive index 1.835), low refractive index layers of $SiO_2$ (Merck), and a high refractive index layer of OA600 (Canon Optron Co., Ltd.: mixture of $Ta_2O_5$, TiO and $Ti_2O_5$ were laminated as Layer 1 to Layer 3 in Table I respectively to predetermined layer thicknesses by IAD in the following conditions. Then, as the functional layer (Layer 4) using $TiO_2$ and the uppermost layer (Layer 5), the uppermost layer was deposited by IAD to have a sodium content of 5% by mass. A dielectric multilayer film before forming the pores in Layer 5 in Table I was thus obtained.
<Film Forming Conditions>
(Conditions in the Chamber)
  Heating temperature: 370° C.
  Starting degree of vacuum: $1.33 \times 10^{-3}$ Pa (Evaporation Source of Film Forming Material)
  Electron gun
<Formation of Low Refractive Index Layer, High Refractive Index Layer, Functional Layer and Uppermost Layer>
Film forming material of low refractive index layers: $SiO_2$ (product name $SiO_2$, manufactured by Canon Optron)

The base material was placed in an IAD vacuum vapor deposition device, the film-forming material was loaded as the first evaporation source and was vapor-deposited at a film-forming rate of 3 Å/sec. Low refractive index layers (Layer 1 and Layer 3) having a thickness of 35.3 nm and 38.5 nm were thus formed on the base material.

In IAD, the acceleration voltage was 1200 V, the acceleration current was 1000 mA, and the neutralization current was 1500 mA, and a device with an RF ion source "OIS One" manufactured by OPTORUN was used. In IAD, $O_2$ gas, Ar gas and neutral gas Ar were introduced in the conditions of respectively 50 sccm, 10 sccm and 10 sccm.

Film forming material of high refractive index layer: $Ta_2O_5$ (product name OA-600, manufactured by Canon Optron)

The film forming material was loaded as the second evaporation source and vapor-deposited at a film forming rate of 3 Å/sec. The high refractive index layer (Layer 2) having a thickness of 33.2 nm was thus formed on the low refractive index layer. The high refractive index layer was similarly formed by IAD in the heating condition of 370° C.

Film forming material of functional layer: $TiO_2$ (product name T.O.P ($Ti_3O_5$) manufactured by Fuji Titanium Industry Co., Ltd.)

The above-described base was installed in a vacuum vapor deposition device. The film forming material was loaded as the third evaporation source and vapor-deposited at a film forming rate of 3 Å/sec. A functional layer (Layer 4) having a thickness of 105 nm was thus formed on the low refractive index layer. The functional layer was similarly formed by IAD in the heating condition of 370° C.

Film forming material of uppermost layer: particulate mixture of $SiO_2$ and $Na_2O$ (product name $SiO_2$—$Na_2O$, manufactured by Toshima Seisakusho Co.) mixed at a mass ratio of 95:5 was prepared.

The above-described base was installed in a vacuum vapor deposition device. The film forming material was loaded as a fourth evaporation source and vapor-deposited at a film forming rate of 3 Å/sec. An uppermost layer (Layer 5) having a thickness of 112 nm was thus formed on the functional layer. The functional layer was similarly formed by IAD in the heating condition of 370° C.

TABLE I

<LAYER CONFIGURATION OF DIELECTRIC MULTILAYER FILM 1>

| LAYER NO. | LAYER MATERIALS | LAYER THICKNESS [nm] | REFRACTIVE INDEX |
| --- | --- | --- | --- |
| 5 (UPPERMOST LAYER) | $SiO_2$ | 112.0 | 1.461 |
| 4 (FUNCTIONAL LAYER) | $TiO_2$ | 105.0 | 2.344 |
| 3 | $SiO_2$ | 38.5 | 1.461 |
| 2 | OA600 | 33.2 | 2.095 |
| 1 | $SiO_2$ | 35.3 | 1.461 |
| SUBSTRATE | TAFD5G | | 1.835 |

TOTAL LAYER THICKNESS: 324 nm

The layer thickness (layer thickness) of each layer was measured by the following method.

(Measurement of Layer Thickness)

The layer thickness was measured by the following method.

(1) $TiO_2$ and $SiO_2$ were formed beforehand on a white plate glass substrate to a layer thickness of ¼λ (λ=550 n), and the spectral reflectance was measured.

(2) Each layer was formed on the $TiO_2$ and $SiO_2$ film of (1) under the above-described film forming conditions, the spectral reflectance was measured, and the refractive index and layer thickness of the layer thus formed were calculated from the amount of change of the spectral reflectance.

Compositional analysis of the uppermost layer was carried out with the following X-ray photoelectron spectroscopy analyzer (XPS).

(XPS Composition Analysis)
  Device name: X-ray photoelectron spectroscopy analyzer (XPS)
  Device model: Quantera SXM
  Device manufacturer: ULVAC-PHI
  Measurement conditions: X-ray source=Monochromatic AlKα ray 25 W-15 kV
  Degree of vacuum: $5.0 \times 10^{-8}$ Pa
  Depth profile analysis is performed by argon ion etching. For data processing, the Multi Pak manufactured by ULVAC-PHI was used.

The light reflectance was measured with an ultraviolet-visible near-infrared spectrophotometer V-670 manufactured by JASCO Corp. at a light wavelength of 587.56 nm (d-line).

(Measurement of Refractive Index for D-Line)

The refractive indexes in Table I were calculated by forming each layer of the multilayer film as a single layer and measuring the light reflectance for the d-line using a spectrophotometer U-4100 manufactured by Hitachi High-Technologies Corporation. The refractive index of the obtained layer was specified by adjusting a refractive index so as to fit the measured light reflectance data using the film calculation software (Essential Macleod, manufactured by Sigma Kouki Co., Ltd.).

<Pore Formation in Uppermost Layer>

After forming the uppermost layer (Layer 5), according to the pore forming method illustrated in FIGS. 20 and 21A to 21E, leaf vein pores as illustrated in FIG. 23C were formed in the conditions of a mask material of Ag, a mask film formation by vapor deposition, a metal mask thickness of 12 nm, a mask shape of leaf vein shape, an etching gas of $CHF_3$ and an etching time of 60 sec. The pores thus formed had the width, the depth, the average period length of the microstructure other than the pores and the pore area ratio as listed in Table II. The dielectric multilayer film 1 was thus prepared.

The detailed pore forming conditions were as follows.

The Ag film was formed with a film forming device (BES-1300, manufactured by Syncron Co., Ltd.) under the following conditions. By changing the layer thickness at the time of film formation, leaf vein-, porous- and granular-shaped Ag masks were formed.
  Heating temperature: 25° C.
  Starting degree of vacuum: $1.33 \times 10^{-3}$ Pa
  Film forming rate 7 Å/sec An etching device (CE-300I, manufactured by ULVAC, Inc.) was used for etching, and the film was formed under the following conditions. The width and depth of the pores were adjusted by changing the etching time.
  Antenna RF: 400 W
  Bias RF: 38 W
  APC pressure: 0.5 Pa
  $CHF_3$ flow rate: 20 sccm
  Etching time: 60 sec <Peeling Mask>

After the pores were formed, the sample was irradiated with $O_2$ plasma using an etching device (CE-300I, manufactured by ULVAC, Inc.) so that the mask material, Ag was peeled off. The peeling off was carried out under the following conditions.
  Antenna RF: 400 W
  Bias RF: 38 W
  APC pressure: 0.5 Pa
  $O_2$ flow rate: 50 sccm
  Etching time: 600 sec

[Preparation of Dielectric Multilayer Films 2 to 16]

Dielectric multilayer films 2 to 16 were prepared in the same manner as the preparation of the dielectric multilayer film 1 except that the film forming temperature, thickness and etching conditions of the metal mask were changed to control the width and depth of the pores, the average period length of the microstructure other than the pores, and the pore area ratio, and that the vapor deposition conditions of IAD were controlled to change the functional layer thickness, the uppermost layer thickness, the total layer thickness and the uppermost layer sodium content as listed in Table II.

The depth of the pores was controlled by suitably changing the layer thickness of the uppermost layer. When the functional layer thickness was changed, the layer thicknesses of Layer 1 to Layer 3 were suitably changed to control the total layer thickness.

In the dielectric multilayer film 16, the $SiO_2$ content was 40% by mass, and $Al_2O_3$ was co-deposited as the balance.

[Preparation of Dielectric Multilayer Films 17 to 19]

Dielectric multilayer films 17 to 19 each having the width, the depth, the average period length of the microstructure excluding pores, and the pore area ratio as listed in Table II were prepared in the same manner as the preparation of the dielectric multilayer film 1 except that the thickness of the metal mask was changed to 10 nm to form a porous mask so that the porous pores as illustrated in FIG. 23D were formed.

Further, in the dielectric multilayer films 17 to 19, the $TiO_2$ content in the functional layer was changed, and $WO_3$ was co-deposited as the balance. Further, in the dielectric multilayer films 18 and 19, the $SiO_2$ content of the uppermost layer was 70% by mass, and $Al_2O_3$ was co-deposited as the balance.

[Preparation of Dielectric Multilayer Films 20 to 23]

Dielectric multilayer films 20 to 23 each having the width, the depth, the average period length of the microstructure other than pores, and the pore area ratio as listed in Table II were prepared in the same manner as the preparation of the dielectric multilayer film 1 except that the thickness of the metal mask was changed to 2 nm to form a granular mask as illustrated in FIG. 23A so that the porous pores as illustrated in FIG. 23D were formed.

[Preparation of Dielectric Multilayer Film 24]

Based on paragraphs 0020 to 0028 of JP-A-Hei10-36144, a laminate of abase/a dielectric multilayer film/a $TiO_2$-containing layer (photocatalytic layer (functional layer))/an $SiO_2$-containing layer (uppermost layer) was prepared. A dielectric multilayer film 24 for comparison was thus prepared.

<<Measurement of Parameters of Uppermost Layer>>

An image of the porous structure of the uppermost layer was captured with a scanning electron microscope (SEM) according to the above-described first image analysis method using an electron microscope. Based on the captured image, the pore width length (nm), the pore depth (nm), the microstructure period length (nm), the pore area ratio (%)

and the pore shape were measured according to the above-described method using the free image processing software "ImageJ (ImageJ1.32S created by WayneRasband)". The results thus obtained are shown in Table II.

TABLE II

| DIELECTRIC MULTILAYER FILM NO. | FUNCTIONAL LAYER | | UPPERMOST LAYER (FIRST ANALYSIS METHOD: IMAGE ANALYSIS WITH ELECTRON MICROSCOPE) | | | | |
|---|---|---|---|---|---|---|---|
| | TiO$_2$-CONTAINING LAYER [mass %] | LAYER THICKNESS [nm] | SiO$_2$ CONTENT [mass %] | Na CONTENT [mass %] | LAYER THICKNESS [nm] | PORE WIDTH [nm] | PORE DEPTH [nm] |
| 1 | 100 | 105 | 95 | 5 | 112 | 75 | 112 |
| 2 | 100 | 105 | 95 | 5 | 117 | 86 | 122 |
| 3 | 100 | 100 | 95 | 5 | 120 | 96 | 125 |
| 4 | 100 | 100 | 95 | 5 | 125 | 115 | 130 |
| 5 | 100 | 100 | 95 | 5 | 130 | 108 | 135 |
| 6 | 100 | 20 | 95 | 5 | 117 | 84 | 122 |
| 7 | 100 | 8 | 95 | 5 | 117 | 84 | 122 |
| 8 | 100 | 105 | 100 | 0 | 117 | 84 | 122 |
| 9 | 100 | 130 | 95 | 5 | 46 | 115 | 51 |
| 10 | 100 | 270 | 95 | 5 | 46 | 115 | 51 |
| 11 | 100 | 270 | 95 | 5 | 305 | 115 | 310 |
| 12 | 100 | 130 | 95 | 5 | 46 | 115 | 51 |
| 13 | 100 | 119 | 95 | 5 | 83 | 22 | 88 |
| 14 | 100 | 119 | 92 | 8 | 122 | 46 | 127 |
| 15 | 100 | 119 | 95 | 5 | 5 | 55 | 5 |
| 16 | 100 | 119 | 40 | 5 | 83 | 55 | 88 |
| 17 | 90 | 110 | 97 | 3 | 86 | 5 | 91 |
| 18 | 70 | 110 | 70 | 3 | 86 | 5 | 91 |
| 19 | 40 | 110 | 70 | 3 | 86 | 5 | 91 |
| 20 | 100 | 110 | 97 | 3 | 30 | 212 | 35 |
| 21 | 100 | 110 | 97 | 3 | 25 | 98 | 30 |
| 22 | 100 | 110 | 97 | 3 | 125 | 60 | 130 |
| 23 | 100 | 110 | 97 | 3 | 10 | 1100 | 15 |
| 24 | LAMINATE OF SUBSTRATE/DIELECTRIC MULTILAYER FILM/TiO$_2$-CONTAINING LAYER/SiO$_2$-CONTAINING LAYER IN JP-A-HEI10-36144 | | | | | | |

| DIELECTRIC MULTILAYER FILM NO. | UPPERMOST LAYER (FIRST ANALYSIS METHOD: IMAGE ANALYSIS WITH ELECTRON MICROSCOPE) | | | | | REMARKS |
|---|---|---|---|---|---|---|
| | MICROSTRUCTURE PERIOD LENGTH [nm] | PORE AREA RATIO [%] | PORE SHAPE | HEATED IAD | LAYER THICKNESS [%] | |
| 1 | 154 | 50 | LEAF VEIN | YES | 324 | INVENTIVE |
| 2 | 121 | 48 | LEAF VEIN | YES | 324 | INVENTIVE |
| 3 | 289 | 55 | LEAF VEIN | YES | 324 | INVENTIVE |
| 4 | 450 | 15 | LEAF VEIN | YES | 324 | INVENTIVE |
| 5 | 212 | 56 | LEAF VEIN | YES | 324 | INVENTIVE |
| 6 | 121 | 48 | LEAF VEIN | YES | 324 | INVENTIVE |
| 7 | 121 | 48 | LEAF VEIN | YES | 324 | INVENTIVE |
| 8 | 121 | 48 | LEAF VEIN | YES | 324 | INVENTIVE |
| 9 | 103 | 52 | LEAF VEIN | YES | 281 | INVENTIVE |
| 10 | 103 | 52 | LEAF VEIN | YES | 696 | INVENTIVE |
| 11 | 103 | 52 | LEAF VEIN | YES | 696 | INVENTIVE |
| 12 | 103 | 52 | LEAF VEIN | YES | 281 | INVENTIVE |
| 13 | 167 | 16 | LEAF VEIN | YES | 305 | INVENTIVE |
| 14 | 333 | 35 | LEAF VEIN | YES | 305 | INVENTIVE |
| 15 | 167 | 16 | LEAF VEIN | YES | 305 | INVENTIVE |
| 16 | 167 | 16 | LEAF VEIN | YES | 305 | INVENTIVE |
| 17 | 900 | 3 | POROUS | YES | 315 | INVENTIVE |
| 18 | 900 | 3 | POROUS | YES | 315 | INVENTIVE |
| 19 | 900 | 3 | POROUS | YES | 315 | INVENTIVE |
| 20 | 333 | 62 | GRANULAR | YES | 315 | INVENTIVE |
| 21 | 525 | 62 | GRANULAR | YES | 315 | INVENTIVE |
| 22 | 325 | 66 | GRANULAR | YES | 315 | INVENTIVE |
| 23 | 600 | 71 | GRANULAR | YES | 315 | INVENTIVE |
| 24 | LAMINATE OF SUBSTRATE/DIELECTRIC MULTILAYER FILM/TiO$_2$-CONTAINING LAYER/SiO$_2$-CONTAINING LAYER IN JP-A-HEI10-36144 | | | | | COMPARATIVE |

<<Evaluation of Dielectric Multilayer Film>>
(1) Measurement of Film Density of Uppermost Layer The film density of the uppermost layer of each dielectric multilayer film was measured by the following method.

(i) Only the uppermost layer is formed on a substrate made of white plate glass BK7 (manufactured by SCHOTT) (φ(diameter)=30 mm, t (thickness)=2 mm), and the light reflectance of the low refractive index layer is measured. On the other hand, (ii) the theoretical light reflectance of a layer made of the same material as the uppermost layer is calculated using a thin film calculation software (Essential Macleod, manufactured by SIGMA KOKI Co., Ltd.). Then, the theoretical light reflectance calculated in (ii) was compared with the light reflectance measured in (i) to specify the film density of the uppermost layer. The light reflectance was measured by a reflectometer (USPM-RUIII, manufactured by Olympus Corporation).

A film that has not been subjected to etching was measured for the film density. This enables evaluation of the degree of atomic-level voids formed at the film formation.

A film density of 98% or more was evaluated as BB, a film density of 90% to 97% was evaluated as CC, and a film density of less than 90% was evaluated as DD.

(2) Evaluation of Photocatalytic Property: Expression of Photocatalytic Effect and Action "Photocatalytic property" was evaluated as follows. A sample was left in a high temperature and high humidity (85° C., 85% RH) environment for 1000 hours, and thereafter the sample was colored with a pen and irradiated with UV in the total amount of 20 J in an environment of 20° C. and 80% RH. The change in color of the pen due to the oxidizing radical species produced from the photocatalyst was evaluated and graded. Specifically, the pen used was The Visualiser (manufactured by Ink Intelligent Corp.) or The Explorer (manufactured by Ink Intelligent Corp.), and the photocatalytic property was evaluated according to the following criteria.

AA: The color is changed to a large degree after UV irradiation, and the color of the pen is completely faded. The photocatalytic effect is excellent.

BB: The color of the pen is almost faded after UV irradiation. The photocatalytic effect is good.

CC: The color of the pen remains to a certain degree after UV irradiation, but practically acceptable.

DD: The color of the pen apparently remains after UV irradiation. The photocatalytic effect is lost.

(3) Evaluation of Hydrophilicity (Water Contact Angle) in High Temperature and High Humidity Environment A sample was left in a high temperature and high humidity (85° C., 85% RH) environment for 1000 hours. Thereafter, the water contact angle was measured by the following measurement. An angle of 30° or less is defined as being hydrophilic. An angle of 15° or less is defined as being superhydrophilic, and can be considered as extremely durable.

<Measurement of Water Contact Angle>

Regarding the method of measuring contact angle, the contact angle between a standard liquid (pure water) and the surface of the uppermost layer was measured according to the method specified in JIS R3257. The measurement conditions were as follows. At a temperature of 23° C. and a humidity of 50% RH, about 10 µL of pure water, which is the standard liquid, was dropped onto a sample, five points on the sample are measured with a G-1 device manufactured by Elma Co., Ltd., and the average contact angle was obtained as the average of the measured values. The contact angle is measured within 1 minute after dropping the standard liquid.

(4) Evaluation of Salt Water Resistance

"Salt water resistance" was evaluated by a salt spray test using a salt-dry-wet composite cycle tester (CYP-90, manufactured by Suga Test Instruments Co., Ltd.). The test was carried out in 8 cycles each having the following Steps (a) to (c).

(a) A solution having a salt concentration of 5% (NaCl, $MgCl_2$, $CaCl_2$, concentration (mass ratio) 5%±1%) at 25±2° C. is sprayed at a sample in a spray chamber at a temperature of 35±2° C. for 2 hours.

(b) After the spraying is completed, the sample is left in an environment of 40±2° C. and 95% RH for 22 hours.

(c) After repeating Steps (a) and (b) four times, the sample is left in an environment of ambient temperature (20±15° C.) and normal humidity (45% RH to 85% RH) for 72 hours.

After the above-described test, the light reflectance of the sample was measured by a reflectometer (USPM-RUIII, manufactured by Olympus Corp.), and the salt water resistance was evaluated according to the following criteria.

BB: The change in light reflectance is less than 0.5%.

CC: The change in light reflectance is 0.5% to less than 2.0%.

DD: The change in light reflectance is 2.0% or more.

(5) Scratch Resistance

The surface of each dielectric multilayer film sample is rubbed back and forth 250 times with a palm scrubber under a load of 2 kg, and the light reflectance of the sample is measured with a reflectometer (USPM-RUIII, manufactured by Olympus Corp.). Then, the scratch resistance was evaluated according to the following criteria.

BB: The change in light reflectance is less than 0.5%.

CC: The change in light reflectance is 0.5% to less than 2.0%.

DD: The change in light reflectance is 2.0% or more.

Table III shows the configuration of the dielectric multilayer films and the evaluation results.

TABLE III

| DIELECTRIC MULTILAYER FILM NO. | FILM THICKNESS | PHOTOCATALYTIC PROPERTY | WATER CONTACT ANGLE [°] | SALT WATER RESISTANCE | SCRATCH RESISTANCE | REMARKS |
|---|---|---|---|---|---|---|
| 1 | BB | AA | 10 | BB | BB | INVENTIVE |
| 2 | BB | AA | 10 | BB | BB | INVENTIVE |
| 3 | BB | AA | 10 | BB | BB | INVENTIVE |
| 4 | BB | AA | 10 | BB | BB | INVENTIVE |
| 5 | BB | AA | 10 | BB | BB | INVENTIVE |

TABLE III-continued

| DIELECTRIC MULTILAYER FILM NO. | FILM THICKNESS | PHOTOCATALYTIC PROPERTY | WATER CONTACT ANGLE [°] | SALT WATER RESISTANCE | SCRATCH RESISTANCE | REMARKS |
|---|---|---|---|---|---|---|
| 6 | BB | CC | 10 | BB | BB | INVENTIVE |
| 7 | BB | CC | 10 | BB | BB | INVENTIVE |
| 8 | BB | AA | 45 | BB | BB | INVENTIVE |
| 9 | BB | AA | 10 | BB | BB | INVENTIVE |
| 10 | BB | AA | 10 | BB | CC | INVENTIVE |
| 11 | BB | CC | 10 | BB | CC | INVENTIVE |
| 12 | CC | AA | 10 | CC | CC | INVENTIVE |
| 13 | BB | BB | 10 | BB | BB | INVENTIVE |
| 14 | BB | BB | 10 | BB | BB | INVENTIVE |
| 15 | BB | BB | 15 | BB | BB | INVENTIVE |
| 16 | BB | BB | 55 | BB | BB | INVENTIVE |
| 17 | BB | CC | 10 | BB | BB | INVENTIVE |
| 18 | BB | CC | 10 | BB | BB | INVENTIVE |
| 19 | BB | CC | 10 | BB | BB | INVENTIVE |
| 20 | BB | AA | 25 | BB | BB | INVENTIVE |
| 21 | BB | AA | 25 | BB | BB | INVENTIVE |
| 22 | BB | AA | 10 | BB | BB | INVENTIVE |
| 23 | BB | AA | 30 | BB | BB | INVENTIVE |
| 24 | BB | BB → DD IN 1 HOUR | 55 | DD | DD | COMPARATIVE |

From the results shown in Table III, it is apparent that the inventive dielectric multilayer films 1 to 23 have hydrophilicity and photocatalytic property and are also excellent in properties such as salt water resistance and scratch resistance compared to the comparative dielectric multilayer film 24.

In this example, clogging of the pores was not observed even after the high temperature and high humidity test, which revealed suitable shape and size of the pores for efficiently activating the photocatalyst. When the pores have a leaf vein shape, and the width and depth of the pores, the average period length of the microstructure other than the pores and the pore area ratio are within the preferable ranges of the present invention, it was possible to obtain a dielectric multilayer film that is excellent in the above-described properties.

Second Example

<<Preparation of Dielectric Multilayer Film>>
[Preparation of Dielectric Multilayer Film 51]

On a glass base of TAFD5G (HOYA Co., Ltd.: refractive index 1.835), low refractive index layers of $SiO_2$ (Merck), and a high refractive index layer of OA600 (Canon Optron Co., Ltd.: mixture of $Ta_2O_5$, TiO and $Ti_2O_5$) were laminated as Layer 1 to Layer 3 in Table IV respectively to predetermined layer thicknesses by IAD in the following conditions. Then, as the functional layer (Layer 4) using $TiO_2$ and the uppermost layer (Layer 5), the uppermost layer was deposited by IAD so that sodium content becomes 5% by mass. A dielectric multilayer film before forming the pores in Layer 5 in Table IV was thus obtained.
<Film Forming Conditions>
(Conditions in the Chamber)
 Heating temperature: 370° C.
 Starting degree of vacuum: $1.33 \times 10^{-3}$ Pa
(Evaporation Source of Film Forming Material)
 Electron Gun
<Formation of Low Refractive Index Layer, High Refractive Index Layer, Functional Layer and Uppermost Layer>
 Film forming material of low refractive index layers: $SiO_2$ (product name $SiO_2$, manufactured by Canon Optron)

The above-described base was placed in an IAD vacuum vapor deposition device, the film forming material was loaded as the first evaporation source and was vapor-deposited at a film forming rate of 3 Å/sec. Low refractive index layers (Layer 1 and Layer 3) having a thickness of 33.3 nm and 36.3 nm were thus formed on the base material.

In IAD, the acceleration voltage was 1200 V, the acceleration current was 1000 mA, and the neutralization current was 1500 mA, and an RF ion source "OIS One" manufactured by OPTORUN was used. In IAD, $O_2$ gas, Ar gas and neutral gas Ar were introduced in the conditions of respectively 50 sccm, 10 sccm and 10 sccm.

Film forming material of high refractive index layer: $Ta_2O_5$ (product name OA-600, manufactured by Canon Optron)

The film forming material was loaded as the second evaporation source and vapor-deposited at a film forming rate of 3 Å/sec so that a high refractive index layer (Layer 2) having a thickness of 31.3 nm was formed on the low refractive index layer. The high refractive index layer was similarly formed by IAD in the heating condition of 370° C.

Film forming material of functional layer: $TiO_2$ (product name T.O.P ($Ti_3O_5$) manufactured by Fuji Titanium Industry Co., Ltd.)

The above-described base was placed in a vacuum vapor deposition device, the film forming material was loaded as the third evaporation source and was vapor-deposited at a film forming rate of 3 Å/sec. A functional layer (Layer 4) having a thickness of 113 nm was thus formed on the low refractive index layer. The functional layer was similarly formed by IAD in the heating condition of 370° C.

Film forming material of uppermost layer: particulate mixture of $SiO_2$ and $Na_2O$ (product name $SiO_2$—$Na_2O$, manufactured by Toshima Seisakusho Co.) mixed at a mass ratio of 95:5 was prepared. The film forming method was such that the shutter was opened immediately after preheating, and a plurality of hearths accommodating the material were prepared, and the hearth was replaced every time a film of approximately 20 nm was formed. This is a measure for not letting Na, which tends to evaporate earlier than $SiO_2$, escape, and thereby the ratio of $SiO_2$ and $Na_2O$ of the film formed becomes about 95:5.

The above-described base was placed in a vacuum vapor deposition device, the film forming material was loaded as the fourth evaporation source and was vapor-deposited at a film forming rate of 3 Å/sec. The uppermost layer (Layer 5) having a thickness of 88 nm was thus formed on the functional layer. The functional layer was similarly formed by IAD in the heating condition of 370° C.

TABLE IV

<LAYER CONFIGURATION OF DIELECTRIC MULTILAYER FILM 51>

| LAYER NUMBER | LAYER MATERIALS | LAYER THICKNESS (nm) | REFRACTIVE INDEX |
|---|---|---|---|
| 5 (UPPERMOST LAYER) | $SiO_2$ | 88.0 | 1.461 |
| 4 (FUNCTIONAL LAYER) | $TiO_2$ | 113.0 | 2.344 |
| 3 | $SiO_2$ | 36.3 | 1.461 |
| 2 | 0A600 | 31.3 | 2.095 |
| 1 | $SiO_2$ | 33.3 | 1.461 |
| SUBSTRATE | TAFD5G | | 1.835 |

TOTAL LAYER THICKNESS: 302 nm

The layer thickness (layer thickness) of each layer was measured by the following method.
(Measurement of Layer Thickness and Composition Analysis of Uppermost Layer)
The layer thickness was measured by the following method.
(1) $TiO_2$ and $SiO_2$ were formed beforehand on a white plate glass substrate to a layer thickness of $\frac{1}{4}\lambda$ ($\lambda$=550 n), and the spectral reflectance was measured.
(2) Each layer was formed on the $TiO_2$ and $SiO_2$ film of (1) under the above-described film forming conditions, the spectral reflectance was measured, and the refractive index and layer thickness of the layer thus formed were calculated from the amount of change of the spectral reflectance.

Compositional analysis of the uppermost layer was carried out with the following X-ray photoelectron spectroscopy analyzer (XPS).
(XPS Composition Analysis)
Device name: X-ray photoelectron spectroscopy analyzer (XPS)
Device model: Quantera SXM
Device manufacturer: ULVAC-PHI
Measurement conditions: X-ray source=Monochromatic AlKα ray 25 W-15 kV
Degree of vacuum: $5.0 \times 10^{-8}$ Pa
Depth profile analysis is performed by argon ion etching. For data processing, the Multi Pak manufactured by ULVAC-PHI was used.

The light reflectance was measured with an ultraviolet-visible near-infrared spectrophotometer V-670 manufactured by JASCO Corp. at a light wavelength of 587.56 nm (d-line).
(Measurement of Refractive Index for D-Line)
The refractive indexes shown in Table IV are calculated by forming each layer of the multilayer film as a single layer and measuring the light reflectance for the d-line using a spectrophotometer U-4100 manufactured by Hitachi High-Technologies Corporation. The refractive index of the obtained layer was specified by adjusting a refractive index so as to fit the measured light reflectance data using the film calculation software (Essential Macleod, manufactured by Sigma Kouki Co., Ltd.).

<Pore Formation in Uppermost Layer>
After forming the uppermost layer (layer 5), pores were formed according to the pore forming method illustrated in FIGS. 20 and 21 in which the mask material is Ag, the mask film is formed by vapor deposition, the metal mask thickness is 39 n, the film forming temperature is 300° C., the mask shape is a leaf vein shape, the etching gas is $CHF_3$, and the etching time is 900 sec. The leaf vein pores as illustrated in FIG. 23C thus formed had the width, the maximum valley depth Sv, the average period length of the microstructure other than the pores, the pore area ratio, the arithmetic mean roughness Sa and the root mean square height Sq as listed in Table V. The dielectric multilayer film 51 was thus prepared.

The detailed pore forming conditions were as follows.
The Ag film was formed with a film forming device (BMC-800T, manufactured by Syncron Co., Ltd.) under the following conditions. By changing the layer thickness at the time of film formation, leaf vein-, porous- and granular-shaped Ag masks were formed.
Heating temperature: 300° C.
Starting degree of vacuum: $1.33 \times 10^{-3}$ Pa
Film forming rate 3 Å/sec
Etching was performed with an IAD film forming device (BES-1300, Syncron Co., Ltd.) under the following conditions. The width and depth of the pores were adjusted by changing the etching time.
Acceleration voltage: 500V
Acceleration current: 500 mA
APC pressure: $7 \times 10^{-2}$ Pa
$CHF_3$ flow rate: 100 sccm
Etching time: 900 sec
<Peeling Mask>
After the pores were formed, Ag was peeled off with silver etchant (model number SEA-5, manufactured by Hayashi Junyaku Co., Ltd.). The peeling off was carried out under the following conditions.
Dip etching time: 20 sec
[Preparation of Dielectric Multilayer Films 52 to 54, 56, 58 to 62]
Dielectric multilayer films 52 to 54, 56, and 58 to 62 were prepared in the same manner as the preparation of the dielectric multilayer film 51 except that the film forming temperature, thickness and etching conditions of the metal mask were changed to control the width and maximum valley depth of the pores, the average period length of the microstructure other than the pores, the pore area ratio, the arithmetic mean roughness Ra and the root mean square height Sq, and that the vapor deposition conditions of IAD were controlled to change the functional layer thickness, the uppermost layer thickness, the total layer thickness and the uppermost layer sodium content as listed in Table V.

The depth of the pores was controlled by suitably changing the layer thickness of the uppermost layer. When the functional layer thickness was changed, the layer thicknesses of Layer 1 to Layer 3 were suitably changed to control the total layer thickness.

In the dielectric multilayer film 62, the $SiO_2$ content was 78% by mass, and $Al_2O_3$ was co-deposited as the balance.
[Preparation of Dielectric Multilayer Films 55, 57, 63]
Dielectric multilayer films 55, 57 and 63 were prepared in the same manner as the preparation of the dielectric multilayer film 51 except that the thickness and film forming temperature of the metal mask were changed to 30 nm and 170° C. to form a porous mask and resultant porous pores. Dielectric multi layer films 55, 57 and 63 thus prepared had the width and maximum valley depth of the pores, the average period length of the microstructure other than the pores, the pore area ratio, the arithmetic mean roughness Ra and the root mean square height Sq as listed in Table V.

<<Measurement of Parameters of Uppermost Layer>>

According to the above-described second image analysis method using an atomic force microscope (AFM), the pore structure of the uppermost layer was measured with an atomic force microscope (AFM) of a Dimension Icon manufactured by BRUKER, and a probe of a silicon probe Model RTESPA-150 manufactured by BRUKER, and a measurement mode of a Peak Force Tapping mode. The image thus captured was subjected to a measurement of the width (nm) and maximum valley depth Sv (nm) of the pores, the average period length (nm) of the microstructure other than the pores, the pore area ratio (%), the arithmetic mean roughness Sa (nm), and the root mean square height Sq (nm) using a software manufactured by BRUKER. The results are shown in Table V.

As an example, FIG. 25 shows the results and conditions for measuring the arithmetic mean roughness Sa (nm) and the root mean square height Sq (nm) of the dielectric multilayer film 51 using an atomic force microscope (AFM). Similarly, FIG. 26 illustrates the measurement results for the dielectric multilayer film 52.

<<Evaluation of Dielectric Multilayer Film>>

The film density of the uppermost layer, the photocatalytic property, the hydrophilicity (water contact angle) in a high temperature and high humidity environment, the salt water resistance, and the scratch resistance were evaluated in the same manner as in the first example.

In addition, the light reflectance and the haze were evaluated by the following methods.

(Evaluation of Light Reflectance)

With regard to "light reflectance", the light reflectance of each sample was evaluated based on the maximum light reflectance (%) in a wavelength range of 450 nm to 780 nm of each sample measured with a reflectometer (USPM-RU III, manufactured by Olympus Corporation). When the light reflectance is less than that of the naked base glass plate, the film is rated to have an antireflection effect. In particular, when the light reflectance is 2% or less, the film is rated to have a particularly high antireflection effect.

(Evaluation of Haze)

Only the uppermost layer is formed on a substrate made of white plate glass BK7 (manufactured by SCHOTT) (φ(diameter)=30 mm, t (thickness)=2 mm), and the haze

TABLE V

| *1 | FUNCTIONAL LAYER TiO$_2$-CONTAINING LAYER [mass %] | LAYER THICKNESS [nm] | UPPERMOST LAYER (SECOND ANALYSIS METHOD: IMAGE ANALYSIS WITH ATOMIC FORCE MICROSCOPE AFM)) SiO$_2$ CONTENT [mass %] | Na CONTENT [mass %] | LAYER THICKNESS [nm] | PORE WIDTH [nm] | MAXIMUM VALLEY DEPTH Sv [nm] | *2 [nm] |
|---|---|---|---|---|---|---|---|---|
| 51 | 100 | 113 | 95 | 5 | 88 | 75 | 41 | 357 |
| 52 | 100 | 113 | 95 | 5 | 88 | 86 | 79 | 500 |
| 53 | 95 | 113 | 70 | 5 | 88 | 96 | 79 | 500 |
| 54 | 100 | 113 | 95 | 5 | 20 | 115 | 20 | 89 |
| 55 | 100 | 113 | 95 | 5 | 10 | 108 | 4 | 5205 |
| 56 | 100 | 113 | 95 | 5 | 311 | 84 | 311 | 524 |
| 57 | 100 | 113 | 95 | 5 | 10 | 84 | 10 | 1143 |
| 58 | 100 | 113 | 95 | 5 | 88 | 84 | 88 | 1982 |
| 59 | 100 | 9 | 95 | 5 | 88 | 115 | 38 | 364 |
| 60 | 100 | 210 | 95 | 5 | 140 | 115 | 96 | 364 |
| 61 | 100 | 113 | 95 | 0.7 | 88 | 115 | 79 | 500 |
| 62 | 100 | 113 | 78 | 22 | 88 | 115 | 79 | 500 |
| 63 | 100 | 400 | 95 | 5 | 5 | 4 | 1 | 10 |

| *1 | UPPERMOST LAYER (SECOND ANALYSIS METHOD: IMAGE ANALYSIS WITH ATOMIC FORCE MICROSCOPE AFM)) PORE AREA RATIO [%] | ARITHMETIC MEAN ROUGHNESS Ra [nm] | ROOT MEAN SQUARE HEIGHT Sq [nm] | PORE SHAPE | HEATED IAD | LAYER THICKNESS [nm] | REMARKS |
|---|---|---|---|---|---|---|---|
| 51 | 9 | 6 | 6 | LEAF VEIN | YES | 302 | INVENTIVE |
| 52 | 28 | 23 | 28 | LEAF VEIN | YES | 302 | INVENTIVE |
| 53 | 28 | 23 | 28 | LEAF VEIN | YES | 302 | INVENTIVE |
| 54 | 71 | 4 | 6 | LEAF VEIN | YES | 228 | INVENTIVE |
| 55 | 0.5 | 0.5 | 0.8 | LEAF VEIN | YES | 228 | INVENTIVE |
| 56 | 30 | 102 | 109 | LEAF VEIN | YES | 524 | INVENTIVE |
| 57 | 2 | 2 | 3 | POROUS | YES | 228 | INVENTIVE |
| 58 | 45 | 26 | 31 | LEAF VEIN | YES | 302 | INVENTIVE |
| 59 | 7 | 6 | 8 | LEAF VEIN | YES | 197 | INVENTIVE |
| 60 | 7 | 6 | 8 | LEAF VEIN | YES | 450 | INVENTIVE |
| 61 | 28 | 23 | 28 | LEAF VEIN | YES | 302 | INVENTIVE |
| 62 | 28 | 23 | 28 | LEAF VEIN | YES | 302 | INVENTIVE |
| 63 | 0.7 | 0.9 | 0.9 | POROUS | YES | 505 | COMPARATIVE |

*1: DIELECTRIC MULTILAYER FILM NO.
*2: MICROSTRUCTURE PERIOD LENGTH (ratio of diffuse transmittance to total light transmittance) was measured with an NDH7000 (Nippon Denshoku Co., Ltd.).

The haze of the uppermost layer measured by the above-described method was rated according to the following criteria so that the haze was evaluated.

BB: The haze is less than 1.0%.
CC: The haze is 1.0% to less than 5.0%.
DD: The haze is 5.0% or more.
The results are shown in Table VI.

TABLE VI

EVALUATION RESULT

| DIELECTRIC MULTILAYER FILM NO. | FILM DENSITY | PHOTOCATALYTIC PROPERTY | WATER CONTACT ANGLE [°] | SALT WATER RESISTANCE |
|---|---|---|---|---|
| 51 | BB | AA | 5 | BB |
| 52 | BB | AA | 5 | BB |
| 53 | BB | AA | 5 | BB |
| 54 | BB | AA | 5 | BB |
| 55 | BB | CC | 5 | BB |
| 56 | BB | BB | 5 | BB |
| 57 | BB | CC | 5 | BB |
| 58 | BB | AA | 5 | BB |
| 59 | BB | CC | 5 | BB |
| 60 | BB | AA | 5 | BB |
| 61 | BB | AA | 15 | BB |
| 62 | BB | AA | 13 | BB |
| 63 | DD | DD | 60 | DD |

EVALUATION RESULT

| DIELECTRIC MULTILAYER FILM NO. | LIGHT REFLECTANCE [%] | SCRATCH RESISTANCE | HAZE | REMARKS |
|---|---|---|---|---|
| 51 | 0.6 | BB | BB | INVENTIVE |
| 52 | 0.5 | BB | BB | INVENTIVE |
| 53 | 1.5 | BB | BB | INVENTIVE |
| 54 | 12 | BB | BB | INVENTIVE |
| 55 | 11 | BB | BB | INVENTIVE |
| 56 | 5.5 | BB | BB | INVENTIVE |
| 57 | 11 | BB | BB | INVENTIVE |
| 58 | 6 | BB | CC | INVENTIVE |
| 59 | 2.5 | BB | BB | INVENTIVE |
| 60 | 10 | BB | BB | INVENTIVE |
| 61 | 0.5 | BB | BB | INVENTIVE |
| 62 | 0.5 | BB | BB | INVENTIVE |
| 63 | 18 | DD | BB | COMPARATIVE |

It was confirmed that the dielectric multilayer film of the present invention has excellent effects in film density, photocatalytic property, hydrophilicity (water contact angle) in a high temperature and high humidity environment, salt water resistance, scratch resistance, light reflectance and haze.

In particular, in the second image analysis method using an atomic force microscope (AFM), a sharper image can be obtained as a texture image of the outermost layer compared with the first image analysis method using an electron microscope described in the first example. Accordingly, more specific structure data was obtained, including characteristic values of the width (nm) of pores, maximum valley depth Sv (nm), average period length (nm) of microstructure other than pores, pore area ratio (%), arithmetic mean roughness Sa (nm) and root mean square height Sq (nm).

By applying the dielectric multilayer film of the present invention having the characteristic values specified in the present invention to an optical member such as a lens, a window or a mirror, it was successful to obtain the optical member that has low light reflectance, hydrophilicity and photocatalytic property and that is also excellent in properties such as salt water resistance and scratch resistance.

INDUSTRIAL APPLICABILITY

The dielectric multilayer film of the present invention has low light reflectance, hydrophilicity, and photocatalytic property, and is excellent in properties such as salt water resistance and scratch resistance. The dielectric multilayer film of the present invention is suitably applicable for modification of lenses for an on-board camera that requires high resistance to various environments.

REFERENCE SIGNS LIST

1 IAD vapor deposition device
2 Chamber
3 Dome
4 Substrate
5 Evaporation source
6 Evaporant
7 IAD ion source
8 Ion beam
30 Pores
31 Microstructure other than pores
50 Metal mask
50a Metal part
50b Exposed part
100 Dielectric multilayer film (optical member)

101 Substrate
102, 104 Low refractive index layer
103 High refractive index layer
105 Functional layer
106 Uppermost layer
107 Laminate

The invention claimed is:

1. A dielectric multilayer film composed of a plurality of layers on a substrate,
   wherein the plurality of layers includes at least one low refractive index layer and at least one high refractive index layer,
   wherein an uppermost layer farthest from the substrate is the low refractive index layer,
   wherein the high refractive index layer disposed on a substrate side of the uppermost layer is a functional layer containing a metal oxide with a photocatalytic function,
   wherein the uppermost layer is a hydrophilic layer containing a metal oxide with a hydrophilic function and has pores that partially expose a surface of the functional layer,
   wherein an average width of the pores is in a range of 5 to 1000 nm, and
   wherein the pores are through holes that partially expose the surface of the functional layer, and the functional layer is solid.

2. A dielectric multilayer film composed of a plurality of layers on a substrate,
   wherein the plurality of layers includes at least one low refractive index layer and at least one high refractive index layer,
   wherein an uppermost layer farthest from the substrate is the low refractive index layer,
   wherein the high refractive index layer disposed on a substrate side of the uppermost layer is a functional layer containing a metal oxide with a photocatalytic function,
   wherein the uppermost layer is a hydrophilic layer containing a metal oxide with a hydrophilic function and has pores that partially expose a surface of the functional layer,
   wherein a maximum valley depth Sv of the pores is in a range of 10 to 300 nm, and an average width of the pores is in a range of 5 to 1000 nm, and
   wherein the pores are through holes that partially expose the surface of the functional layer, and the functional layer is solid.

3. A dielectric multilayer film composed of a plurality of layers on a substrate,
   wherein the plurality of layers includes at least one low refractive index layer and at least one high refractive index layer,
   wherein an uppermost layer farthest from the substrate is the low refractive index layer,
   wherein the high refractive index layer disposed on a substrate side of the uppermost layer is a functional layer containing a metal oxide with a photocatalytic function,
   wherein the uppermost layer is a hydrophilic layer containing a metal oxide with a hydrophilic function and has pores that partially expose a surface of the functional layer,
   wherein an area ratio of the pores on a surface of the uppermost layer to a surface area of the uppermost layer, when the pores are observed from a normal direction, is in a range of 1% to 70%,
   wherein an average width of the pores is in a range of 5 to 1000 nm, and
   wherein the pores are through holes that partially expose the surface of the functional layer, and the functional layer is solid.

4. The dielectric multilayer film according to claim 1, wherein the functional layer contains $TiO_2$.

5. The dielectric multilayer film according to claim 1, wherein the uppermost layer contains $SiO_2$.

6. The dielectric multilayer film according to claim 1, wherein the uppermost layer contains an element that has an electronegativity less than Si.

7. The dielectric multilayer film according to claim 1, wherein the uppermost layer contains sodium.

8. The dielectric multilayer film according to claim 1, wherein a film density of the uppermost layer is equal to or greater than 98%.

9. A method for producing the dielectric multilayer film of claim 1, comprising:
   forming the at least one low refractive index layer and the at least one high refractive index layer as the plurality of layers;
   forming the functional layer containing the metal oxide with the photocatalytic function as the high refractive index layer;
   forming the hydrophilic layer containing the metal oxide with the hydrophilic function as the uppermost layer farthest from the substrate; and
   forming the pores in the uppermost layer, the pores partially exposing the surface of the functional layer, the pores having an average width in a range of 5 to 1000 nm.

10. A method for producing the dielectric multilayer film of claim 1, comprising:
    forming the at least one low refractive index layer and the at least one high refractive index layer as the plurality of layers;
    forming the functional layer containing the metal oxide with the photocatalytic function as the high refractive index layer;
    forming the hydrophilic layer containing the metal oxide with the hydrophilic function as the uppermost layer farthest from the substrate; and
    forming the pores in the uppermost layer, the pores having an average depth of 10 to 300 nm and an average width of 5 to 1000 nm, the pores partially exposing the surface of the functional layer.

11. A method for producing the dielectric multilayer film of claim 3, comprising:
    forming the at least one low refractive index layer and the at least one high refractive index layer as the plurality of layers;
    forming the functional layer containing the metal oxide with the photocatalytic function as the high refractive index layer;
    forming the hydrophilic layer containing the metal oxide with the hydrophilic function as the uppermost layer farthest from the substrate; and
    forming the pores in the uppermost layer, the pores having a maximum valley depth Sv in a range of 10 to 300 nm and an average width in a range of 5 to 1000 nm, the pores partially exposing the surface of the functional layer.

12. A method for producing the dielectric multilayer film of claim 1, comprising:

forming the at least one low refractive index layer and the at least one high refractive index layer as the plurality of layers;

forming the functional layer containing the metal oxide with the photocatalytic function as the high refractive index layer;

forming the hydrophilic layer containing the metal oxide with the hydrophilic function as the uppermost layer farthest from the substrate; and forming the pores in the uppermost layer, the pores partially exposing the surface of the functional layer, the microstructure portion other than the pores having an average period length in a range of 20 to 5000 nm.

13. A method for producing the dielectric multilayer film of claim 5, comprising:

forming the at least one low refractive index layer and the at least one high refractive index layer as the plurality of layers;

forming the functional layer containing the metal oxide with the photocatalytic function as the high refractive index layer;

forming the hydrophilic layer containing the metal oxide with the hydrophilic function as the uppermost layer farthest from the substrate; and forming the pores in the uppermost layer, the pores partially exposing the surface of the functional layer, a total area of the pores observed from a normal direction being in a range of 1% to 70% of the surface area of the uppermost layer.

14. A method for producing the dielectric multilayer film of claim 1, comprising:

forming the at least one low refractive index layer and the at least one high refractive index layer as the plurality of layers;

forming the functional layer containing the metal oxide with the photocatalytic function as the high refractive index layer;

forming the hydrophilic layer containing the metal oxide with the hydrophilic function as the uppermost layer farthest from the substrate; and forming the pores in the uppermost layer, an arithmetic mean roughness Sa being in a range of 1 to 100 nm, a root mean square height Sq being in a range of 1 to 100 nm, the pores partially exposing the surface of the functional layer.

15. A method for producing the dielectric multilayer film of claim 1, comprising:

forming the at least one low refractive index layer and the at least one high refractive index layer as the plurality of layers;

forming the functional layer containing the metal oxide with the photocatalytic function as the high refractive index layer;

forming the hydrophilic layer containing the metal oxide with the hydrophilic function as the uppermost layer farthest from the substrate; and forming the pores in the uppermost layer, the pores partially exposing the surface of the functional layer, and forming the uppermost layer into the shape with a leaf vein structure.

16. The method for producing the dielectric multilayer film according to claim 9, wherein the forming of the pores comprises:

after forming the uppermost layers, forming a metal mask on a surface of the uppermost layer; and forming the pores by etching the uppermost layer through the metal mask.

17. The method for producing the dielectric multilayer film according to claim 16, wherein the forming of the metal mask comprises:

forming the mask that has a granular structure or a leaf vein structure or a porous structure and forming the pores by dry etching.

18. The method for producing the dielectric multilayer film according to claim 16, wherein the metal mask is formed such that silver is used as a metal of the metal mask, a film forming temperature is controlled in a range of 20° C. to 400° C., and a thickness is controlled in a range of 1 to 100 nm.

19. An optical member comprising the dielectric multilayer film of claim 1.

20. The optical member according to claim 19, wherein the optical member is any one of a lens, an antibacterial cover, an antifungal coating and a mirror.

21. The dielectric multilayer film according to claim 1, wherein the metal oxide of the uppermost layer comprises $SiO_2$ and $Na_2O$.

22. The dielectric multilayer film according to claim 2, wherein the metal oxide of the uppermost layer comprises $SiO_2$ and $Na_2O$.

23. The dielectric multilayer film according to claim 3, wherein the metal oxide of the uppermost layer comprises $SiO_2$ and $Na_2O$.

24. The dielectric multilayer film according to claim 1, wherein 90% by mass or more of a total mass of the uppermost layer is composed of $SiO_2$.

25. The dielectric multilayer film according to claim 2, wherein 90% by mass or more of a total mass of the uppermost layer is composed of $SiO_2$.

26. The dielectric multilayer film according to claim 2, wherein 90% by mass or more of a total mass of the uppermost layer is composed of $SiO_2$.

* * * * *